(12) United States Patent
Deng

(10) Patent No.: US 8,757,202 B2
(45) Date of Patent: Jun. 24, 2014

(54) DUAL FUEL HEATING SOURCE

(76) Inventor: David Deng, Diamond Bar, CA (US)

( * ) Notice: Subject to any disclaimer, the term of this patent is extended or adjusted under 35 U.S.C. 154(b) by 963 days.

(21) Appl. No.: 12/797,530

(22) Filed: Jun. 9, 2010

(65) Prior Publication Data

US 2010/0330519 A1    Dec. 30, 2010

Related U.S. Application Data

(60) Provisional application No. 61/221,521, filed on Jun. 29, 2009, provisional application No. 61/221,520, filed on Jun. 29, 2009, provisional application No. 61/221,529, filed on Jun. 29, 2009, provisional application No. 61/221,528, filed on Jun. 29, 2009, provisional application No. 61/287,147, filed on Dec. 16, 2009, provisional application No. 61/286,355, filed on Dec. 14, 2009, provisional application No. 61/286,354, filed on Dec. 14, 2009, provisional application No. 61/286,352, filed on Dec. 14, 2009, provisional application No. 61/304,373, filed on Feb. 12, 2010.

(51) Int. Cl.
| | |
|---|---|
| *F16K 11/076* | (2006.01) |
| *F16K 11/20* | (2006.01) |
| *F16K 11/22* | (2006.01) |
| *F24C 1/02* | (2006.01) |
| *F23N 1/00* | (2006.01) |

(52) U.S. Cl.
USPC . 137/595; 137/597; 137/625.11; 137/625.16; 137/625.19; 137/625.42; 137/637.3; 431/280; 431/281; 431/284; 126/116 R

(58) Field of Classification Search
USPC ............. 137/625.11, 625.19, 630.17, 597, 137/625.42, 637.3, 595, 625.13, 625.14, 137/625.15, 625.16; 431/280, 281, 284; 126/116 R
See application file for complete search history.

(56) References Cited

U.S. PATENT DOCUMENTS

| 743,714 | A | 11/1903 | Guese |
|---|---|---|---|
| 1,051,072 | A | 1/1913 | Bradley |
| 1,216,529 | A | 2/1917 | Wilcox |
| 1,589,386 | A | 6/1926 | Harper |
| 1,639,780 | A | 8/1927 | Mulholland |

(Continued)

FOREIGN PATENT DOCUMENTS

| CA | 2391757 | 1/2003 |
|---|---|---|
| CN | 1873268 | 12/2006 |

(Continued)

OTHER PUBLICATIONS

Consumer Guide to Vent-Free Gas Supplemental Heating Products, est. 2007.

(Continued)

*Primary Examiner* — Atif Chaudry
(74) *Attorney, Agent, or Firm* — Knobbe Martens Olson & Bear LLP

(57) ABSTRACT

A dual fuel heating source can have a dual entry valve unit with a main body at least partially defining a certain flow paths or channels therethrough. The dual entry valve can have first and second inlets and first and second outlets. The dual fuel heating source may also include a pressure regulator, an exit valve, a control valve and/or a manifold connected to the dual entry valve unit.

23 Claims, 44 Drawing Sheets

(56) References Cited

U.S. PATENT DOCUMENTS

| | | | |
|---|---|---|---|
| 1,860,942 A | 5/1932 | Morse |
| 1,867,110 A | 7/1932 | Signore |
| 1,961,086 A | 5/1934 | Sherman et al. |
| 2,054,588 A | 9/1936 | Stephens |
| 2,095,064 A | 10/1937 | Harper |
| 2,108,299 A | 2/1938 | Steffen |
| 2,120,864 A | 6/1938 | Kagi |
| 2,160,264 A | 5/1939 | Furlong |
| 2,161,523 A | 6/1939 | Moecker, Jr. et al. |
| 2,319,676 A | 5/1943 | Guelson |
| 2,380,956 A | 8/1945 | Evarts |
| 2,422,368 A | 6/1947 | Ray |
| 2,443,892 A | 6/1948 | Caparone |
| 2,556,337 A | 6/1951 | Paille |
| 2,630,821 A | 3/1953 | Arey et al. |
| 2,652,225 A | 9/1953 | Peterson |
| 2,661,157 A | 12/1953 | Reichelderfer |
| 2,687,140 A | 8/1954 | St. Clair et al. |
| 2,747,613 A | 5/1956 | Reinhart |
| 2,905,361 A | 9/1959 | Noall |
| 3,001,541 A | 9/1961 | St. Clair et al. |
| 3,032,096 A | 5/1962 | Stoul |
| 3,139,879 A | 7/1964 | Bauer et al. |
| 3,244,193 A * | 4/1966 | Loveless ............... 137/454.6 |
| 3,331,392 A | 7/1967 | Davidson et al. |
| 3,417,779 A | 12/1968 | Golay |
| 3,430,655 A | 3/1969 | Forney |
| 3,590,806 A | 7/1971 | Locke |
| 3,800,830 A | 4/1974 | Etter |
| 3,814,570 A | 6/1974 | Guigues et al. |
| 3,814,573 A | 6/1974 | Karlovetz |
| 3,829,279 A | 8/1974 | Qualley et al. |
| 3,843,310 A | 10/1974 | Massi |
| 3,884,413 A | 5/1975 | Berquist |
| 3,939,871 A | 2/1976 | Dickson |
| D243,694 S | 3/1977 | Faulkner |
| 4,021,190 A | 5/1977 | Dickson |
| 4,081,235 A | 3/1978 | Van der Veer |
| 4,101,257 A | 7/1978 | Straitz, III |
| 4,157,238 A | 6/1979 | Van Berkum |
| 4,249,886 A | 2/1981 | Bush |
| 4,290,450 A | 9/1981 | Swanson |
| 4,301,825 A | 11/1981 | Simko |
| 4,329,137 A | 5/1982 | Werne |
| 4,340,362 A | 7/1982 | Chalupsky et al. |
| 4,348,172 A | 9/1982 | Miller |
| 4,355,659 A | 10/1982 | Kelchner |
| 4,359,284 A | 11/1982 | Kude et al. |
| 4,465,456 A | 8/1984 | Hynek et al. |
| 4,474,166 A | 10/1984 | Shaftner et al. |
| 4,509,912 A | 4/1985 | Van Berkum |
| 4,640,680 A | 2/1987 | Schilling |
| 4,718,846 A | 1/1988 | Oguri et al. |
| 4,768,543 A | 9/1988 | Wienke et al. |
| 4,768,947 A | 9/1988 | Adachi |
| 4,782,814 A | 11/1988 | Cherryholmes |
| 4,796,652 A | 1/1989 | Hafla |
| 4,848,133 A | 7/1989 | Paulis et al. |
| 4,848,313 A | 7/1989 | Velie |
| 4,874,006 A | 10/1989 | Iqbal |
| 4,930,538 A | 6/1990 | Browne |
| 4,965,707 A | 10/1990 | Butterfield |
| 5,025,990 A | 6/1991 | Ridenour |
| 5,027,854 A | 7/1991 | Genbauffe |
| 5,090,899 A | 2/1992 | Kee |
| 5,172,728 A | 12/1992 | Tsukazaki |
| 5,239,979 A | 8/1993 | Maurice et al. |
| 5,251,823 A | 10/1993 | Joshi et al. |
| 5,278,936 A | 1/1994 | Shao |
| 5,379,794 A | 1/1995 | Brown |
| 5,397,233 A | 3/1995 | Eavenson et al. |
| 5,413,141 A | 5/1995 | Dietiker |
| 5,437,304 A | 8/1995 | Delcroix |
| 5,452,709 A | 9/1995 | Mealer |
| 5,470,018 A | 11/1995 | Smith |
| 5,513,798 A | 5/1996 | Tavor |
| 5,542,609 A | 8/1996 | Myers et al. |
| 5,567,141 A | 10/1996 | Joshi et al. |
| 5,584,680 A | 12/1996 | Kim |
| 5,591,024 A | 1/1997 | Eavenson et al. |
| 5,603,211 A | 2/1997 | Graves |
| 5,642,580 A | 7/1997 | Hess et al. |
| 5,645,043 A | 7/1997 | Long et al. |
| D391,345 S | 2/1998 | Mandir et al. |
| 5,782,626 A | 7/1998 | Joos et al. |
| 5,787,874 A | 8/1998 | Krohn et al. |
| 5,787,928 A | 8/1998 | Allen et al. |
| 5,807,098 A | 9/1998 | Deng |
| 5,814,121 A | 9/1998 | Travis |
| 5,838,243 A | 11/1998 | Gallo |
| 5,906,197 A | 5/1999 | French et al. |
| 5,915,952 A | 6/1999 | Manning et al. |
| 5,931,661 A | 8/1999 | Kingery |
| 5,941,699 A | 8/1999 | Abele |
| 5,966,937 A | 10/1999 | Graves |
| 5,971,746 A | 10/1999 | Givens et al. |
| 5,975,112 A | 11/1999 | Ohmi et al. |
| 5,987,889 A | 11/1999 | Graves et al. |
| 5,988,204 A | 11/1999 | Reinhardt et al. |
| 6,035,893 A | 3/2000 | Ohmi et al. |
| 6,045,058 A | 4/2000 | Dobbeling et al. |
| 6,068,017 A | 5/2000 | Haworth et al. |
| 6,076,517 A | 6/2000 | Kahlke et al. |
| 6,135,063 A | 10/2000 | Welden |
| 6,162,048 A | 12/2000 | Griffioen et al. |
| 6,227,451 B1 | 5/2001 | Caruso |
| 6,244,223 B1 | 6/2001 | Welk |
| 6,244,524 B1 | 6/2001 | Tackels et al. |
| 6,257,270 B1 | 7/2001 | Ohmi et al. |
| 6,340,298 B1 | 1/2002 | Vandrak et al. |
| 6,354,072 B1 | 3/2002 | Hura |
| 6,354,078 B1 | 3/2002 | Karlsson et al. |
| 6,367,239 B1 | 4/2002 | Brown et al. |
| 6,543,235 B1 | 4/2003 | Crocker et al. |
| 6,607,854 B1 | 8/2003 | Rehg et al. |
| 6,648,635 B2 | 11/2003 | Vandrak et al. |
| 6,786,194 B2 | 9/2004 | Koegler et al. |
| 6,845,966 B1 | 1/2005 | Albizuri |
| 6,884,065 B2 | 4/2005 | Vandrak et al. |
| 6,901,962 B2 | 6/2005 | Kroupa et al. |
| 6,904,873 B1 | 6/2005 | Ashton |
| 6,910,496 B2 | 6/2005 | Strom |
| 6,938,634 B2 | 9/2005 | Dewey |
| 7,013,886 B2 | 3/2006 | Deng |
| 7,044,729 B2 | 5/2006 | Ayastuy |
| 7,048,538 B2 | 5/2006 | Albizuri |
| 7,156,370 B2 | 1/2007 | Albizuri |
| 7,174,913 B2 | 2/2007 | Albizuri |
| 7,201,186 B2 | 4/2007 | Ayastuy |
| 7,251,940 B2 | 8/2007 | Graves et al. |
| 7,299,799 B2 | 11/2007 | Albizuri |
| 7,367,352 B2 | 5/2008 | Hagen et al. |
| 7,434,447 B2 | 10/2008 | Deng |
| 7,458,386 B2 | 12/2008 | Zhang |
| 7,487,888 B1 | 2/2009 | Pierre, Jr. |
| 7,490,869 B2 | 2/2009 | Iturralde et al. |
| 7,528,608 B2 | 5/2009 | Elexpuru et al. |
| 7,533,656 B2 | 5/2009 | Dingle |
| 7,591,257 B2 | 9/2009 | Bayer et al. |
| 7,600,529 B2 | 10/2009 | Querejeta |
| 7,607,325 B2 | 10/2009 | Elexpuru et al. |
| 7,607,426 B2 | 10/2009 | Deng |
| 7,634,993 B2 | 12/2009 | Bellomo |
| 7,637,476 B2 | 12/2009 | Mugica et al. |
| 7,641,470 B2 | 1/2010 | Albizuri |
| 7,651,330 B2 | 1/2010 | Albizuri |
| 7,654,820 B2 | 2/2010 | Deng |
| 7,677,236 B2 | 3/2010 | Deng |
| 7,730,765 B2 | 6/2010 | Deng |
| 7,758,323 B2 | 7/2010 | Orue |
| 7,766,006 B1 * | 8/2010 | Manning ............... 126/99 R |
| 7,861,706 B2 | 1/2011 | Bellomo |
| 7,942,164 B2 | 5/2011 | Hsiao |
| 7,967,005 B2 | 6/2011 | Parrish |

(56) References Cited

U.S. PATENT DOCUMENTS

| | | |
|---|---|---|
| 7,967,006 B2 | 6/2011 | Deng |
| 7,967,007 B2 | 6/2011 | Deng |
| 8,011,920 B2 | 9/2011 | Deng |
| 8,152,515 B2 | 4/2012 | Deng |
| 8,235,708 B2 | 8/2012 | Deng |
| 8,241,034 B2 | 8/2012 | Deng |
| 2002/0058266 A1 | 5/2002 | Clough et al. |
| 2002/0160325 A1 | 10/2002 | Deng |
| 2002/0160326 A1 | 10/2002 | Deng |
| 2003/0010952 A1 | 1/2003 | Morete |
| 2003/0217555 A1 | 11/2003 | Gerhold |
| 2004/0226600 A1 | 11/2004 | Starer et al. |
| 2004/0238030 A1 | 12/2004 | Dewey, Jr. |
| 2005/0167530 A1 | 8/2005 | Ward et al. |
| 2005/0202361 A1 | 9/2005 | Albizuri |
| 2005/0208443 A1 | 9/2005 | Bachinski et al. |
| 2006/0096644 A1 | 5/2006 | Goldfarb et al. |
| 2006/0201496 A1 | 9/2006 | Shingler |
| 2007/0044856 A1 | 3/2007 | Bonior |
| 2007/0154856 A1 | 7/2007 | Hallit et al. |
| 2007/0210069 A1 | 9/2007 | Albizuri |
| 2007/0215223 A1 | 9/2007 | Morris |
| 2007/0277803 A1 | 12/2007 | Deng |
| 2008/0121116 A1 | 5/2008 | Albizuri |
| 2008/0149871 A1 | 6/2008 | Deng |
| 2008/0149872 A1 | 6/2008 | Deng |
| 2008/0153044 A1 | 6/2008 | Deng |
| 2008/0153045 A1 | 6/2008 | Deng |
| 2008/0168980 A1 | 7/2008 | Lyons et al. |
| 2008/0223465 A1 | 9/2008 | Deng |
| 2008/0227041 A1 | 9/2008 | Kirchner et al. |
| 2008/0227045 A1 | 9/2008 | Deng |
| 2008/0236688 A1 | 10/2008 | Albizuri |
| 2008/0236689 A1 | 10/2008 | Albizuri |
| 2008/0314090 A1 | 12/2008 | Orue Orue et al. |
| 2009/0039072 A1 | 2/2009 | Llona |
| 2009/0139304 A1 | 6/2009 | Deng |
| 2009/0140193 A1 | 6/2009 | Albizuri Landa |
| 2009/0150050 A1 | 6/2009 | Mashida et al. |
| 2009/0159068 A1 | 6/2009 | Querejeta et al. |
| 2009/0280448 A1 | 11/2009 | Antxia Uribetxbarria et al. |
| 2010/0035195 A1 | 2/2010 | Querejeta Andueza et al. |
| 2010/0035196 A1 | 2/2010 | Deng |
| 2010/0037884 A1 | 2/2010 | Deng |
| 2010/0086884 A1 | 4/2010 | Querejeta Andueza et al. |
| 2010/0086885 A1 | 4/2010 | Querejeta Andueza et al. |
| 2010/0089385 A1 | 4/2010 | Albizuri |
| 2010/0089386 A1 | 4/2010 | Albizuri |
| 2010/0095945 A1 | 4/2010 | Manning |
| 2010/0154777 A1 | 6/2010 | Carvalho et al. |
| 2010/0170503 A1 | 7/2010 | Deng |
| 2010/0255433 A1 | 10/2010 | Querejeta Andueza et al. |
| 2010/0275953 A1 | 11/2010 | Orue Orue et al. |
| 2010/0304317 A1 | 12/2010 | Deng |
| 2010/0310997 A1 | 12/2010 | Mugica Odriozola et al. |
| 2010/0326422 A1 | 12/2010 | Deng |
| 2010/0326430 A1 | 12/2010 | Deng |
| 2010/0330513 A1 | 12/2010 | Deng |
| 2010/0330518 A1 | 12/2010 | Deng |
| 2011/0081620 A1 | 4/2011 | Deng |
| 2012/0080024 A1 | 4/2012 | Deng |
| 2012/0132189 A1 | 5/2012 | Deng |

FOREIGN PATENT DOCUMENTS

| | | |
|---|---|---|
| DE | 720 854 C | 5/1942 |
| EP | 1970625 | 9/2008 |
| JP | 58 219320 A | 12/1983 |
| JP | 59009425 | 1/1984 |
| JP | 62169926 | 7/1987 |
| JP | 03 230015 A | 10/1991 |
| JP | 10141656 | 5/1998 |
| JP | 11192166 | 7/1999 |
| JP | 11193929 | 7/1999 |
| JP | 11-344216 | 12/1999 |
| JP | 2000234738 | 8/2000 |
| JP | 2003 056845 A | 2/2003 |
| JP | 2003-65533 | 3/2003 |
| JP | 2003 074837 A | 3/2003 |
| JP | 2003 074838 A | 3/2003 |
| JP | 2003-83537 | 3/2003 |
| JP | 2003-90517 | 3/2003 |
| JP | 2006-029763 | 2/2006 |
| JP | 2007017030 | 1/2007 |
| JP | 2010071477 | 4/2010 |
| WO | WO 2008/071970 | 6/2008 |

OTHER PUBLICATIONS

Heat and Glo, Escape Series Gas Fireplaces, Mar. 2005.

Heat and Glo, Escape-42DV Owner's Manual, Rev. i, Dec. 2006.

International Search Report and Written Opinion for Application No. PCT-US2008-056910, mailed Jul. 16, 2008.

International Search Report and Written Opinion for International Application No. PCT/US2010/039668, Notification mailed Oct. 1, 2010.

International Search Report and Written Opinion for International Application No. PCT/US2010/039687, Notification mailed Oct. 5, 2010.

International Search Report and Written Opinion for International Application No. PCT/US2010/039655, Notification mailed Jan. 14, 2011.

International Search Report and Written Opinion for International Application No. PCT/US2010/039681, Notification mailed Jan. 12, 2011.

Napoleon, Park Avenue Installation and Operation Instructions, Jul. 20, 2006.

Napoleon, The Madison Installation and Operation Instructions, May 24, 2005.

International Preliminary Report on Patentability for International Application No. PCT/US2010/039655, Notification mailed Oct. 14, 2011.

International Preliminary Report on Patentability for International Application No. PCT/US2010/039668, Notification mailed Oct. 14, 2011.

International Preliminary Report on Patentability for International Application No. PCT/US2010/039681, Notification mailed Oct. 14, 2011.

International Preliminary Report on Patentability for International Application No. PCT/US2010/039687, Notification mailed Sep. 20, 2011.

* cited by examiner

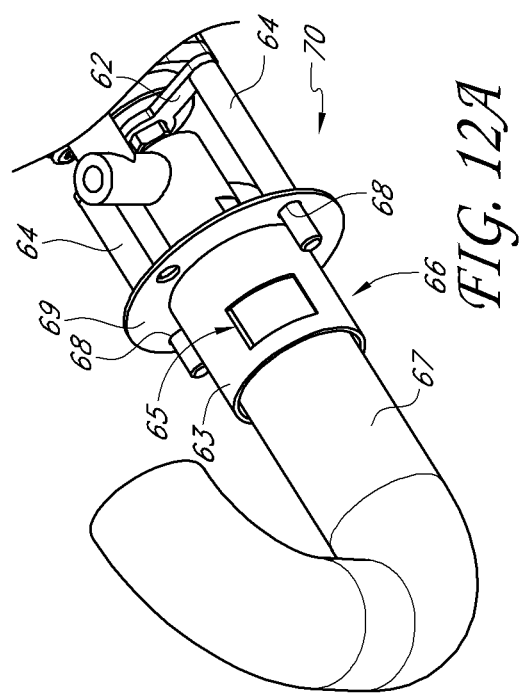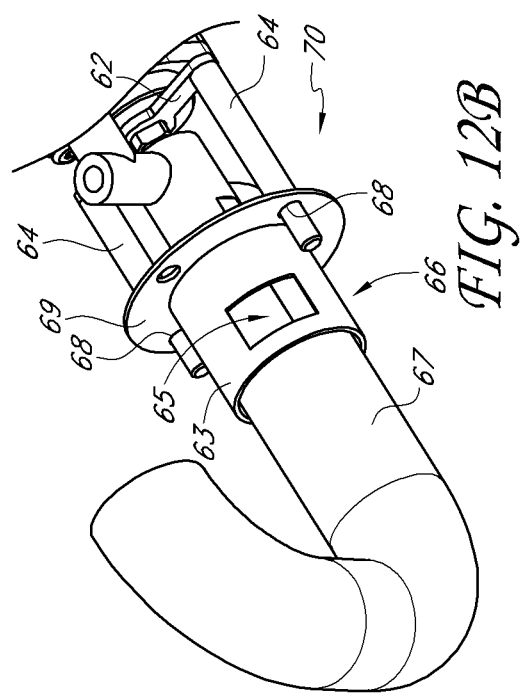

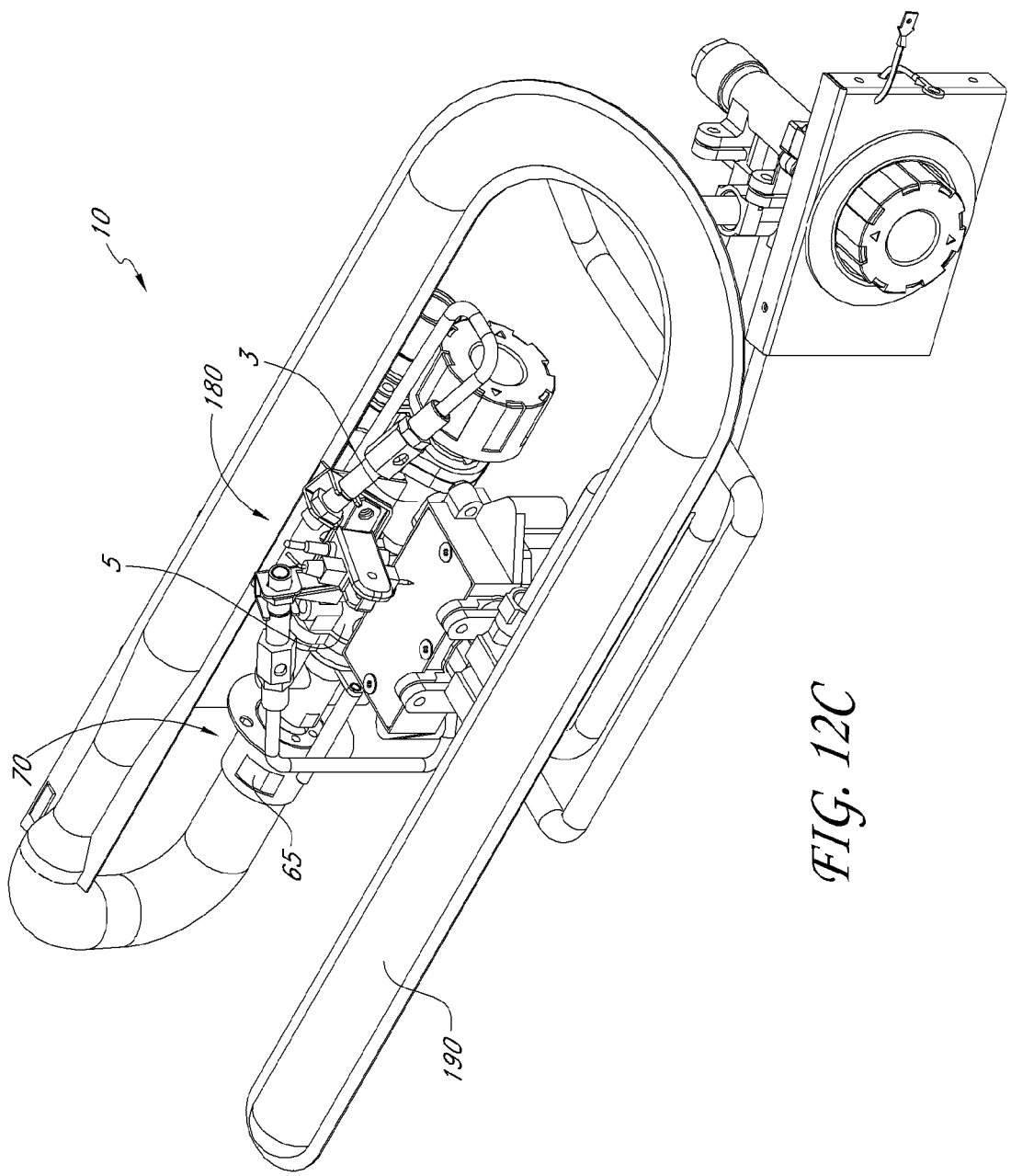

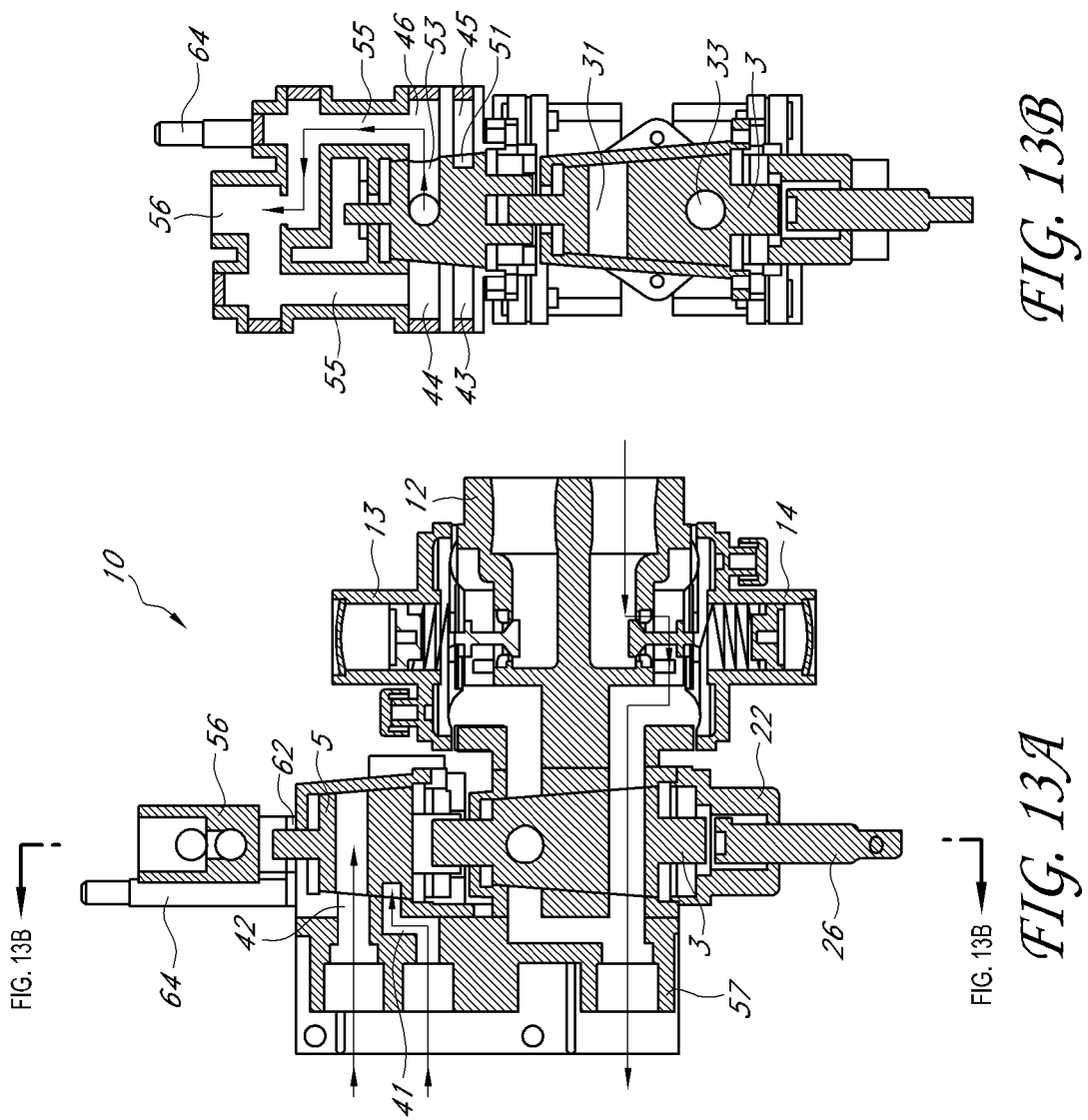

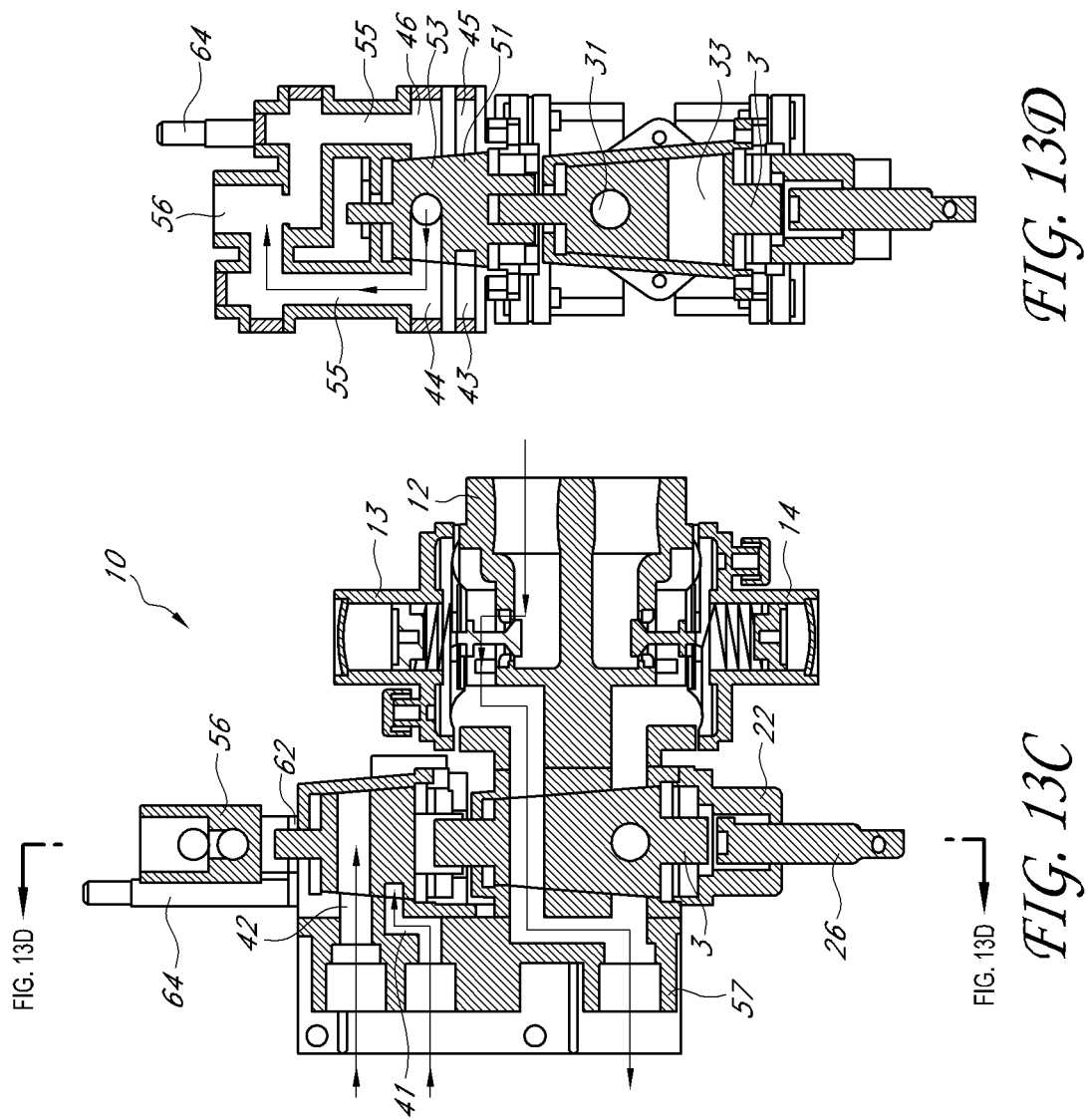

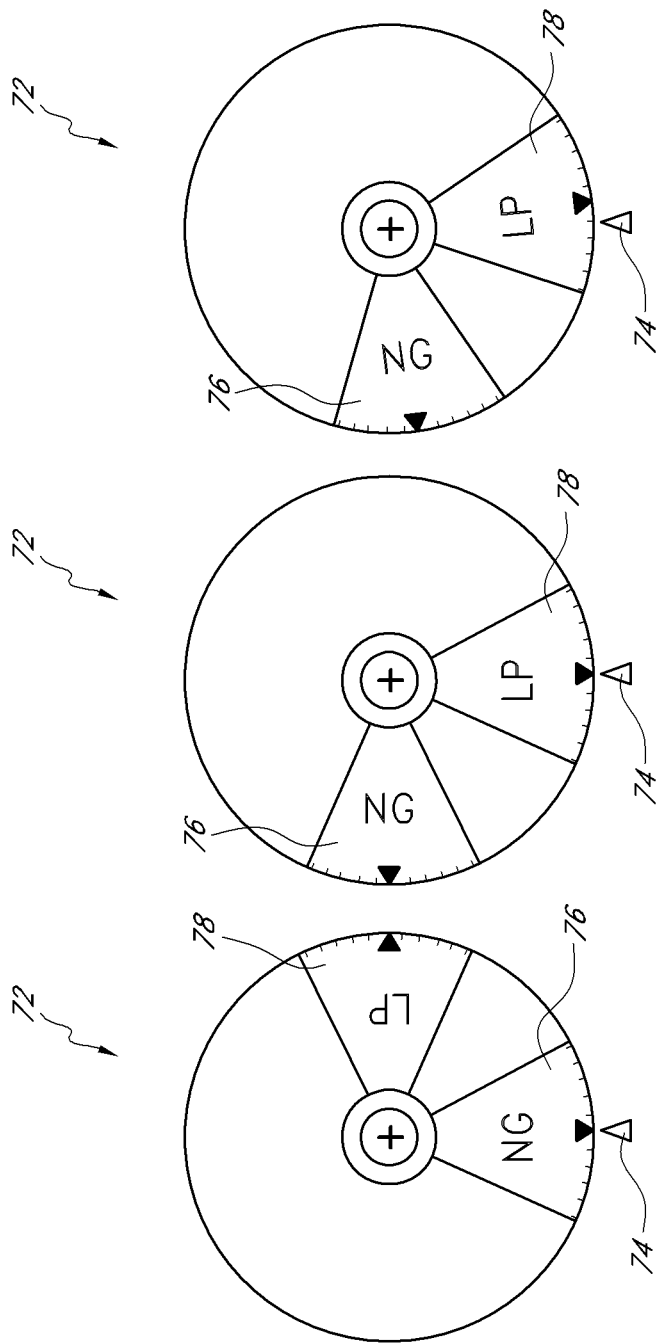

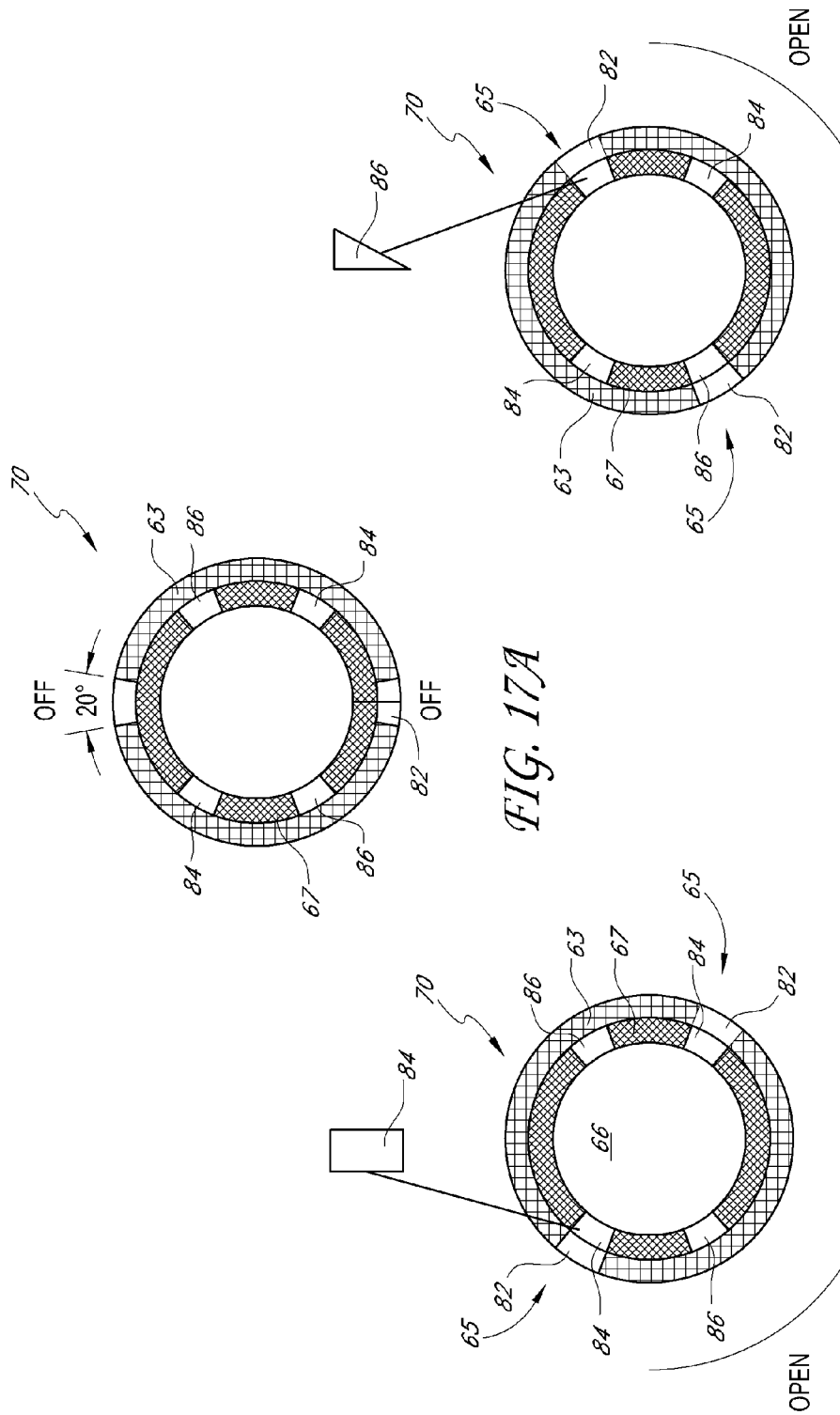

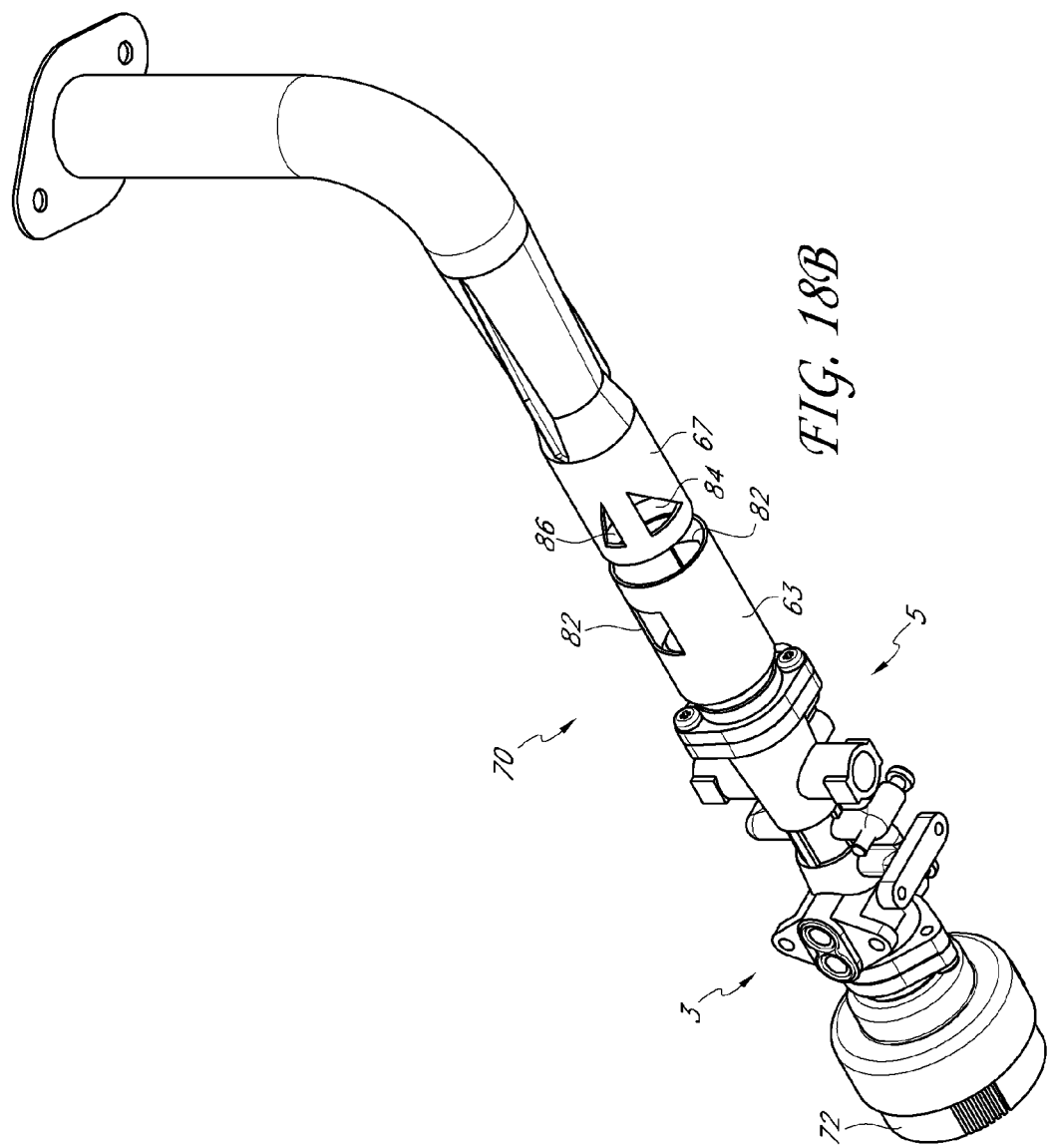

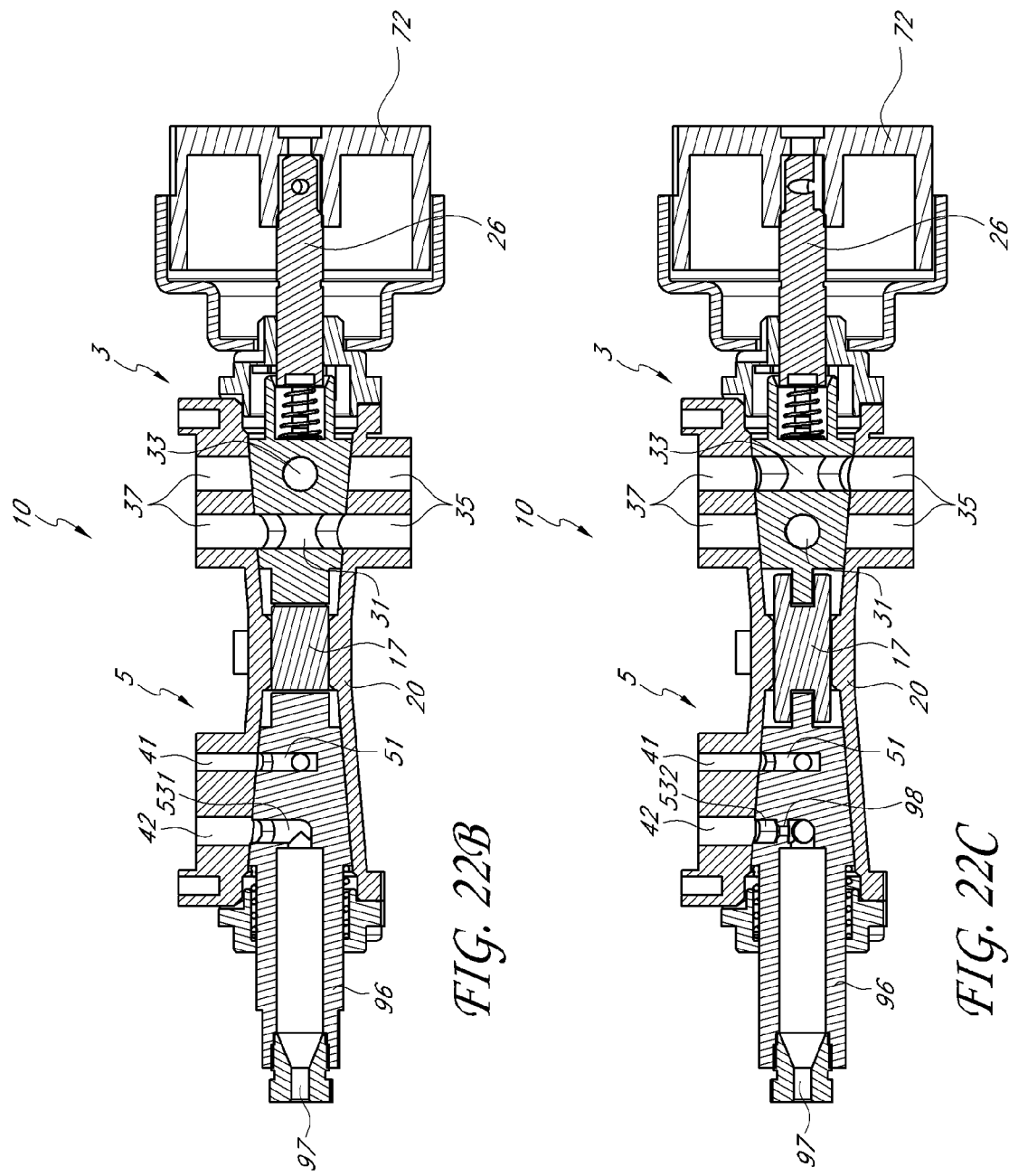

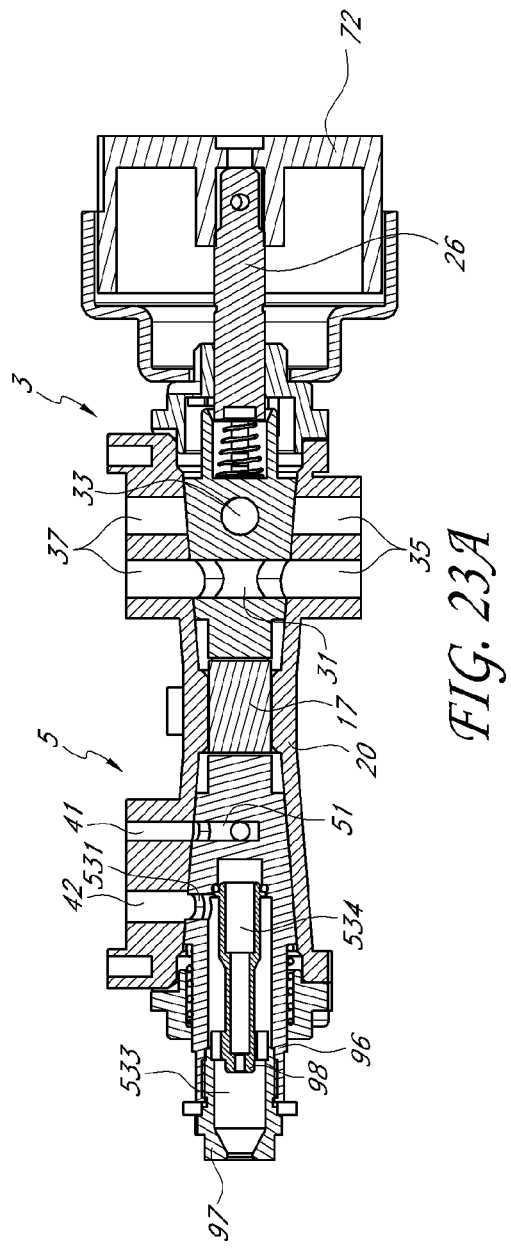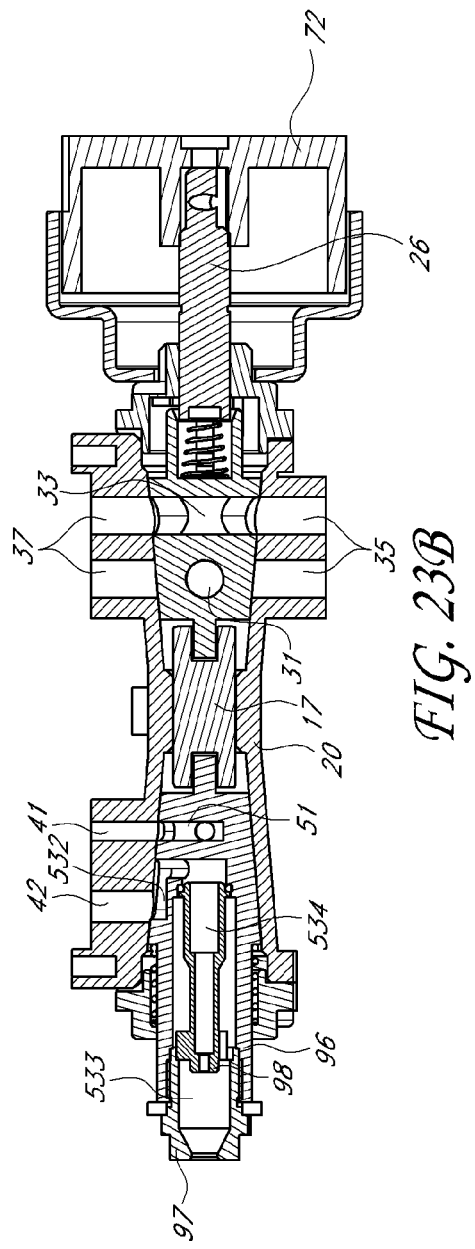

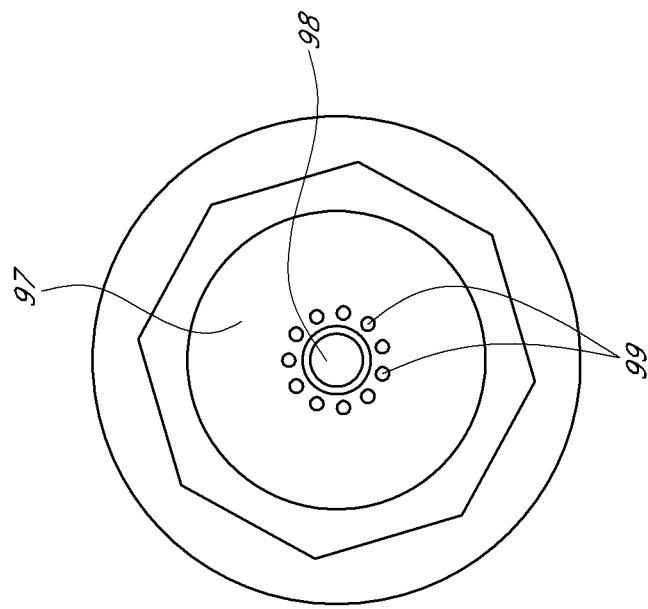
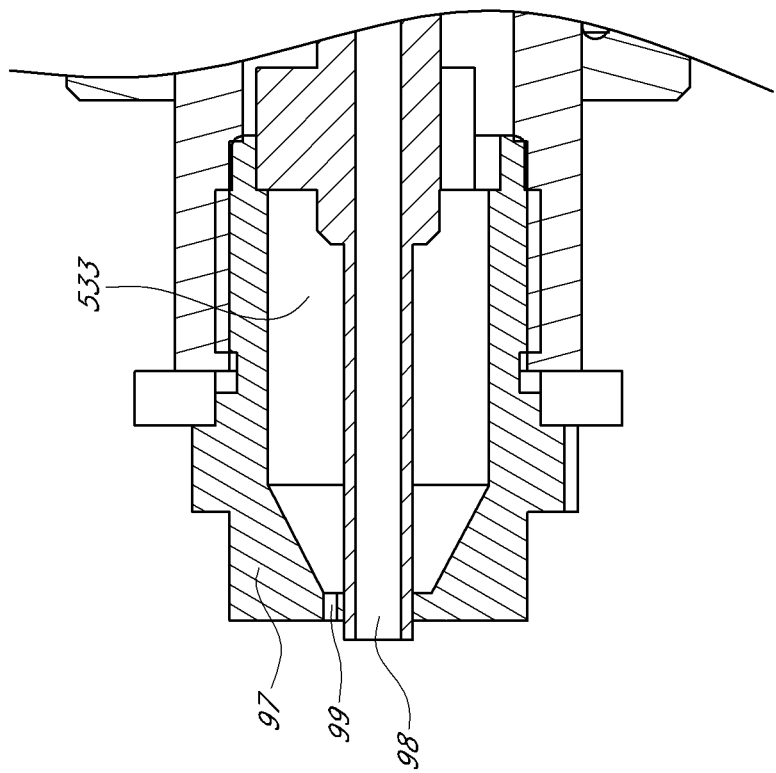

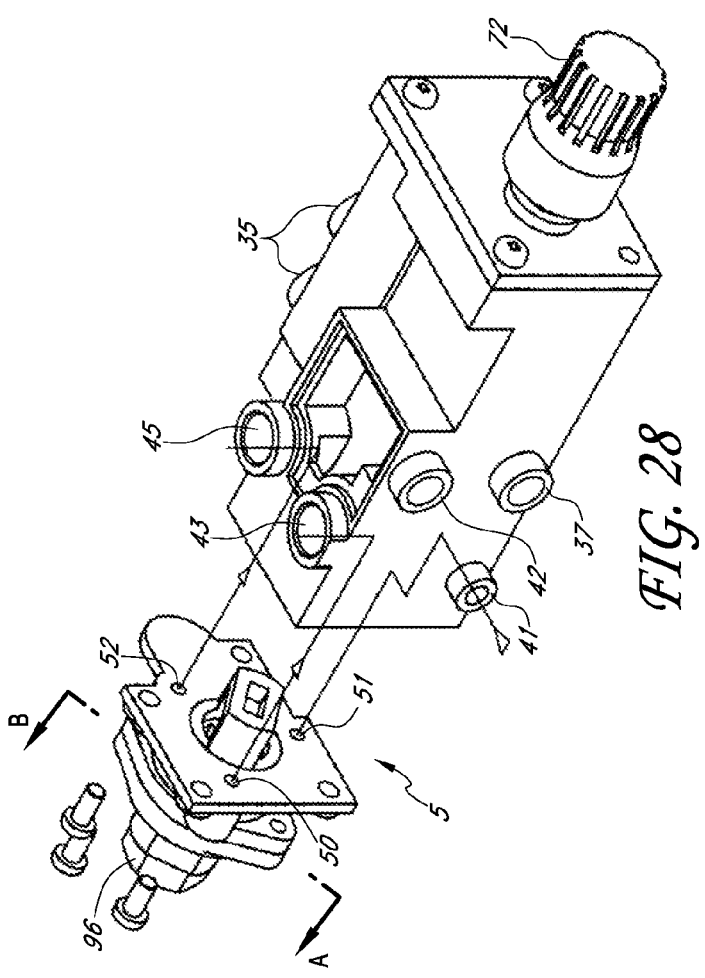

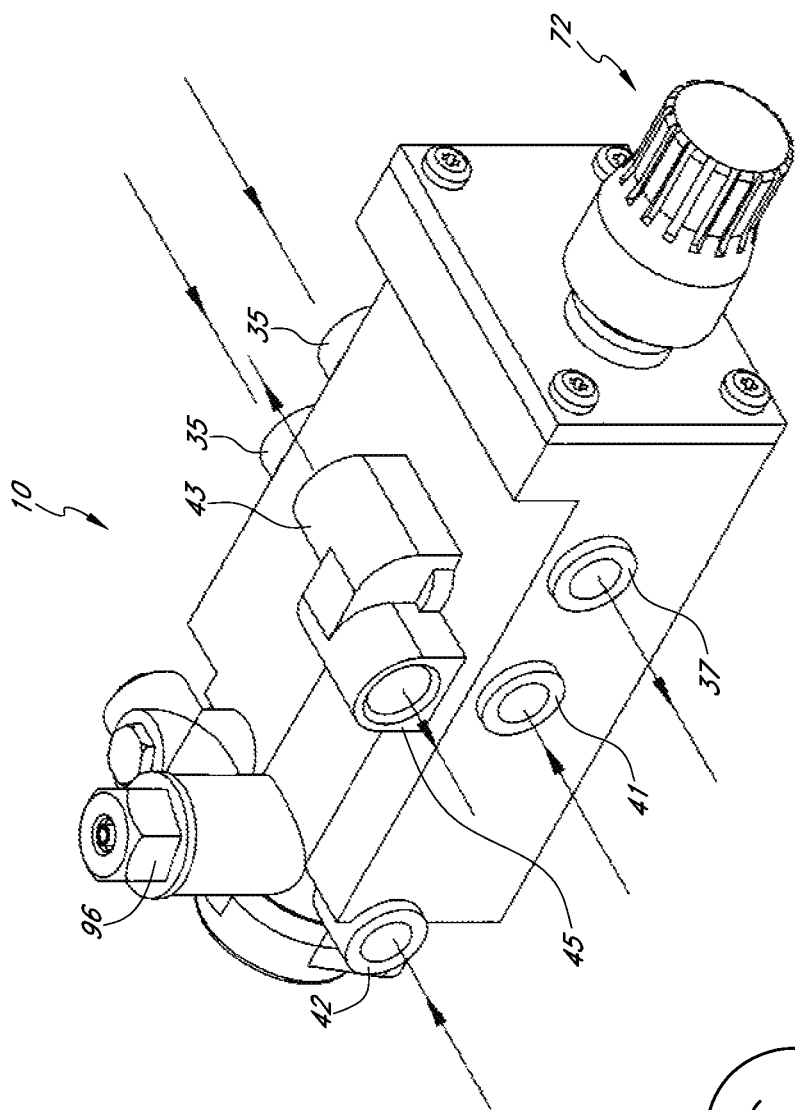
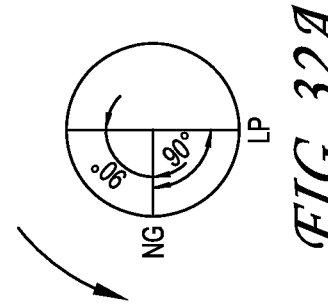
FIG. 32
FIG. 32A

DUAL FUEL HEATING SOURCE

CROSS-REFERENCE TO RELATED APPLICATIONS

This application claims priority to U.S. Provisional Application Nos.: (1) 61/221,521, filed Jun. 29, 2009; (2) 61/221,520, filed Jun. 29, 2009; (3) 61/221,529, filed Jun. 29, 2009; (4) 61/221,528, filed Jun. 29, 2009; (5) 61/287,147, filed Dec. 16, 2009; (6) 61/286,355, filed Dec. 14, 2009; (7) 61/286,354, filed Dec. 14, 2009; (8) 61/286,352, filed Dec. 14, 2009; and (9) 61/304,373, filed Feb. 12, 2010; the entire contents of all of which are hereby incorporated by reference herein and made a part of this specification. The following U.S. Patent Application Nos. are also incorporated by reference herein and made a part of this specification: Ser. No. 11/443,484, filed May 30, 2006 (now U.S. Pat. No. 7,607,426); Ser. No. 11/443,446, filed May 30, 2006 (now U.S. Pat. No. 7,677,236); Ser. No. 11/443,492, filed May 30, 2006 (now U.S. Pat. No. 7,434,447); Ser. No. 11/443,473, filed May 30, 2006; Ser. No. 11/649,976, filed Jan. 5, 2007; Ser. No. 12/047,206, filed Mar. 12, 2008; Ser. No. 12/047,156, filed Mar. 12, 2008; and Ser. No. 12/048,191, filed Mar. 13, 2008.

BACKGROUND OF THE INVENTION

1. Field of the Invention

Certain embodiments disclosed herein relate generally to a heating source for use in a gas appliance particularly adapted for dual fuel use. The gas appliance can include, but is not limited to: heaters, boilers, dryers, washing machines, ovens, fireplaces, stoves, etc.

2. Description of the Related Art

Many varieties of heating sources, such as heaters, boilers, dryers, washing machines, ovens, fireplaces, stoves, and other heat-producing devices utilize pressurized, combustible fuels. Some such devices operate with liquid propane, while others operate with natural gas. However, such devices and certain components thereof have various limitations and disadvantages.

SUMMARY OF THE INVENTION

In some embodiments, a dual fuel heating source can comprise a dual pressure regulating unit for regulating the pressure of either of two different fuels at different pressures, a dual entry valve and an exit valve. The dual pressure regulating unit can comprise a first main body at least partially defining a first flow path and a second flow path; a first regulating unit outlet port; and a second regulating unit outlet port; wherein the first flow path ends in the first regulating unit outlet port and the second flow path ends in the second regulating unit outlet port. The dual entry valve unit can comprise a second main body at least partially defining a third flow path and a fourth flow path; a first valve unit inlet; a second valve unit inlet; a first valve unit outlet port; and a second valve unit outlet port. The exit valve can comprise a third main body at least partially defining a fifth flow path, a sixth flow path, a seventh flow path and an eighth flow path; a first exit valve inlet; a second exit valve inlet; a first exit valve outlet port; a second exit valve outlet port; a third exit valve outlet port; and a fourth exit valve outlet port. Both the dual pressure regulating unit and the exit valve can be connected to the dual entry valve unit in different positions.

According to some embodiments, the second main body can define a planar interface surface surrounding the first valve unit outlet port and the second valve unit outlet port and/or the exit valve can be connected to the dual entry valve unit along a rotational axis wherein the exit valve and the dual entry valve unit both rotate about the rotational axis.

In some embodiments, the dual fuel heating source can further comprise a control valve. The control valve can be configured to divide a flow of fuel from the dual entry valve unit into two separate flows and is configured to control the flow of fuel from the dual entry valve unit to the exit valve. According to some embodiments, the control valve system can comprise at least one of a manual valve, and an automatic valve. In some further embodiments, the automatic valve has a corresponding planar interface surface for connecting to the dual entry valve. In some embodiments which have both the automatic valve and the manual valve, the manual valve can be connected to the automatic valve. In some embodiments, the dual fuel heating source can be configured to be interchangeable between the automatic valve and the manual valve.

According to some embodiments, the dual fuel heating source can further comprise a manifold having a corresponding planar interface surface for connecting to the dual entry valve and the exit valve, wherein the manifold has three channels and combines two outlets of the dual entry valve into one channel through the manifold and maintains two inlets on the exit valve as two separate channels through the manifold.

In some embodiments, a dual fuel heating source can comprise a dual pressure regulating unit, a dual entry valve unit and a manifold. The dual pressure regulating unit can comprise a first main body at least partially defining a first flow path and a second flow path; a first regulating unit outlet port; and a second regulating unit outlet port. The dual entry valve unit can comprise a second main body at least partially defining a third flow path and a fourth flow path; a first valve unit inlet; a second valve unit inlet; a first valve unit outlet; and a second valve unit outlet. The manifold can be configured for converging the two flow paths of the dual entry valve unit into one.

According to some embodiments, the dual fuel heating source can further comprise an exit valve. The exit valve can comprise a third main body at least partially defining a fifth flow path, a sixth flow path, a seventh flow path and an eighth flow path; a first exit valve inlet; a second exit valve inlet; a first exit valve outlet port; a second exit valve outlet port; a third exit valve outlet port; and a fourth exit valve outlet port. In some embodiments, both the dual pressure regulating unit and the exit valve are connected to the dual entry valve unit in different positions.

In certain embodiments, the second main body can define a planar interface surface surrounding the first valve unit outlet port and the second valve unit outlet port. In some embodiments the exit valve can be connected to the dual entry valve unit along a rotational axis wherein the exit valve and the dual entry valve unit both rotate about the rotational axis. According to some embodiments, the dual fuel heating source can further comprise a control valve. The control valve can be configured to divide a flow of fuel from the dual entry valve unit into two separate flows. The control valve can comprises at least one of a manual valve, and an automatic valve. In some embodiments, the manifold can have a corresponding planar interface surface for connecting to the dual entry valve.

In some embodiments, a dual fuel heating source can comprise a dual entry valve unit, an exit valve and a control valve. The dual entry valve unit can comprise a main body at least partially defining a first flow path and a second flow path; a first valve unit inlet; a second valve unit inlet; a first valve unit outlet; and a second valve unit outlet. The exit valve can comprise a second main body at least partially defining a third flow path, a fourth flow path, a fifth flow path and an sixth flow path; a first exit valve inlet; a second exit valve inlet; a first exit valve outlet port; a second exit valve outlet port; a third exit valve outlet port; and a fourth exit valve outlet port. The a control valve can be configured to divide a flow of fuel from the dual entry valve unit into two separate flows and is configured to control the flow of fuel from the dual entry valve unit to the exit valve.

According to some embodiments, the first main body can define a planar interface surface surrounding the first valve unit outlet port and the second valve unit outlet port and the second main body defining co-planar interface surface surrounding the first exit valve inlet and the second exit valve inlet. In some embodiments, the control valve can comprise at least one of a manual valve, and an automatic valve. The automatic valve can comprise at least one of an AC solenoid valve, a DC solenoid valve, a thermostat and a flame adjustment motor. In some embodiments, the automatic valve can have a corresponding planar interface surface for connecting to the dual entry valve and the exit valve. Some embodiments comprise both the automatic valve and the manual valve and the manual valve can be connected to the automatic valve.

According to some embodiments, the dual fuel heating source can further comprise a dual pressure regulating unit. The dual pressure regulating unit can comprise a third main body at least partially defining a seventh flow path and an eighth flow path; a first regulating unit outlet port; and a second regulating unit outlet port.

According to certain embodiments a dual fuel heating system can comprise a first valve system having a first position and a second position and a second valve system. The first valve system can comprise an upper valve and an upper valve body, the first position and the second position of the first valve system defining a first flow path and a second flow path through the upper valve body. The first valve system can comprise a lower valve and a lower valve body, the first position and the second position of the first valve system each defining two different flow paths through the lower valve body. The first valve system can comprise a connecting rod coupling the movement of the upper valve and the lower valve.

In some embodiments, the flow paths through the upper valve body and the lower valve body are not connected within the first valve system and wherein selecting between the first and second positions of the first valve system determines the flow path through the dual fuel modular heating system.

In some embodiments, the second valve system divides the flow from the upper valve body into two separate flows and is configured to control the flow of fuel from the upper valve body to the lower valve body. The second valve system can comprise at least one of a manual valve, and an automatic valve.

In certain embodiments, the automatic valve is configured to directly connect to the first valve system. In embodiments comprising both the automatic valve and the manual valve, the manual valve can be configured to directly connect to the automatic valve.

Certain embodiments can further comprise a manifold directly connected to the first valve system, wherein the manifold has three channels and combines two outlets of the upper valve into one channel through the manifold and maintains two inlets on the lower valve as two separate channels through the manifold. Certain embodiments comprise other types of manifolds.

Some embodiments further comprise a nozzle integral with the first valve system, wherein the nozzle comprises part of the lower valve. Some embodiments further comprise a pressure regulator comprising, a first regulator for regulating a first fuel and a second regulator for regulating a second fuel, wherein the pressure regulator is configured to be directly connected to the upper valve body. In certain embodiments the system is configured to be interchangeable between the automatic valve and the manual valve.

BRIEF DESCRIPTION OF THE DRAWINGS

Various embodiments are depicted in the accompanying drawings for illustrative purposes, and should in no way be interpreted as limiting the scope of the inventions.

FIG. 12A is a perspective view of an air shutter coupled with a fuel delivery line in a first operational configuration.

FIG. 12B is a perspective view of an air shutter coupled with a fuel delivery line in a second operational configuration.

FIG. 12C is a partially dissembled view of a gas log insert.

FIGS. 13A-B are top and a side cross-sectional views, respectively, of another embodiment of a heating source in a first position.

FIGS. 13C-D are top and a side cross-sectional views, respectively, of the heating source of FIGS. 13A-B in a second position.

FIGS. 15A-C show different positions of a user interface surface.

FIGS. 17A-C show different positions of an air shutter.

FIG. 18B is an exploded view of the air shutter of FIG. 18A.

FIG. 22B is a cross-sectional view of the heating source of FIG. 22A in a first position.

FIG. 22C is a cross-sectional view of the heating source of FIG. 22A in a second position.

FIG. 23A is a cross-sectional view is a cross-sectional view of the heating source of FIG. 23 in a first position.

FIG. 23B is a cross-sectional view of the heating source of FIG. 23 in a second position.

FIG. 24 is a detail view of another embodiment of a nozzle from a heating source.

FIG. 24A is a detail view of the end of the nozzle in FIG. 24.

FIG. 28 is a partially dissembled view of the heating source of FIG. 27.

FIGS. 28A and B are cross-sectional views of a portion of the heating source of FIG. 28 taken along line A-B and showing a first and second configuration, respectively.

FIG. 32 shows a perspective view of another embodiment of a heating source.

FIG. 32A schematically illustrates the positions of an internal shaft of the heating source of FIG. 32.

DETAILED DESCRIPTION OF THE PREFERRED EMBODIMENT

Many varieties of space heaters, fireplaces, stoves, ovens, boilers, fireplace inserts, gas logs, and other heat-producing devices employ combustible fuels, such as liquid propane and natural gas. These devices generally are designed to operate with a single fuel type at a specific pressure. For example, as one having skill in the art would appreciate, some gas heaters that are configured to be installed on a wall or a floor operate with natural gas at a pressure in a range from about 3 inches of water column to about 6 inches of water column, while others operate with liquid propane at a pressure in a range from about 8 inches of water column to about 12 inches of water column.

In many instances, the operability of such devices with only a single fuel source is disadvantageous for distributors, retailers, and/or consumers. For example, retail stores often try to predict the demand for natural gas units versus liquid propane units over a given season, and accordingly stock their shelves and/or warehouses with a percentage of each variety of device. Should such predictions prove incorrect, stores can be left with unsold units when the demand for one type of unit was less than expected, while some potential customers can be left waiting through shipping delays or even be turned away empty-handed when the demand for one type of unit was greater than expected. Either case can result in financial and other costs to the stores. Additionally, some consumers can be disappointed to discover that the styles or models of stoves, fireplaces or other device, with which they wish to improve their homes, are incompatible with the fuel sources with which their homes are serviced.

Certain advantageous embodiments disclosed herein reduce or eliminate these and other problems associated with devices having heating sources that operate with only a single type of fuel source. Furthermore, although certain of the embodiments described hereafter are presented in the context of vent-free heating systems, the apparatus and devices disclosed and enabled herein can benefit a wide variety of other applications and appliances.

Figure 1:
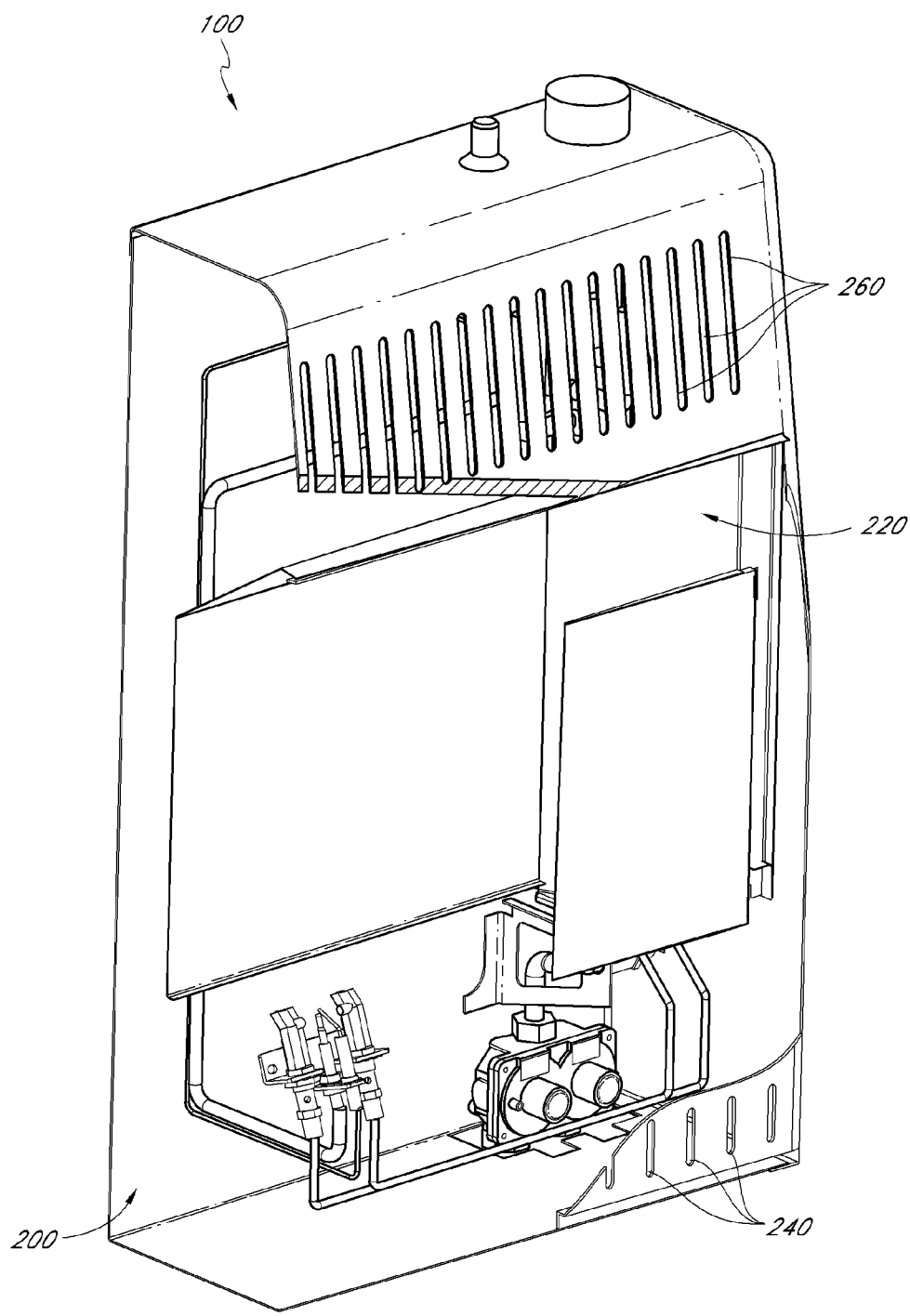
FIG. 1 is a perspective cutaway view of a portion of one embodiment of a heater configured to operate using either a first fuel source or a second fuel source.

FIG. 1 illustrates one embodiment of a heater 100. The heater 100 can be a vent-free infrared heater, a vent-free blue flame heater, or some other variety of heater, such as a direct vent heater. Some embodiments include boilers, stoves, dryers, fireplaces, gas logs, etc. Other configurations are also possible for the heater 100. In many embodiments, the heater 100 is configured to be mounted to a wall or a floor or to otherwise rest in a substantially static position. In other embodiments, the heater 100 is configured to move within a limited range. In still other embodiments, the heater 100 is portable.

The heater 100 can comprise a housing 200. The housing 200 can include metal or some other suitable material for providing structure to the heater 100 without melting or otherwise deforming in a heated environment. In the illustrated embodiment, the housing 200 comprises a window 220, one or more intake vents 240 and one or more outlet vents 260. Heated air and/or radiant energy can pass through the window 220. Air can flow into the heater 100 through the one or more intake vents 240 and heated air can flow out of the heater 100 through the outlet vents 260.

Figure 2:
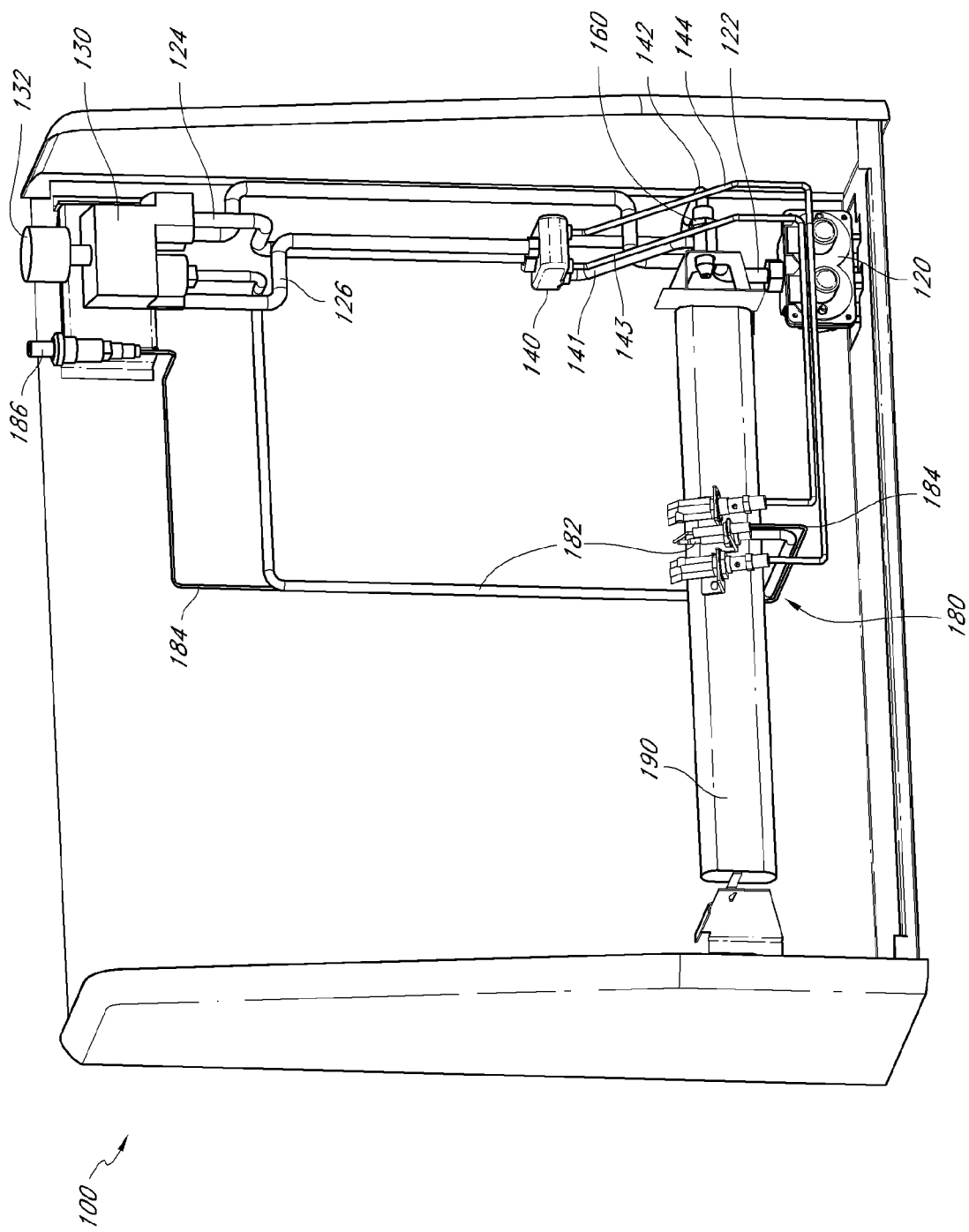
FIG. 2 is a perspective cutaway view of the heater of FIG. 1.

With reference to FIG. 2, in certain embodiments, the heater 100 includes a regulator 120. The regulator 120 can be coupled with an output line or intake line, conduit, or pipe 122. The intake pipe 122 can be coupled with a heater control valve 130, which, in some embodiments, includes a knob 132. As illustrated, the heater control valve 130 is coupled to a fuel supply pipe 124 and an oxygen depletion sensor (ODS) pipe 126, each of which can be coupled with a fluid flow controller 140. The fluid flow controller 140 can be coupled with a first nozzle line 141, a second nozzle line 142, a first ODS line 143, and a second ODS line 144. In some embodiments, the first and the second nozzle lines 141, 142 are coupled with a nozzle 160, and the first and the second ODS lines 143, 144 are coupled with an ODS 180. In some embodiments, the ODS comprises a thermocouple 182, which can be coupled with the heater control valve 130, and an igniter line 184, which can be coupled with an igniter switch 186. Each of the pipes 122, 124, and 126 and the lines 141-144 can define a fluid passageway or flow channel through which a fluid can move or flow.

In some embodiments, including the illustrated embodiment, the heater 100 comprises a burner 190. The ODS 180 can be mounted to the burner 190, as shown. The nozzle 160 can be positioned to discharge a fluid, which may be a gas, liquid, or combination thereof into the burner 190. For purposes of brevity, recitation of the term "gas or liquid" hereafter shall also include the possibility of a combination of a gas and a liquid. In addition, as used herein, the term "fluid" is a broad term used in its ordinary sense, and includes materials or substances capable of fluid flow, such as gases, liquids, and combinations thereof.

Where the heater 100 is a dual fuel heater, either a first or a second fluid is introduced into the heater 100 through the regulator 120. Still referring to FIG. 2, the first or the second fluid proceeds from the regulator 120 through the intake pipe 122 to the heater control valve 130. The heater control valve 130 can permit a portion of the first or the second fluid to flow into the fuel supply pipe 124 and permit another portion of the first or the second fluid to flow into the ODS pipe 126. From the heater control valve 130, the first or the second fluid can proceed to the fluid flow controller 140. In many embodiments, the fluid flow controller 140 is configured to channel the respective portions of the first fluid from the fuel supply pipe 124 to the first nozzle line 141 and from the ODS pipe 126 to the first ODS line 143 when the fluid flow controller 140 is in a first state, and is configured to channel the respective portions of the second fluid from the fuel supply pipe 124 to the second nozzle line 142 and from the ODS pipe 126 to the second ODS line 144 when the fluid flow controller 140 is in a second state.

In certain embodiments, when the fluid flow controller 140 is in the first state, a portion of the first fluid proceeds through the first nozzle line 141, through the nozzle 160 and is delivered to the burner 190, and a portion of the first fluid proceeds through the first ODS line 143 to the ODS 180. Similarly, when the fluid flow controller 140 is in the second state, a portion of the second fluid proceeds through the nozzle 160 and another portion proceeds to the ODS 180. As discussed in more detail below, other configurations are also possible.

A heating assembly or heating source 10 that can be used with the heater 100, or other gas appliances, will now be described. The heating source 10 can be configured such that the installer of the gas appliance can connect the assembly to one of two fuels, such as either a supply of natural gas (NG) or a supply of propane (LP) and the assembly will desirably operate in the standard mode (with respect to efficiency and flame size and color) for either gas.

Figure 3:
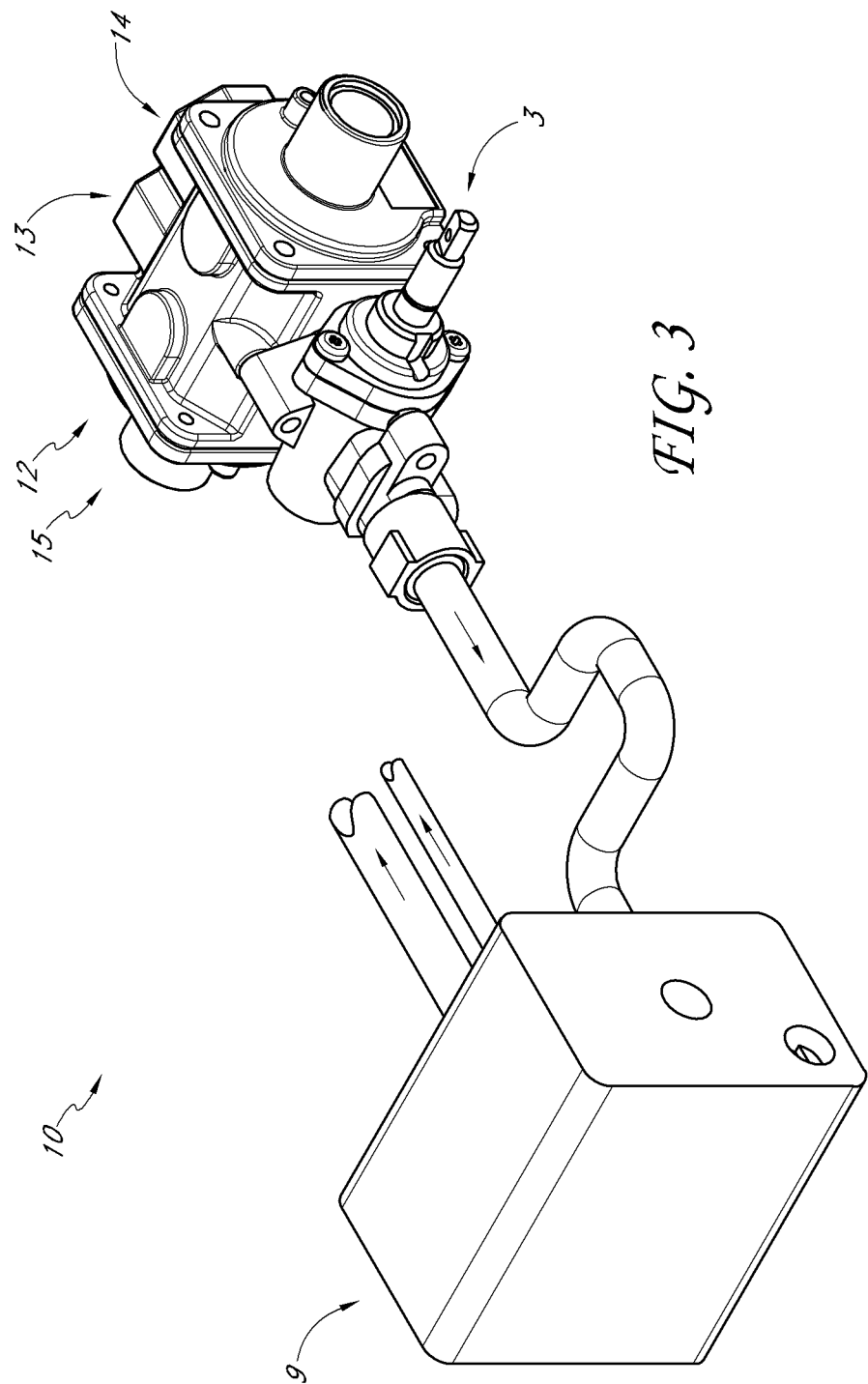
FIG. 3 is perspective view of one embodiment of a heating source.
Figure 4:
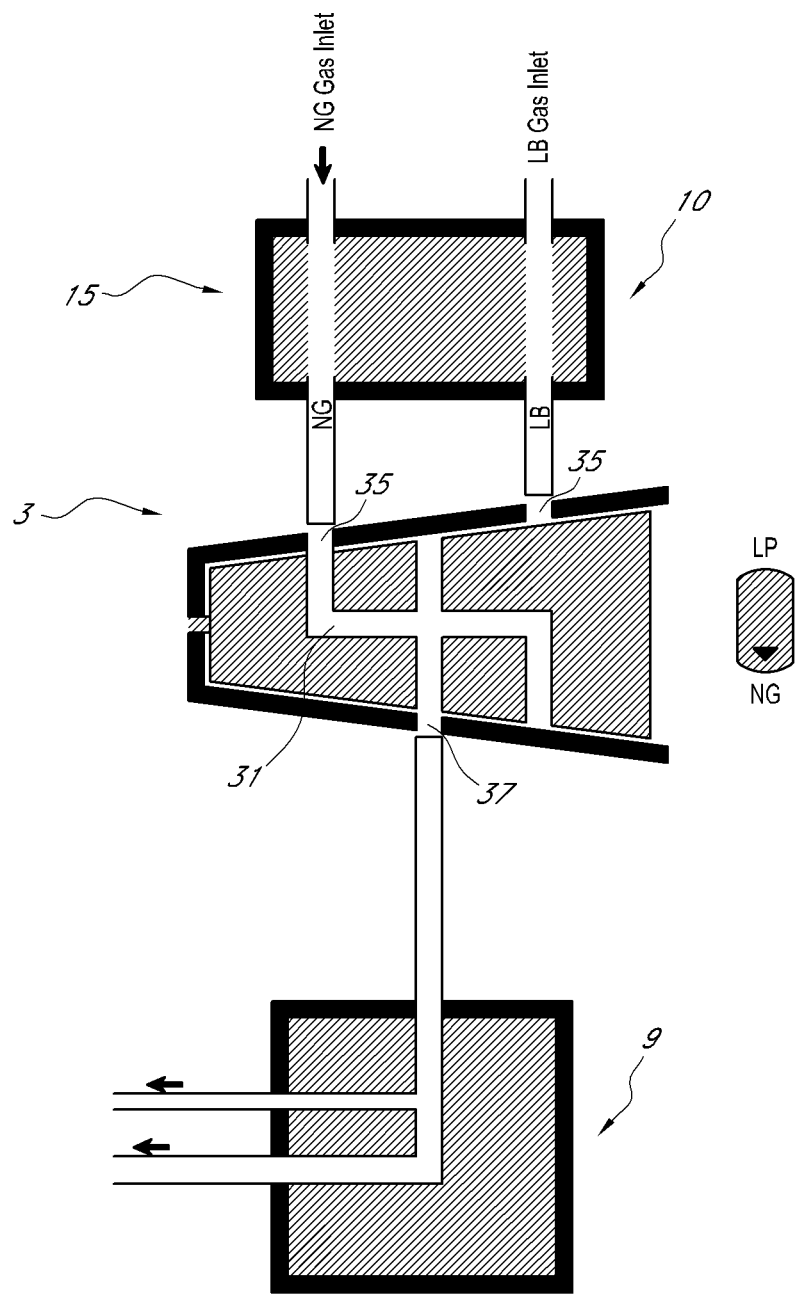
FIG. 4 is a schematic view of a heating source wherein natural gas is selected.
Figure 5:
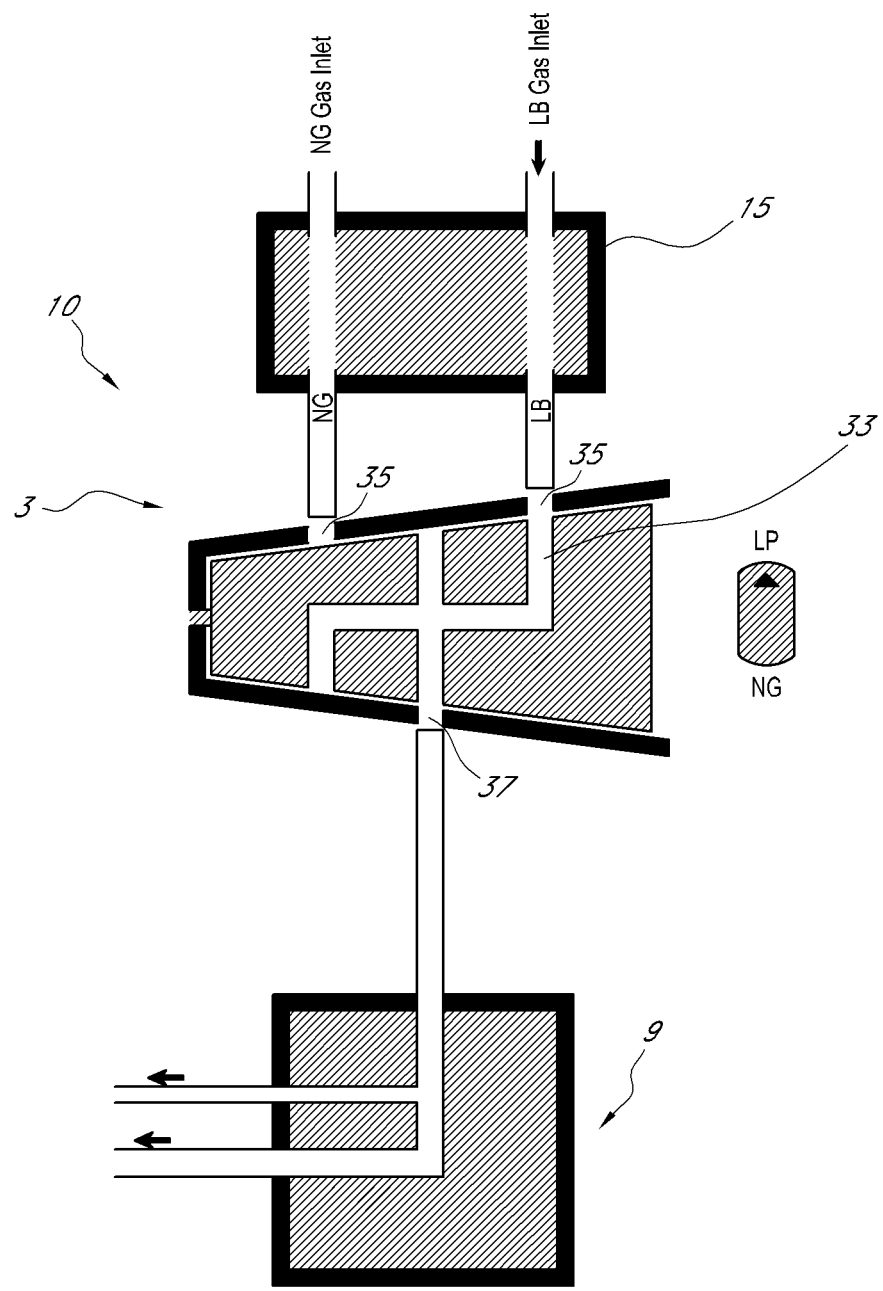
FIG. 5 is a schematic view of a heating source wherein liquid propane is selected.

Looking at FIGS. 3-5, a heating source 10 can comprise a fuel selector valve 3. The fuel selector valve 3 can be for selecting between two different fuels. The fuel selector valve 3 can have a first mode configured to direct a flow of a first fuel (such as NG) in a first path through the fuel selector valve 3 and a second mode configured to direct a flow of a second fuel (such as LP) in a second path through the fuel selector valve 3. For example, the fuel selector valve 3 can have a first mode configured to permit a flow of a first fuel (such as NG) through the fuel selector valve 3 and to prevent a flow of a second fuel (such as LP) therethrough and a second mode configured to permit a flow of the second fuel through the fuel selector valve 3 and to prevent a flow of the first fuel therethrough. In some embodiments, including the illustrated embodiment, the first and second modes comprise first and second positions of the fuel selector valve 3. The fuel selector valve 3 can also be used to perform other functions as will be described later on in this specification.

The heating assembly 10 can further comprise first and second fuel source connections 15. The heating assembly 10 can connect to one of two different fuel sources, each fuel source having a different type of fuel therein. For example, one fuel source can be a cylinder of LP and another fuel source can be a NG fuel line in a house, connected to a city gas line. In some embodiments, the first and second fuel source connections 15 comprise first and second pressure regulators 13, 14. In some embodiments, the first and second pressure regulators 13, 14 are separate and in some embodiments, they are connected in a joint regulator unit 12. In still other embodiments, the pressure regulator can be adjustable so that one fuel source connection can be used for different fuels.

In some embodiments, including the illustrated embodiment, the fuel selector valve 3 can have a first position configured for permitting a flow of the first fuel from the first pressure regulator 13 through the fuel selector valve 3 and preventing a flow of the second fuel therethrough; and a second position configured for permitting a flow of the second fuel from the second pressure regulator 14 through the fuel selector valve 3 and preventing a flow of the first fuel therethrough.

The pressure regulators 13, 14 can function in a similar manner to those discussed in U.S. application Ser. No. 11/443,484, filed May 30, 2006, now U.S. Pat. No. 7,607,426, incorporated herein by reference and made a part of this specification; with particular reference to the discussion on pressure regulators at columns 3-9 and FIGS. 3-7 of the issued patent. The regulator unit 12 can incorporate the two separate pressure regulators 13, 14 into one unit, maintaining separate inlets and outlets for each pressure regulator 13, 14 through the unit 12, resulting in a two in-two out configuration.

The pressure regulators 13, 14 can be preset at the manufacturing site, factory, or retailer to operate with selected fuel sources. In many embodiments, the regulator unit 12 includes one or more caps to prevent consumers from altering the pressure settings selected by the manufacturer. Optionally, the heater 100 and/or the regulator unit 12 can be configured to allow an installation technician and/or user or customer to adjust the heater 100 and/or the regulator unit 12 to selectively regulate the heater unit for a particular fuel source.

In some embodiments, the pressure regulators 13, 14 are selectively and independently operable which are independently operated depending on the fuel source, such as, but not limited to, natural gas and propane. In some embodiments, the first pressure regulator 13 comprises a first spring-loaded valve or valve assembly and the second pressure regulator 14 comprises a second spring-loaded valve or valve assembly.

The pressure settings can be set by tensioning of a screw that allows for flow control of the fuel at a predetermined pressure or pressure range and selectively maintains an orifice open so that the fuel can flow through spring-loaded valve or valve assembly of the pressure regulator. If the pressure exceeds a threshold pressure, a plunger seat can be pushed towards a seal ring to seal off the orifice, thereby closing the pressure regulator.

The pressure selected depends at least in part on the particular fuel used, and may desirably provide for safe and efficient fuel combustion and reduce, mitigate, or minimize undesirable emissions and pollution. In some embodiments, the first pressure regulator 13 can be set to provide a pressure in the range from about 3 inches of water column to about 6 inches of water column, including all values and sub-ranges therebetween. In some embodiments, the threshold or flow-terminating pressure is about 3 inches of water column, about 4 inches of water column, about 5 inches of water column, or about 6 inches of water column.

In some embodiments, the second pressure regulator 14 can be configured to provide a second pressure in the range from about 8 inches of water column to about 12 inches of water column, including all values and sub-ranges therebetween. In some embodiments, the second threshold or flow-terminating pressure is about equal to 8 inches of water column, about 9 inches of water column, about 10 inches of water column, about 11 inches of water column, or about 12 inches of water column.

When natural gas is the first fuel and propane is the second fuel, the first pressure, pressure range and threshold pressure are less than the second pressure, pressure range and threshold pressure. Stated differently, in some embodiments, when natural gas is the first fuel and propane is the second fuel, the second pressure, pressure range and threshold pressure are greater than the first pressure, pressure range and threshold pressure.

Advantageously, the regulator unit 12, by comprising first and second pressure regulators 13, 14 which are selectively and independently operable, facilitates a single heater unit being efficaciously used with different fuel sources. This desirably saves on inventory costs, offers a retailer or store to stock and provide a single unit that is usable with more than one fuel source, and permits customers the convenience of readily obtaining a unit which operates with the fuel source of their choice. The particular fuel pressure operating range is desirably factory-preset to provide an adaptable and versatile heater.

The regulator unit 12, like the other parts of the heating assembly 10, can comprise a wide variety of suitably durable materials. These include, but are not limited to, metals, alloys, ceramics, plastics, among others. In one embodiment, the regulator unit 12 comprises a metal or alloy such as aluminum or stainless steel. Various suitable surface treatments and finishes may be applied with efficacy, as needed or desired.

In certain embodiments, the regulator unit 12, like the other parts of the heating assembly 10, can be fabricated or created using a wide variety of manufacturing methods, techniques and procedures. These include, but are not limited to, casting, molding, machining, laser processing, milling, stamping, laminating, bonding, welding, and adhesively fixing, among others.

The heating source 10 can have: 1) two pressure regulators 13, 14, each configured to connect to a different fuel (such as NG on one and LP on the other) and 2) a fuel selector valve 3, with no pipes in-between 1 and 2, as shown in FIG. 3. The fuel selector valve 3 can permit the flow of fuel from one of the two pressure regulators, through the fuel selector valve 3 and into additional components 9. The additional components 9 can be, for example, the heater control valve 130, the fluid flow controller 140, the nozzle 160, etc. In some embodiments, the additional components 9 can comprise a control valve which comprises at least one of a manual valve, a thermostat valve, an AC solenoid, a DC solenoid and a flame adjustment motor. In various embodiments, the additional components 9 may or may not comprise part of the heating source 10. The additional components 9 can be configured to use the fuel, such as for combustion, and/or to direct one or more lines of fuel to other uses or areas of the heater 100 or other appliance.

FIGS. 4 and 5 show schematic diagrams of a heating source 10 wherein different fuels, NG or LP are selected. A rotating valve is represented where in a first position a passageway 31 allows the first gas, shown as NG in FIG. 4, to pass through the selector valve 3 and in a second position a passageway 33 allows the second gas, shown as LP in FIG. 5, to pass through the selector valve 3. Also shown are two inlets 35 and one outlet 37. The reverse could also be true in that the selector valve can have one inlet and two outlets. In some embodiments, there are two inlets 35 and two outlets 37, wherein each inlet 35 corresponds to a particular outlet 37. In some embodiments, the entire passageway 31, 33 rotates between an open and a closed position wherein the passageway is either connected or disconnected to an inlet 35 and an outlet 37. In other embodiments, a segment of the passageway 31, 33 or a door on the inlet 35 or outlet 37 moves to open or close the passageway 31, 33, inlet 35 or outlet 37.

The fuel selector valve 3 provides many benefits. For example, the fuel selector valve 3 can allow the heating source 10 to be configured such that connecting one fuel to its designated pressure regulator and selecting another with the fuel selector valve 3 prevents fuel from flowing through the dual fuel heating source 10. In many prior art designs, connecting one fuel and selecting another would potentially allow the fuel to flow, albeit at a configuration designed for another fuel. This could result in a dangerous condition, for example, an elevated flame.

In some embodiments the fuel selector valve can have additional positions. For example, the fuel selector valve can select between two different fuels and between a higher and a lower BTU level. This may be necessary where the heater or other appliance has a low BTU level and a high BTU level. A different amount of fuel may be required in one level than the other which may require a larger opening for flow through the valve. For example, a 40,000 BTU level and a 20,000 BTU can require substantially different amounts of fuel and the fuel selector valve can have different positions that can correspond to different sized openings or channels through the valve.

Figure 6:
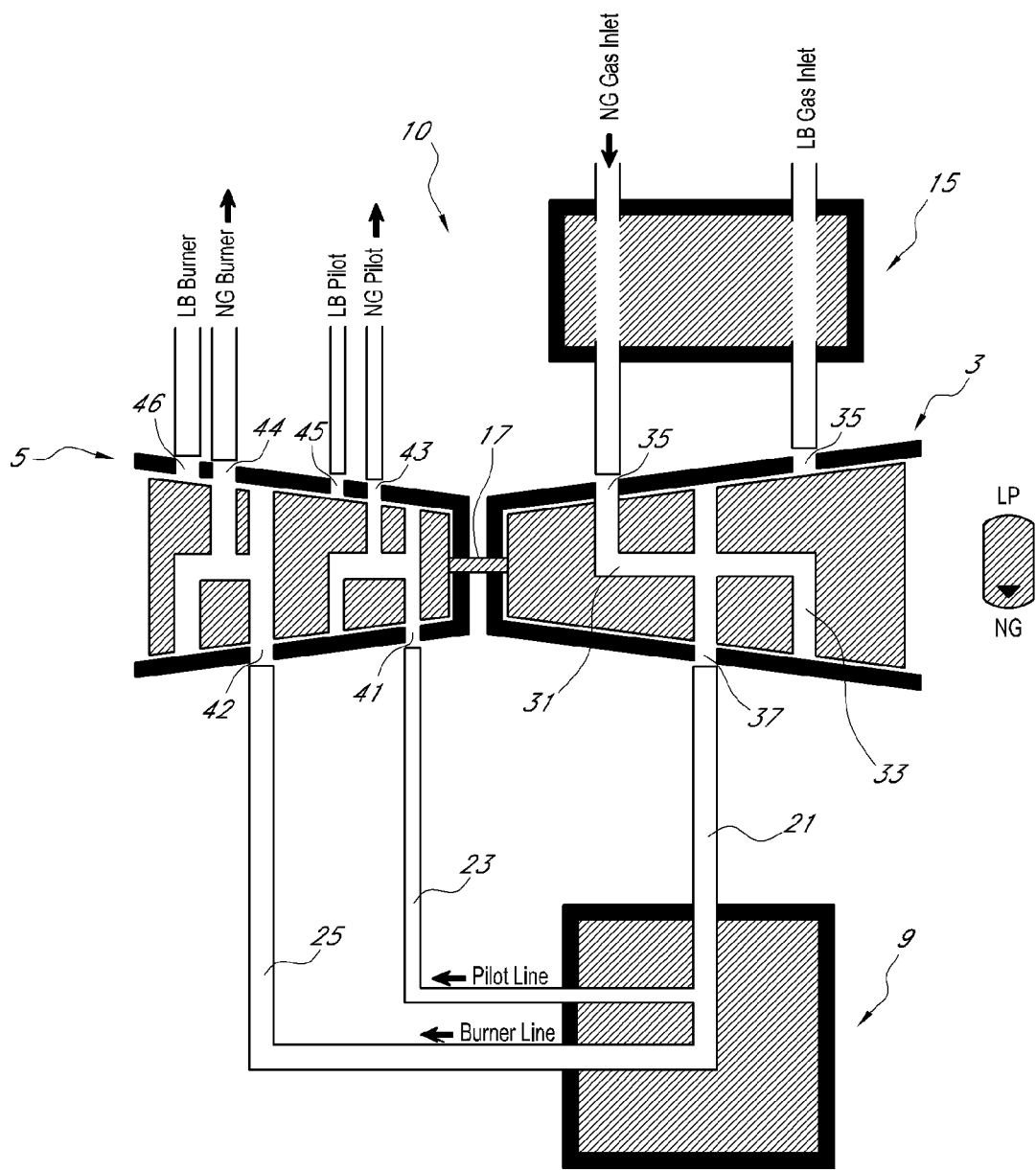
FIG. 6 is a schematic view of a heating source having a fuel selector valve and an outlet valve wherein natural gas is selected.

Turning now to FIG. 6, another embodiment of a heating source 10 will be described. The heating source 10 can comprise an outlet valve 5. The outlet valve 5 can have a first inlet 41 and a second inlet 42. According to some embodiments, the outlet valve 5 further has first and second sets of outlets, wherein each inlet 41 is configured to establish fluid communication with one of either of two outlets 43, 45 and inlet 42 is configured to establish fluid communication with one of either of two outlets 44, 46. As can be seen in FIG. 6, inlet 41 is in fluid communication with outlet 43 but, if the outlet valve 5 were to be rotated, fluid communication would be disconnected between inlet 41 and outlet 43 and would be established between inlet 41 and outlet 45. It can also be seen that the selection of inlet 41 with outlet 43 is also tied to the selection of inlet 42 and outlet 44, as is the selection of inlet 41 with outlet 45 tied to the selection of inlet 42 and outlet 46.

In this way, the heating source 10 can output a fluid flow to a particular part of the heater 100 (or other gas appliance). For example, the outlet valve 5 could select between directing fuel towards a first burner nozzle configured for a first fuel or a second burner nozzle configured for a second fuel. The burner nozzles could be different sizes depending on the particular fuel and therefore not particularly well suited for the other fuel. Similarly, the outlet valve 5 could select between directing fuel towards a first pilot light or a first oxygen depletion sensor configured for a first fuel or a second pilot light or a second oxygen depletion sensor configured for a second fuel. Alternatively, the outlet valve 5 could direct fuel to particular flow paths configured for the particular fuel.

In some embodiments, the outlet valve 5 and the fuel selector valve 3 can be connected or coupled such that making a selection with the fuel selector valve 3 also makes a selection with the outlet valve 5. The heating source 10 can comprise a connecting rod 17. The connecting rod 17 can connect the outlet valve 5 and the fuel selector valve 3. In this way, first and second positions of the fuel selector valve 3 can correspond with first and second positions of the outlet valve 5, respectively. Additional positions can also correspond. For example, the fuel selector valve 3 and the outlet valve 5 could both have a closed position. As another example, in the illustrated embodiment in FIG. 6, natural gas has been selected with the fuel selector valve 3 and fuel passageway 31 is open, in addition, on the outlet valve 5, outlet 43 is open to inlet 41 and outlet 44 is open to inlet 42. If liquid propane were selected instead, passageway 33 would be open and outlet 45 would be open to inlet 41 and outlet 46 would be open to inlet 42.

Figure 6A:
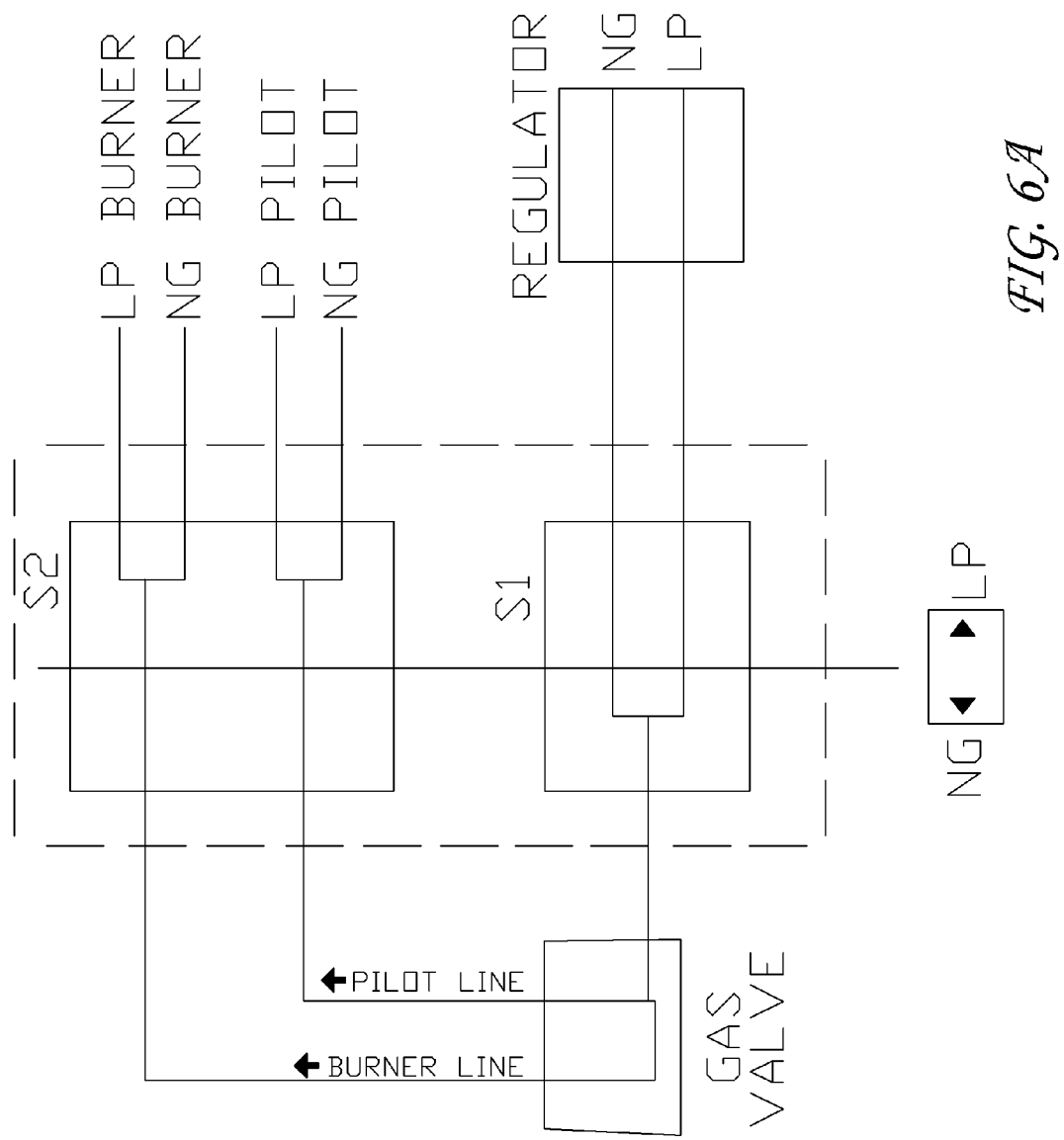
FIG. 6A is a diagram illustrating certain functions.

FIG. 6A illustrates the functions of the schematic from FIG. 6 without regard to any specific structure. It should be noted that the controls shown as S1 and S2 can be connected with a rod 17 as illustrated in FIG. 6 but can also be connected in other ways such as by gears, a flapper valve, etc., or as otherwise described herein. The functions can also be tied together or controlled without being physically connected, such as through a central control system, electrical controls, hydraulic controls, etc.

Figure 7:
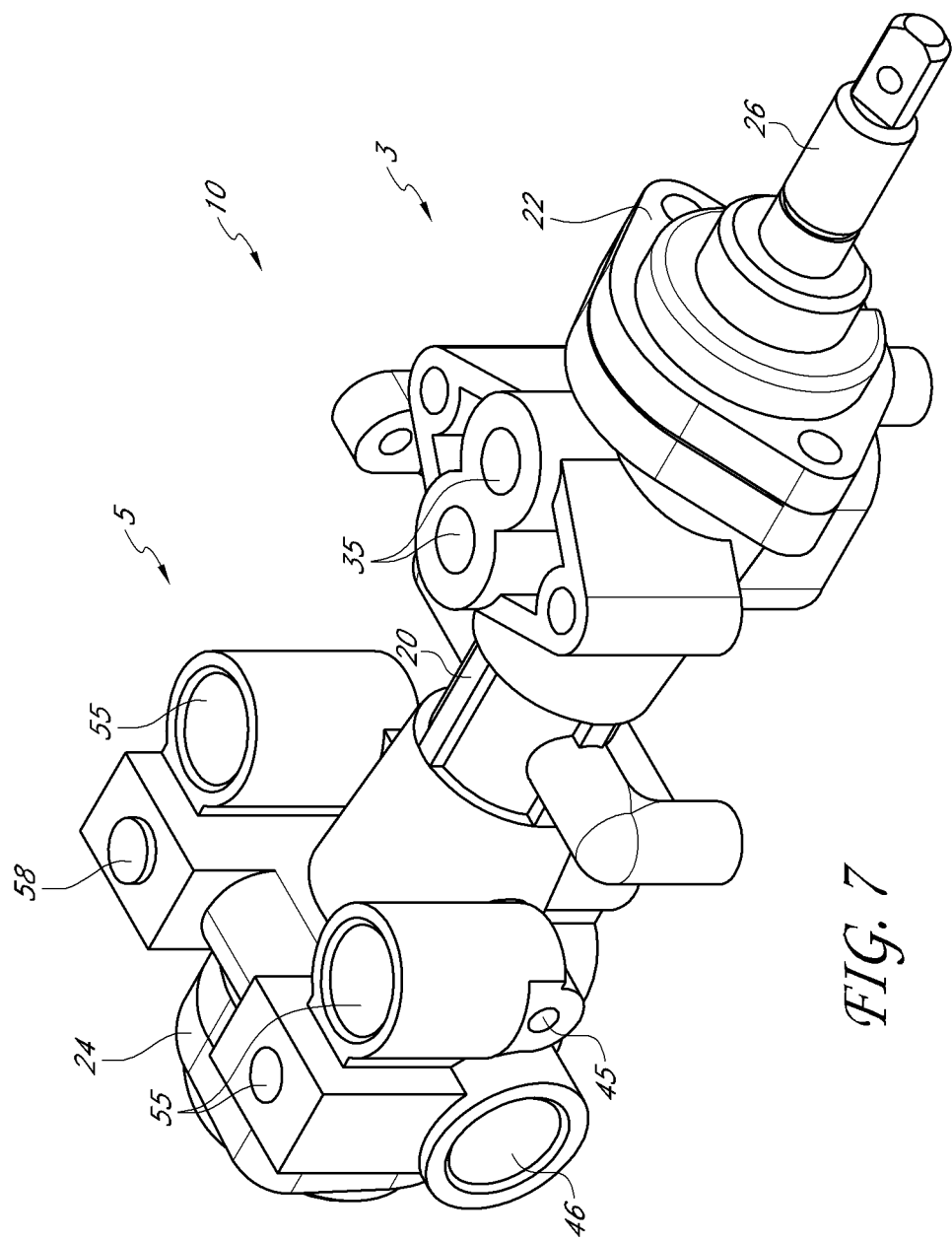
FIG. 7 is a side and top perspective view of another embodiment of a heating source.
Figure 8:
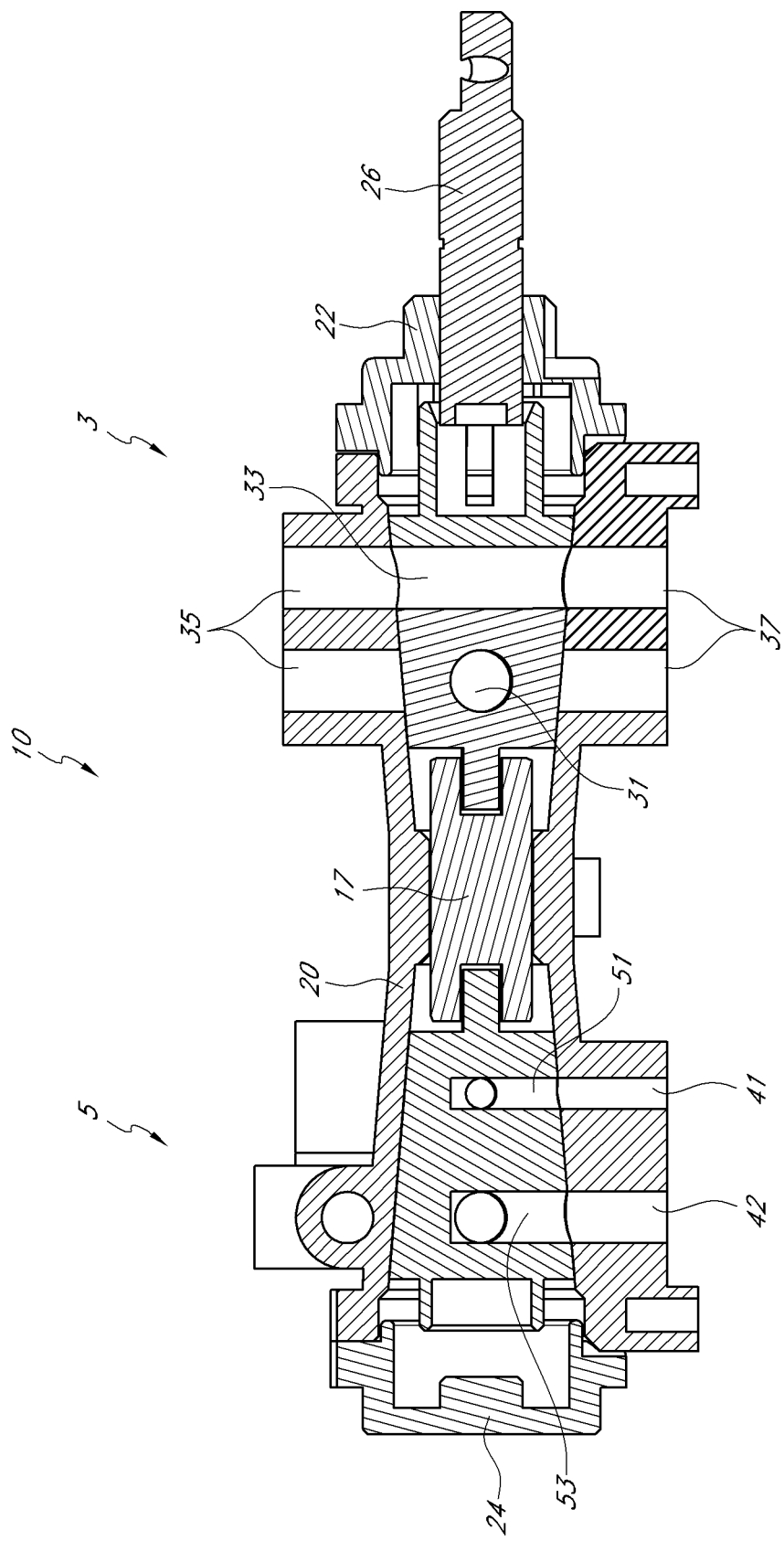
FIG. 8 is a cross-sectional view from the top of the heating source of FIG. 7.
Figure 9:
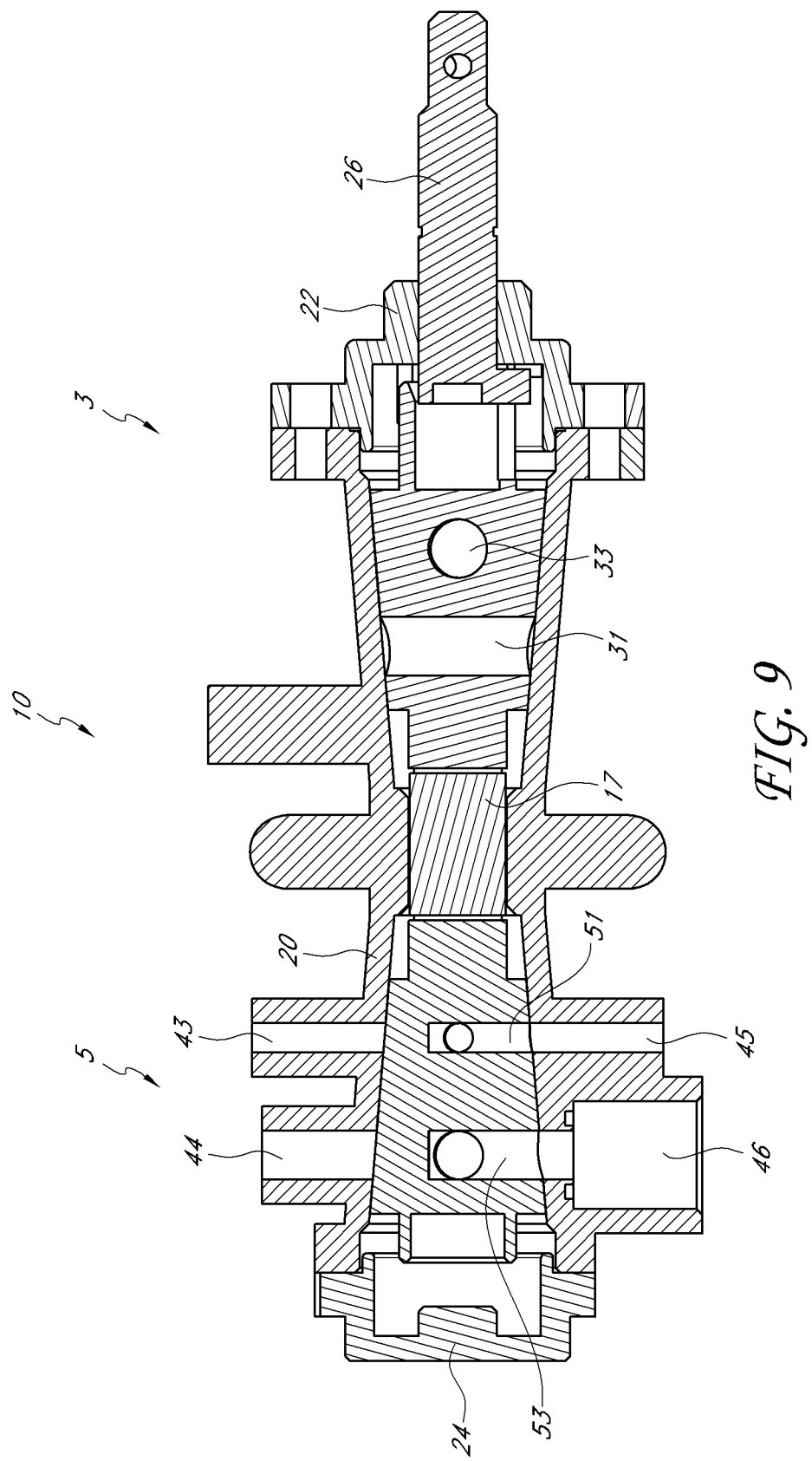
FIG. 9 is a cross-sectional view from the side of the heating source of FIG. 7.

FIGS. 7-9 show a particular embodiment of a heating source 10 with a fuel selector valve 3, an outlet valve 5 and a connecting rod 17. The heating source 10 has a valve housing 20 in which the valve bodies rotate. In some embodiments the heating source 10 has separate valve housings 20 for each of the fuel selector valve 3 and the outlet valve 5. Whether having combined or separate valve housings, the valves 3, 5 can be sealed so that the fluid within each valve 3, 5 does not communicate directly with the fluid in the other valve, 3, 5 within the valve housings 20. The valve bodies can each have a frustoconical shape. The point can be directed inward. This shape can help the valves to properly seat within the valve housing 20 and help the fluid passageways to properly line up.

As shown, the fuel selector valve 3 has two channels 31, 33 which are offset at an approximately 90 degree angle. By rotating the fuel selector valve 3, one channel is aligned with an inlet 35 and an outlet 37 while the other channel is not. As best seen in FIG. 8, in the position shown, channel 33 is open and channel 31 is closed. Various other configurations to achieve the same purpose are also contemplated. The channels 31, 33 can also be different sizes. This can allow more or less flow through the fuel selector valve 3 depending on the type of fuel selected. For example, each channel 31, 33 can be oval or oblong or can comprise multiple channels. This can allow a greater amount of flow through the valve then might otherwise be possible. For example, a system configured for 40,000 BTU or greater may use an oblong channel in the valve where a 20,000 BTU system may only need a round channel in the same sized valve.

Also in the embodiment shown, the outlet valve 5 has two channels 51, 53. These channels 51, 53 are elbow shaped so that there are two sections which combine to form a right angle. Further, the inlets 41, 42 are on a side of the outlet valve 5 and the outlets are on the top and the bottom so that the inlets can only connect with one of the respective outlets, either with those on the top or those on the bottom. Thus, the outlet valve 5 can change the configuration with a 90 degree rotation. Looking at FIG. 9, it can be seen that outlets 45 and 46 are open and outlets 43 and 44 are closed.

The outlet valve 5 can have a first configuration of flow channels and a second configuration of flow channels. The outlet valve 5 can be axially aligned with the fuel selector valve 3 and configured such that rotation of the fuel selector 3 valve also rotates the outlet valve 5. Selecting a fuel with the fuel selector valve 3 can determine which inlet of the fuel selector valve is open to allow flow therethrough of either natural gas or liquid propane and can determine the flow path of the fuel through the outlet valve 5 by either the first configuration of flow channels or the second configuration of flow channels.

The heating source 10 can have end caps 22, 24 and a shaft 26 (FIG. 7). The shaft 26 can be used to rotate the valves 3, 5 and connecting rod 17 to make the desired selection. The shaft 26 can pass through the end cap 22. In certain embodiments, other devices or valves can be further connected to the heating source 10 such that making a selection with the heating source 10 also performs additional actions. One particular device, described in more detail below, can comprise an air shutter control.

The outlet valve 5 can also have additional channels 55 which connect to the outlets or are part of the outlets 43, 44, 45, 46. The additional channels 55 can, for example, provide additional exit points to direct the flow of fuel from the outlet valve 5. In some embodiments, the outlet valve 5 can comprise one or more caps 58. The caps 58 can close off the unused exits such as those from the additional channels 55 or the outlets. The additional channels 55 and the caps 58 can increase the versatility of the outlet valve 5.

In some embodiments the fuel selector valve can have additional positions. For example, the fuel selector valve can select between two different fuels and between a higher and a lower BTU level. This may be necessary where the heater or other appliance has a low BTU level and a high BTU level. A different amount of fuel may be required in one level than the other which may require a larger opening a flow through the valve. For example, a 40,000 BTU level and a 20,000 BTU can require substantially different amounts of fuel and the fuel selector valve can have different positions that can correspond to different sized openings or channels through the valve.

Figure 10:
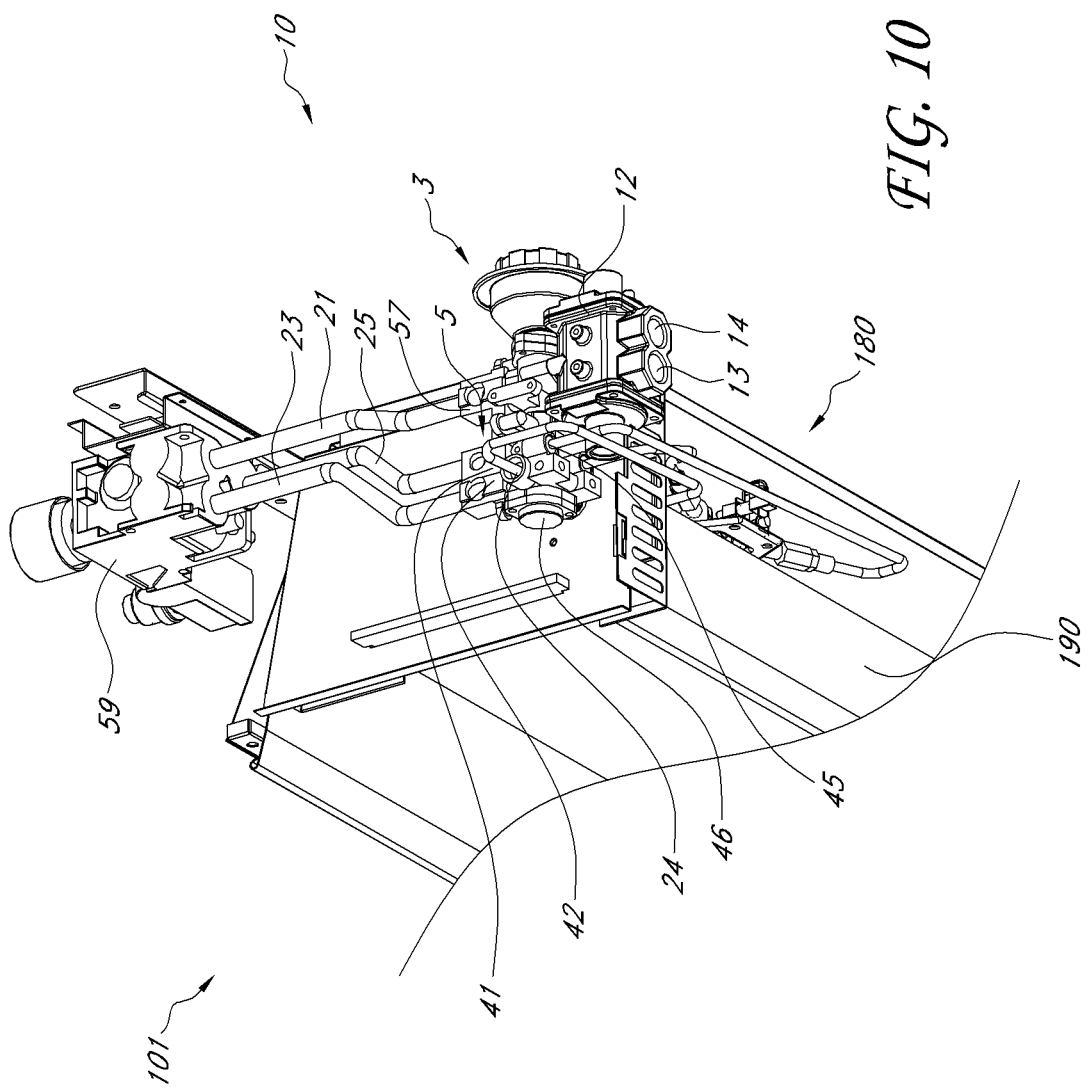
FIG. 10 is a perspective view of another embodiment of a heating source.

FIG. 10 illustrates a heater 101 with another embodiment of a heating source 10, having a fuel selector valve 3, an outlet valve 5 and a connecting rod 17. The heater 101 can be portable. The heater 101 is shown in partial cross-section and partially disassembled to better shown certain features of the heating source 10. As shown, the heating source 10 comprises a regulator unit 12 having first and second pressure regulators 13, 14, a fuel selector valve 3 and an outlet valve 5. The heating source 10 according to certain embodiments can comprise a manifold 57. The manifold 57 can combine the two outlets 37 of the fuel selector valve 3 into one channel and can maintain two separate flow paths for the two inlets 41, 42 of the outlet valve 5. The manifold 57 also comprises other configurations.

Also shown in FIG. 10 are channels 21, 23 and 25 and control valve 59. The control valve 59 can comprise at least one of a manual valve, a thermostat valve, an AC solenoid, and a DC solenoid. The control valve 59 can control the amount of fuel flowing from the fuel selector valve to the outlet valve. For example, the control valve 59 can receive an amount of fuel from the fuel selector valve 3 through channel 21. The control valve 59 can divide the flow into two flows or branches. The two flows or branches can be for different purposes, such as for an oxygen depletion sensor (ODS) 180 and for a burner 190. In some embodiments, the control valve 59 can output an amount of fuel for the ODS 180 through the channel 23 and an amount of fuel for the burner 190 through channel 25. The control valve 59 can manually or automatically control when and how much fuel is flowing. In some embodiments, the control valve 59 can directly connect to the fuel selector valve 3 and the outlet valve 5. In some embodiments, the control valve 59 is directly connected to a manifold 57 that is directly connected to the fuel selector valve 3 and the outlet valve 5. In some embodiments, the control valve 59 comprises both a manual control valve and an automatic control valve.

The heater assembly 10 may produce different color flames. Some embodiments have a blue flame, which is generally indicative of high efficiency gas combustion. For example, the heating assembly of FIG. 10 can be used to produce a blue flame in a vent free heater. Other embodiments have a yellow flame, particularly where air is introduced into the fuel. A yellow flame can appear closer to what many people are familiar with when it comes to fire and therefore may be more desirable for some people. In some embodiments, yellow flame is not as efficient as blue flame because less fuel is combusted. Heaters, such as direct vent heaters, vent free heaters, and builder vent heaters are examples of heating sources that might typically have yellow flames. Some embodiments with a yellow flame can have an air shutter.

An air shutter can be used to introduce air into the flow of fuel prior to combustion. The amount of air that is needed to be introduced depends on the type of fuel used. For example, propane gas needs more air than natural gas to produce a flame of the same size.

Figure 11:
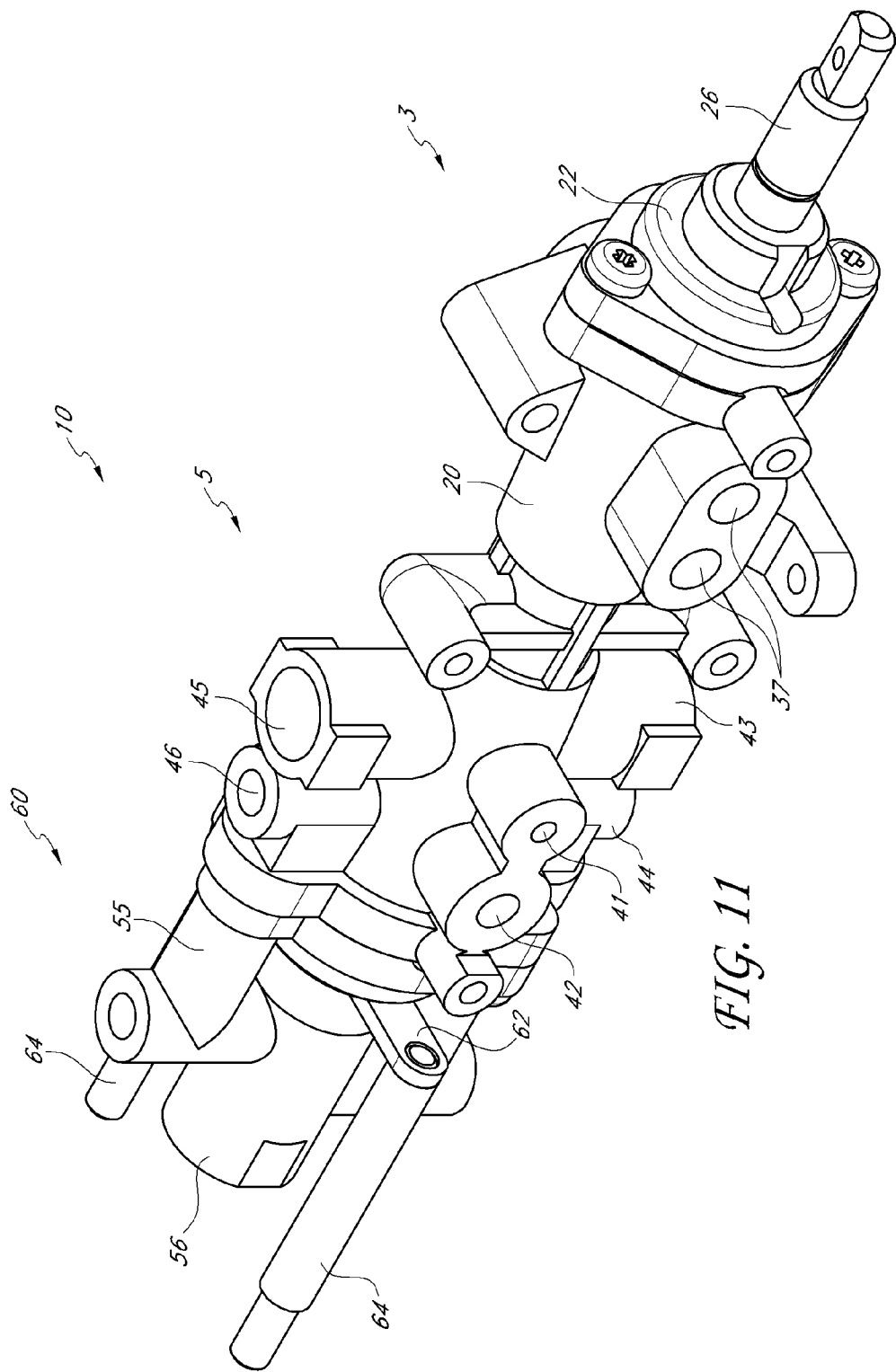
FIG. 11 is another embodiment of a heating source.

Looking now to FIG. 11, an additional embodiment of a heating source 10 is shown having an air shutter adjustment 60. The air shutter adjustment 60 can adjust the air shutter depending on the type of gas used. The air shutter adjustment 60, in some embodiments can comprise a rocker arm 62 and a rod 64. Some embodiments can comprise more than one rod 64. In certain embodiments, the end cap 24 (shown in FIGS. 7-9) can be removed and replaced with a device having an air shutter adjustment 60 (FIG. 11). The air shutter adjustment 60 can be connected to one or both of the fuel selector valve 3 and the outlet valve 5. Thus, selecting a position with the fuel selector valve 3 can, for example, also select a position of the air shutter adjustment 60.

In some embodiments, additional channels 55 can be attached to the heating source 10. For example, the outlets 46 and 44 can be closed with caps 58 so that the flow can be directed down the additional channels 55. As shown, the additional channels 55 can end in a nozzle or nozzle holding unit 56. The nozzle holding unit can hold a nozzle and the additional channels 55 can direct flow to different parts of the nozzle depending on the type of fuel to be used. For example, the nozzle can have a first flow path configured for a first fuel and a second flow path configured for a second fuel. The different paths can comprise different sized orifices, each configured for a particular fuel.

With reference now to FIG. 12A, the heating source of FIG. 11 is shown attached to an air shutter 70. A nozzle can deliver fuel to a mixing compartment 66 within the air shutter 70. In a first position, as shown in FIG. 12A, the air flow channels or windows 65 are relatively small and allow a relatively small amount and/or a relatively low flow rate of air therethrough. In some embodiments, as fuel is dispensed from the nozzle, air is drawn through the windows 65. In some embodiments, the size of the windows 65 is such that the amount of air drawn into the mixing compartment 66 is adequate to form an air-fuel mixture that combusts as a substantially yellow flame (e.g., a flame of which a substantial portion is yellow) at the burner. In some embodiments, the heating assembly 10 is configured to dispense natural gas at a first pressure so as to produce a substantially yellow flame at the burner.

With reference to FIG. 12B, air shutter 70 can be configured to transition to a second operational configuration. In certain embodiments, the rocker arm 62 can be rotated, thereby imparting rotational movement to the cover 63. Rotational movement of the cover 63 can enlarge or decrease the amount of the openings on the conduit 67 exposed to the air, thereby adjusting the size of the windows 65. For example, prior to rotation of the cover 63, the windows 65 can define a first flow area, and subsequent to rotation of the cover 63, the windows 65 can define a second flow area which varies from the first flow area. For example, the rocker arm 62 can be connected to at least one rod 64. The rod 64 can connect to an extension or flange 69 on the cover 63 through a hole or slot 68. Movement of the rocker arm 62 can thereby move the cover 63 through the rod 64.

In some embodiments, when the heating assembly 10 is in the second operating configuration, the windows 65 are relatively larger than they are when the heating assembly 10 is in the first configuration. In some embodiments, the size of the windows 65 changes by a predetermined amount between the first and second configurations.

In some embodiments, the size of the windows 65 is such that, when the heating assembly 10 is in the second configuration, the amount of air drawn into the mixing compartment 66 is adequate to form an air-fuel mixture that combusts as a substantially yellow flame at the burner. In some embodiments, the heating assembly 10 is configured to dispense propane at a second pressure so as to produce a substantially yellow flame at the burner. In some embodiments, the second pressure at which propane is dispensed is larger than the first pressure at which natural gas is dispensed when the valve assembly is in the first configuration.

The heating assembly 10 can transition from the second operational configuration to the first operational configuration. In certain embodiments, the cover 63 occludes a larger portion of the openings defined by the conduit 67 when the heating assembly 10 transitions from the second operational configuration to the first operational configuration, thus reducing the size of the windows 65. Advantageously, the heating assembly 10 can transition between the first and second operating configurations as desired with relative ease. Accordingly, a user can select whichever configuration is appropriate for the fuel source with which the heating assembly 10, and more generally, the heater 10 (or other gas appliance), is to be used.

As discussed previously, the air shutter 70 and the air shutter adjustment 60 can be coupled to the fuel selector valve 3 and/or the outlet valve 5. In this situation, by making a fuel selection with the fuel selector valve 3, not only are the flow paths through the fuel selector valve 3 and outlet valve 5 decided but also, the position of the air shutter 70 and the size of the window 65 is also decided. This combined control mechanism advantageously allows a user, such as an installer, to easily and simply switch between one setting for a first fuel and another setting for a second fuel. This alleviates many of the different adjustments and changes required to change from one fuel to another in many prior art heating sources. In some uses, such as blue flame, there is no air shutter and so this is true of the heating source 10 even when it does not have an air shutter or an air shutter adjustment.

In some embodiments, selecting a fuel with the fuel selector valve 3 is the only change required to be performed by an installer to change the heating source 10 from being configured for one fuel to another. For example, a heating source 10 can be used in a dual fuel heater designed for use with either natural gas or liquid propane. The heater can be factory set in an initial configuration for natural gas. After purchase, if the installer needs to connect the heater to a liquid propane source, the source can be connected to the appropriate pressure regulator. Then, the installer can rotate the fuel selector valve to an identified liquid propane position. This opens the appropriate channel in the fuel selector so that the liquid propane can pass through the valve to a control valve. This also opens the appropriate channels in the outlet valve so that the fuel will be directed to the burner and ODS though the appropriate channels configured for liquid propane. This selection also adjusts the air shutter so that the windows are moved to a configuration designed for liquid propane.

Additionally, if the installer does not change the fuel selector valve to the correct position for liquid propane, the heater will not function as the liquid propane will be prevented from passing through the fuel selector valve into the heating source configured for natural gas. This provides an additional level of safety.

In many of the currently available systems, the steps identified above were performed individually or not at all. For example, in some systems instead of making a small adjustment the installer is required to replace the burner nozzle and the ODS, which requires a large time commitment and additional parts. In other systems, the installer is required to make multiple small or large adjustments to change the system from one configuration to another. This can include manually changing the air shutter from one position to other, adjusting multiple valves, etc.

Another advantage of the disclosed systems is the ability to quickly move between positions configured for the particular fuels. For example, the air shutter with one move is adjusted from a position configured for natural gas to a position configured for liquid propane. This is in contrast to the currently available systems that use, for example a long screw to adjust the air shutter. These systems may be factory set to one position configured for a first fuel but do not provide the user with an easy or quick way to change to another position configured for another fuel. Also, once this type of air shutter has been adjusted the position may be lost and not easily returned to.

Figure 12D:
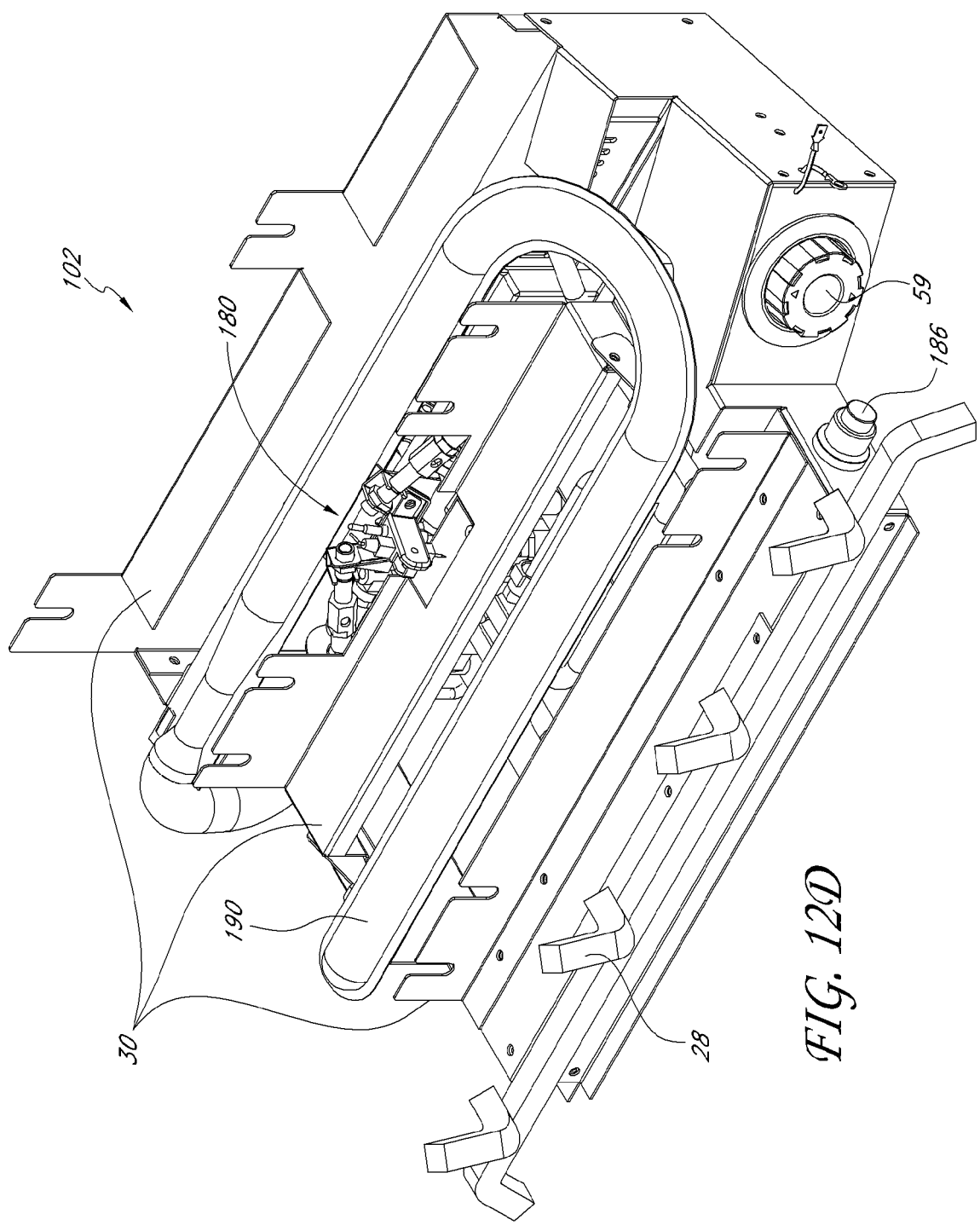
FIG. 12D is a gas log insert that can be used in a preexisting fireplace.

FIGS. 12C-D illustrate an embodiment of a heater 102 that can utilize the heating assembly 10 and air shutter 70 of FIGS. 11-12B. The heater 102 can be a gas log insert configured for use in a preexisting fireplace, for example. As shown, the heating source 10 can be connected to both an automatic valve and a manual valve to control the fuel flow to the burner 190 and the ODS 180. The position of the fuel selector valve 3 can also be used to determine the flow through the fuel selector valve 3, and to control the flow path through the outlet valve 5, as well as the position of the air shutter 70 and the size of the windows 65 on the air shutter as described above. The gas log insert can have a grill, rack, or grate 28 and a base 30. The base 30 and grate 28 can provide surfaces against which artificial logs may rest to resemble wood-burning fireplaces.

FIGS. 13A-D disclose another embodiment of a heater assembly 10. The heater assembly 10 is shown in cross section to illustrate two different flow paths through the heater assembly 10. FIGS. 13A and B illustrate a first configuration wherein channels 33, 45 and 46 are open and 31, 43 and 44 are closed. FIGS. 13C and D show a second configuration wherein channels 31, 43 and 44 are open and 33, 45 and 46 are closed. FIGS. 13A-D also show one possible configuration of the additional channels 55 leading to the nozzle holding unit 56.

Figure 14:
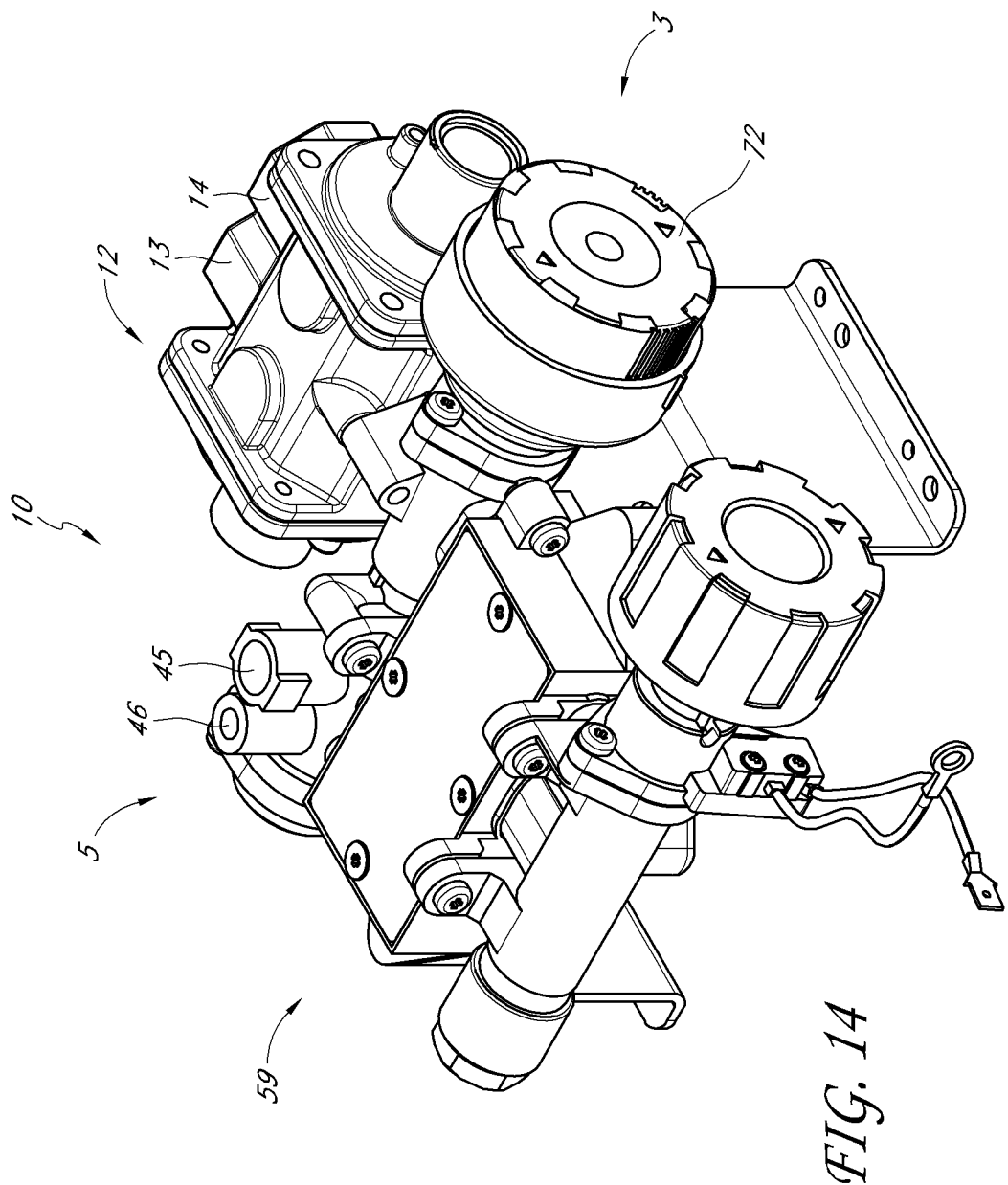
FIG. 14 shows a perspective view of another embodiment of a heating source.

In FIG. 14, another embodiment of a heating source 10 is shown. The heating source 10 is illustrated with a regulator unit 12, a fuel selector valve 3, an outlet valve 5, and a control valve 59. The control valve 59 comprises both an automatic and a manual control valve. In some embodiments, the automatic valve is connected directly to the fuel selector valve 3 and the outlet valve 5 and the manual valve is connected directly to the automatic valve.

Certain embodiments of the heating source 10 can also have a user interface surface 72, such as that shown in FIGS. 15A-E. The user interface surface can comprise a knob connected to the shaft 26. The user interface surface 72, of some embodiments, can control the type of gas. The user interface surface 72, of some embodiments, can control the amount of air flow. The user interface surface 72, of some embodiments, can control the amount of air flow and the type of gas. Manipulation of the user interface surface 72 can control the fuel selector valve 3, the outlet valve 5 and/or the air shutter 70. In other embodiments, not shown, the user interface surface 72 can comprise other types of mechanical controls such as a lever, a wheel, a switch, or some other device to transfer a user's movement to move the desired valves. In other embodiments, also not shown, the user interface surface 72 can comprise an electrical or computer control, including but not limited to electrical buttons, electrical switches, a touch screen, etc.

The user interface surface 72 can be rotated from a first position to a second position. The first position can control the heating source 10 so that the heating source is configured for a first fuel. The second position can control the heating source 10 so that the heating source is configured for a second fuel. The user interface surface 72 can also control the heater 100 or other gas appliance. Thus, the first position can control the heater 100 so that the heater 100 is configured for a first fuel and the second position can control the heater 100 so that the heater 100 is configured for a second fuel.

In some embodiments the user interface surface 72 can be limited to two positions, a first position for a first fuel and a second position for a second fuel. Other embodiments can have additional positions or configurations, for example, an off position.

FIGS. 15A-C show one embodiment of a user interface surface 72. According to some embodiments, the user interface surface 72 can make two types of adjustments. In an initial adjustment, a user, such as an installer, can select the type of fuel. As shown, the user can select between natural gas and liquid propane. This can be done by rotating the user interface surface 72 so that the indicator 74 is pointing to one of the fuel regions 76, 78. If the indicator 74 is anywhere along either fuel region 76 or 78, that particular fuel is selected. In FIG. 15A, natural gas (NG) has been selected. In FIGS. 15B and C, liquid propane (LP) has been selected.

Depending on the configuration of the heating source 10, the fuel selected by the user interface surface 72 will open or configure the connected valves, if any, to the appropriate setting. Preferably this includes the fuel selector valve 3 and the outlet valve 5. The air shutter 70 can also be moved to a position configured for the selected fuel.

The second adjustment of user interface surface 72, in some embodiments, pertains to the air shutter 70. As discussed previously, the air shutter 70 can be connected to the fuel selector valve 3 and/or the outlet valve 5 with an air shutter adjustment 60. Movement of the valves can move the air shutter adjustment 60 which in turn moves the air shutter 70. The second adjustment of the user interface surface 72 can be used for fine tune adjustment of the air shutter 70. This fine tune adjustment can be done without changing or modifying the flow of the selected fuel.

As mentioned previously, the fuel selection can be done by moving the user interface surface 72 so that the indicator 74 is along a fuel region 76, 78. The large arrow in the fuel region can represent a factory setting or a typical setting of the air shutter 70, known to work in many typical situations. The other markings in the fuel region 76, 78 can indicate an amount of deviation or change from the first position. In other words, these markings can indicate to a user an increase or decrease in the size of the windows 65 on the air shutter 70 and thereby an increase or decrease in the amount of air that can mix with the fuel flow.

Figure 15E:
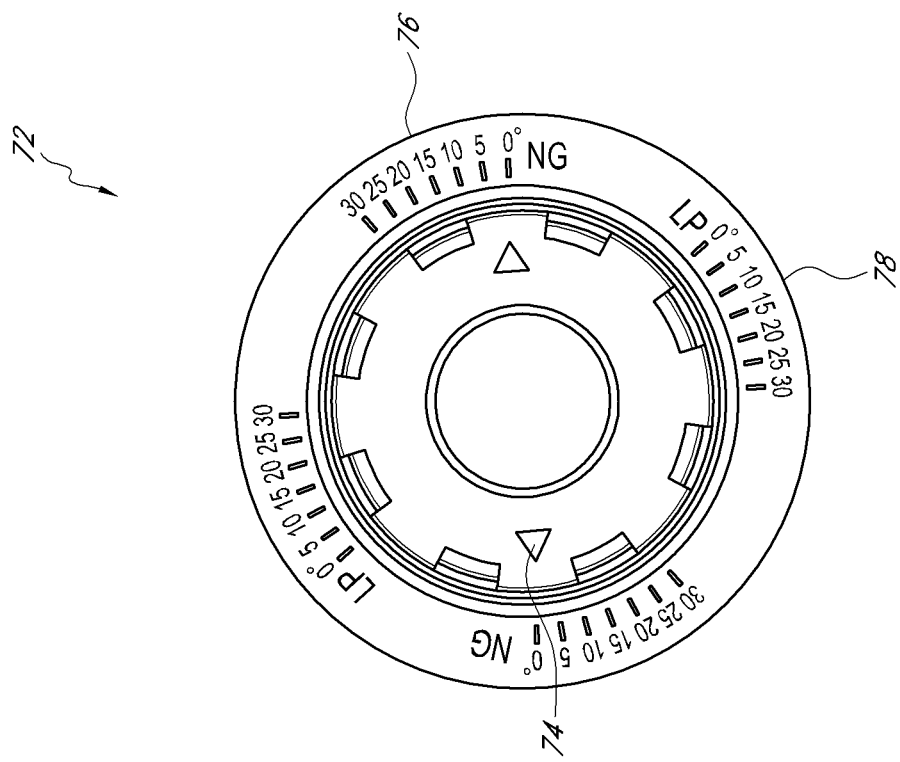
FIGS. 15D-E show additional embodiments of a user interface surface.
Figure 15D:
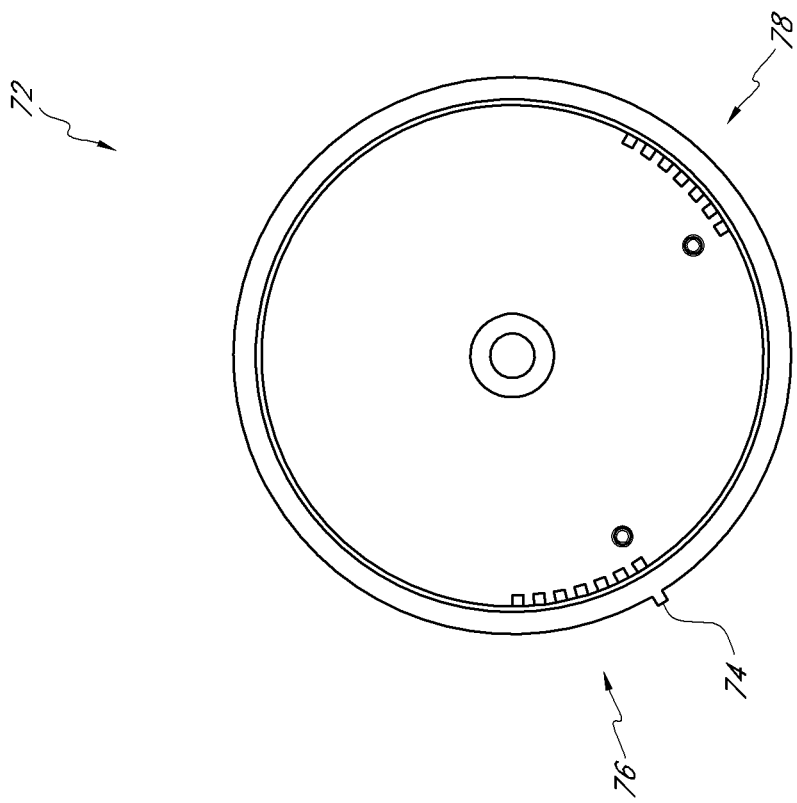

FIGS. 15D-E illustrate two additional embodiments of user interface surfaces 72. In FIG. 15D, the circles indicate an initial position to be lined up with the indicator 74 configured for a particular fuel. From the initial position, the user can continue to rotate the user interface surface 72. Because the initial position is near the beginning of the fuel region 76, 78 the adjustment of the air shutter 70 can be to either increase or decrease the size of the window 65 from the initial position. FIG. 15E is similar to FIG. 15D with an initial position indicated at zero and showing a degree change from the initial position. For example, as shown, the natural gas (NG) initial position can be a fully open window or largest window position and the degree change can indicate an amount the air shutter is closed from the fully open or largest window position.

In some embodiments, the fuel regions 76, 78 can be within a 30 degree, 45 degree, 50 degree or 60 degree segment of the user interface surface 72. In some embodiments, a large change in the position of the user interface surface 72 can result in a small adjustment of the air shutter 70. In some embodiments, the change in position of the user interface surface 72 corresponds to a similar sized change in the position of the air shutter 70.

Figure 16:
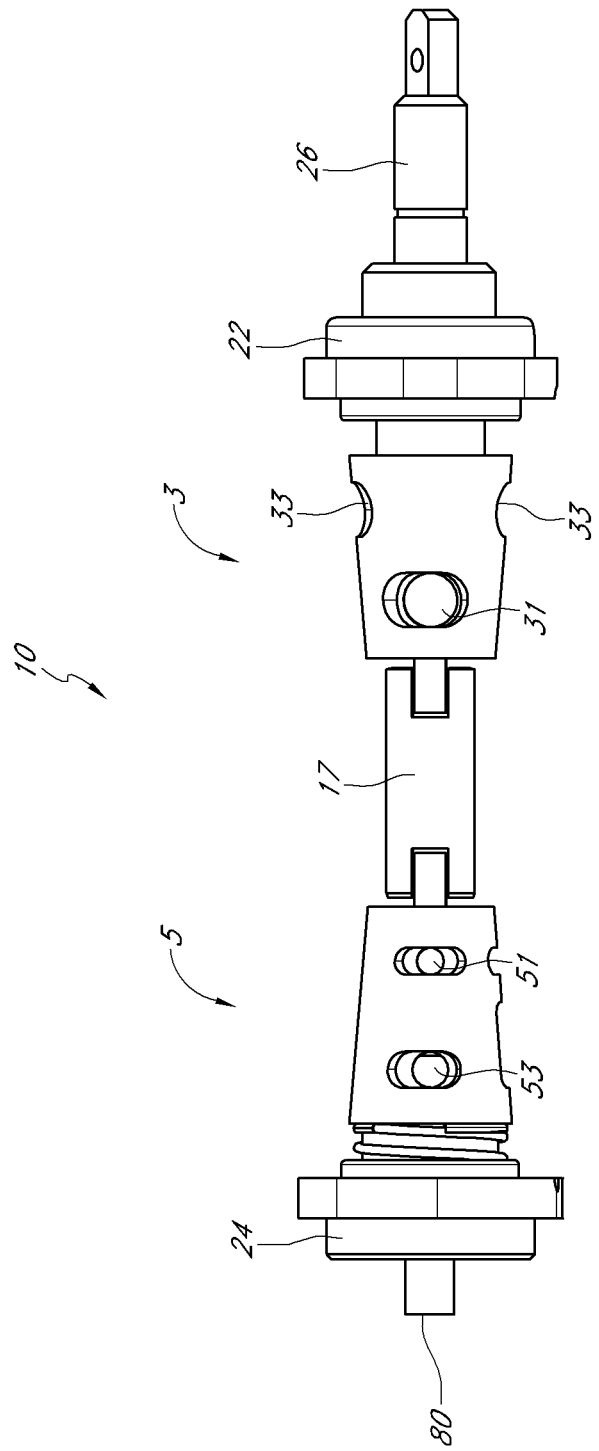
FIG. 16 illustrates another embodiment of a heating source with the valve housing removed.

The valves and/or valve housings can be configured to account for a range of positions of the valves 3, 5 for a particular fuel. This can allow for adjustment of the air shutter without adjusting the flow of fuel through either or both of the valve 3, 5. FIG. 16 shows part of the heating source 10 from FIG. 14, with valve housing 20 removed. In this view it can be seen that the size of the openings to the passageways 31, 33, 51, 53 through the valves 3, 5 have been increased. It can be seen that the openings on both ends are larger than the rest of the passageway. This can allow the air shutter to be adjusted within a range for a particular fuel. In some embodiments, larger passageways can be used instead of enlarged openings. The enlarged openings, or alternatively the enlarged passageways, can be larger than the inlets and outlets on the valves. The inlets and outlets can include inlets 35, 41, 42 and outlets 37, 43, 44, 45, 46. This can allow the valve 3 and/or 5 to function properly within a range of positions.

The air shutter 70 and the air shutter adjustment 60 can take on many forms. In one embodiment, the air shutter adjustment 60 is coupled to the outlet valve 5 with a screw. In some embodiments, the outlet valve 5 further comprises a projection 80 which extends through the end cap 24. The projection 80 can comprise part of the air shutter adjustment 60. The air shutter 70 can attach to the outlet valve 5 through the projection 80. In some embodiments, the air shutter 70 is coupled, fastened or otherwise connected to the projection 80.

Now referring to FIGS. 17A-C, some embodiments of an air shutter 70 comprise two cylinders. The mixing compartment 66 for mixing air with fuel can be inside the air shutter 70. The conduit 67, here the internal cylinder, can be stationary and the cover 63, here the external cylinder, can move to change the size of the windows 65. The shown configuration is similar to that shown in FIGS. 12A and B. The windows 65 are formed when the openings 84 or 86 line up with the openings 82. In FIGS. 12A-B the same openings are used for both fuels. In FIGS. 17A-C different openings are used for the different fuels. This configuration can allow for more specific control over the air shutter 70 and the amount of air that can flow through the windows 65 depending on the fuel. FIG. 17A illustrates the closed position and 17B and C show a position for liquid propane and natural gas, respectively.

For example, in some embodiments, the opening used for one fuel is larger than the opening used for the other. The various embodiments and configurations can also have different numbers and/or sizes of openings. For example, one fuel might use three openings where the other might use two. These openings could be the same openings or different openings. In some embodiments, the openings are rectangular for one fuel and triangular for the other. In some embodiments, one opening is equal to or greater than double the size of the other opening.

Different sized openings can be advantageous especially where different fuels require different amounts of air to produce the same sized flame. One fuel may require a small amount of air compared with another fuel. For this reason it can be beneficial to use different sized openings. The openings for the first fuel can be smaller and open up to a lesser extent or more gradually as compared to the openings for the other fuel that requires more air.

In some embodiments the cover 63 can attach to the projection 80 (FIG. 16). This can allow for control of the air shutter 70 by rotation of the valves such as by movement of the user interface surface 72 as previously described.

Figure 18A:
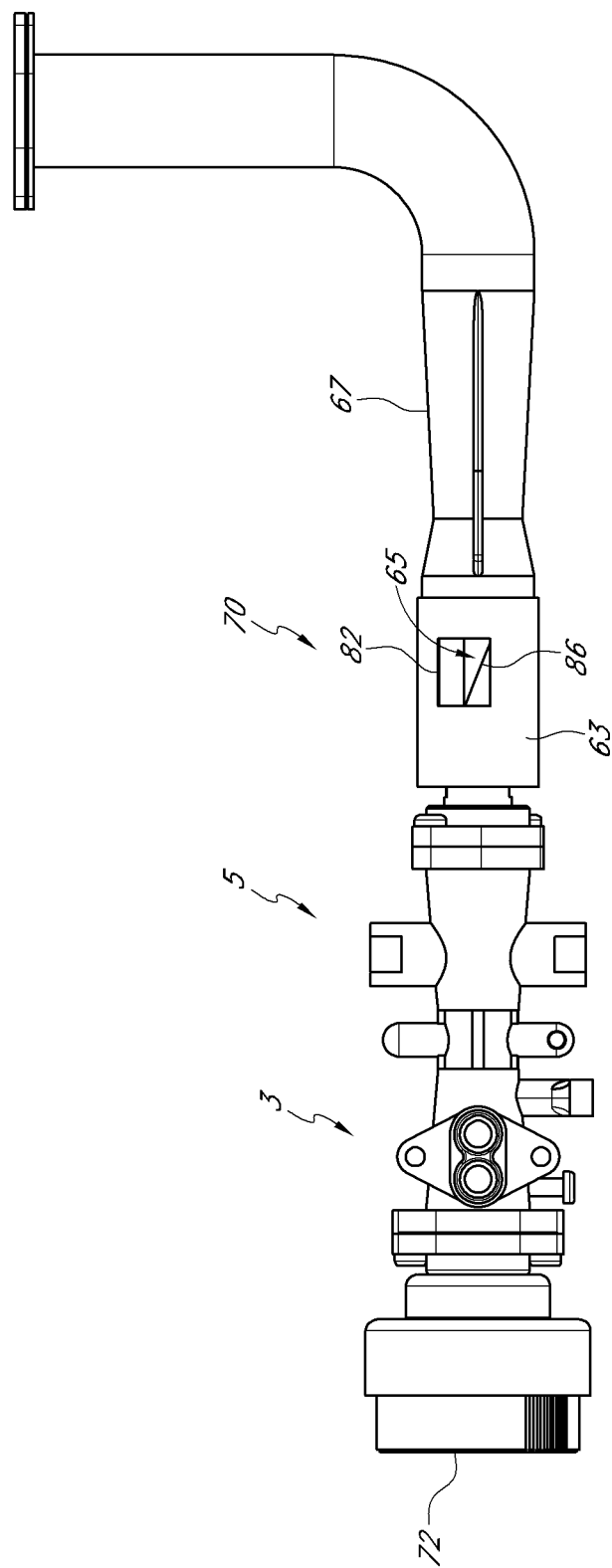
FIG. 18A is an embodiment of a heating source and air shutter.

FIGS. 18A and B illustrate another embodiment of an air shutter 70 with two rotating cylinders. The air shutter 70 can form two windows 65 on opposite sides of the air shutter 70 for each fuel selected. The conduit 67 has two sets of different sized triangular holes 84, 86 and the cover 63 has two rectangular holes 82. The two rectangular holes 82 on the cover 63 can be positioned to allow air flow through either of the first or second sets of triangular holes 84, 86. Further adjustment can then be made to decrease or increase the size of the windows 65, or the amount of the holes that overlap and allow air flow therethrough.

Aspects of certain embodiments with use in a dual fuel direct vent heater 210 will now be described with respect to FIG. 19. A direct vent heater 210 can have an air intake 211 which passes through an outside wall 213 of a building. The air intake 211 directs air into a sealed chamber 90 of the direct vent heater 210. The air can be mixed with a fuel through the air shutter 70 to then be combusted at a burner 92. The direct vent heater 210 can have a log insert 217 to give the appearance of a natural wood burning fire. The exhaust gas can then exit the sealed chamber through an exhaust 212.

As shown, the sealed chamber 90 is sealed to the outside with the exception of the air intake 211 and the exhaust 212. Heated air does not flow from the sealed chamber to the surroundings; instead air, for example from in an interior room, can enter an inlet vent 214. The air can pass through channel 215 passing over the outside of the sealed chamber 90 and over the exhaust 212. Heat is transferred to this air which can then pass into the interior room through outlet vent 216.

As similarly discussed earlier with respect to the dual fuel heater 100, a dual fuel direct vent heater 210 is made up of various components. Many of the components are similar to those discussed in this regard or as discussed in other parts herein. One difference between the heater 100 and the direct vent heater 210 is in the use of a sealed combustion chamber 90. The heater 100 has a burner 190 and combustion occurs within the housing 200. A direct vent heater 210 has a burner 92 and a housing 218, but inside of the housing 218 is a sealed combustion chamber 90. The burner 92 is within the sealed combustion chamber 90, as is the oxygen depletion sensor (ODS) 180, so that the combustion occurs within the sealed combustion chamber 90.

Because the combustion chamber 90 is sealed it can be difficult to access components within the chamber 90. For this reason some components are within the chamber 90 but many are not. In some embodiments, the components necessary for combustion are within the chamber 90 and others are outside.

Figure 19:
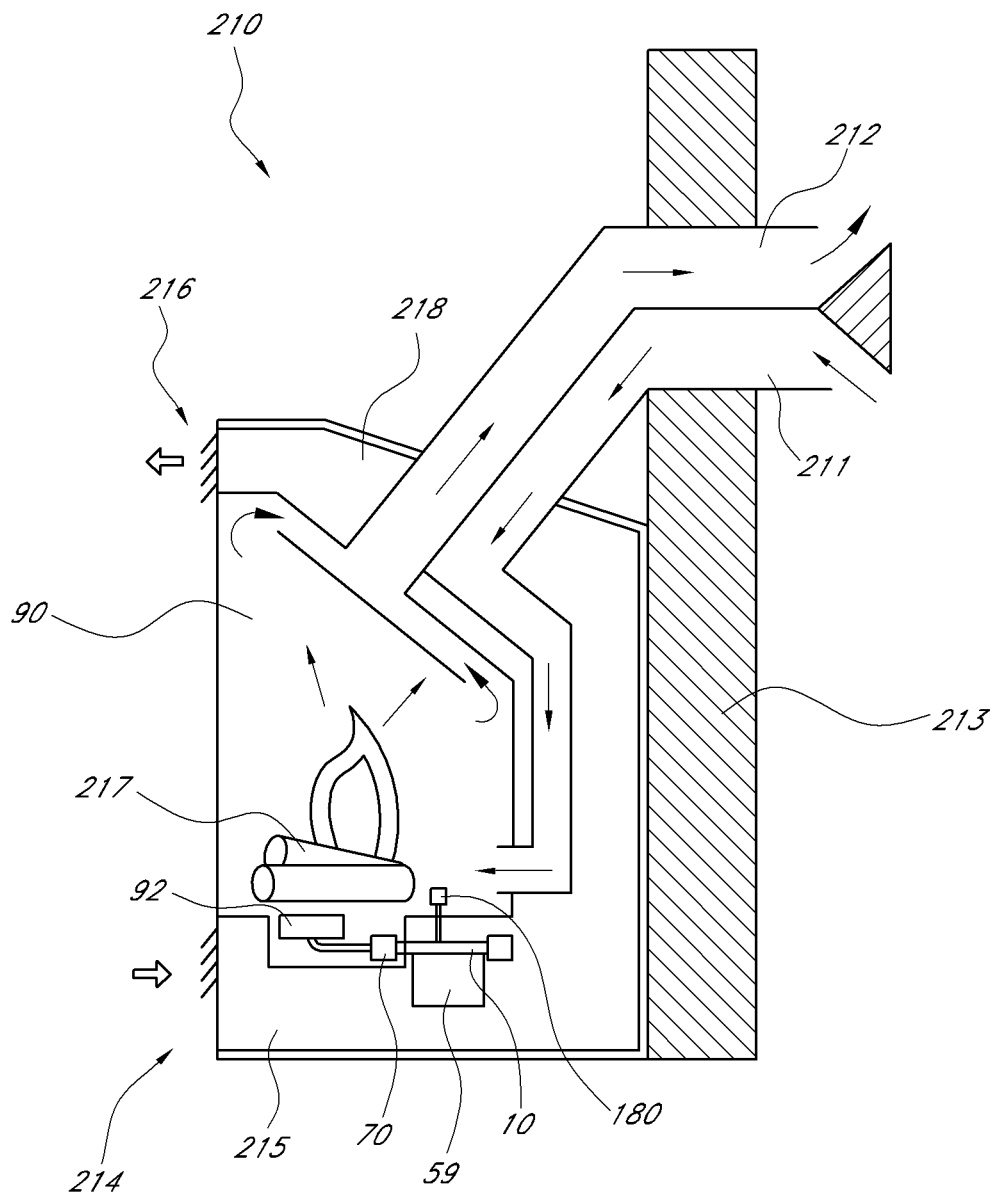
FIG. 19 is a schematic representation of a dual fuel direct vent heater.

The schematic diagram in FIG. 19 shows some of the components used for combustion within the sealed combustion chamber 90, such as, the burner 92, the air shutter 70 and the ODS 180. Other components not shown that may also be inside can include: a nozzle, and a thermostat or other temperature sensor. Also shown is a heating source 10 and other components 9 connected to the heating source 10.

Figure 20:
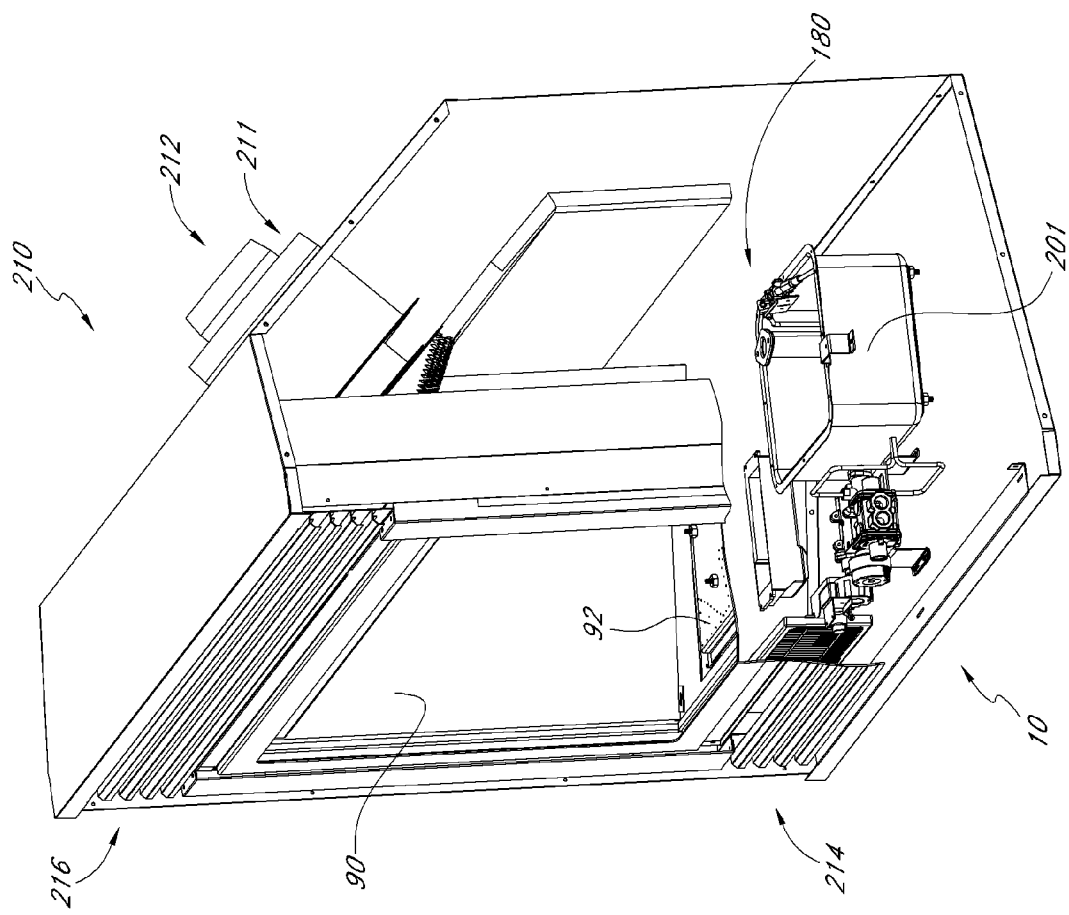
FIG. 20 shows a partial cross-section and disassemble view of a direct vent heater 210.

FIG. 20 is an embodiment of a direct vent heater 210. It can be seen a basket 201 can form part of the sealed chamber 90. The basket 201 can facilitate placement of some of the component parts of the heater 210 within the sealed chamber 90, while others remain outside.

Figure 21:
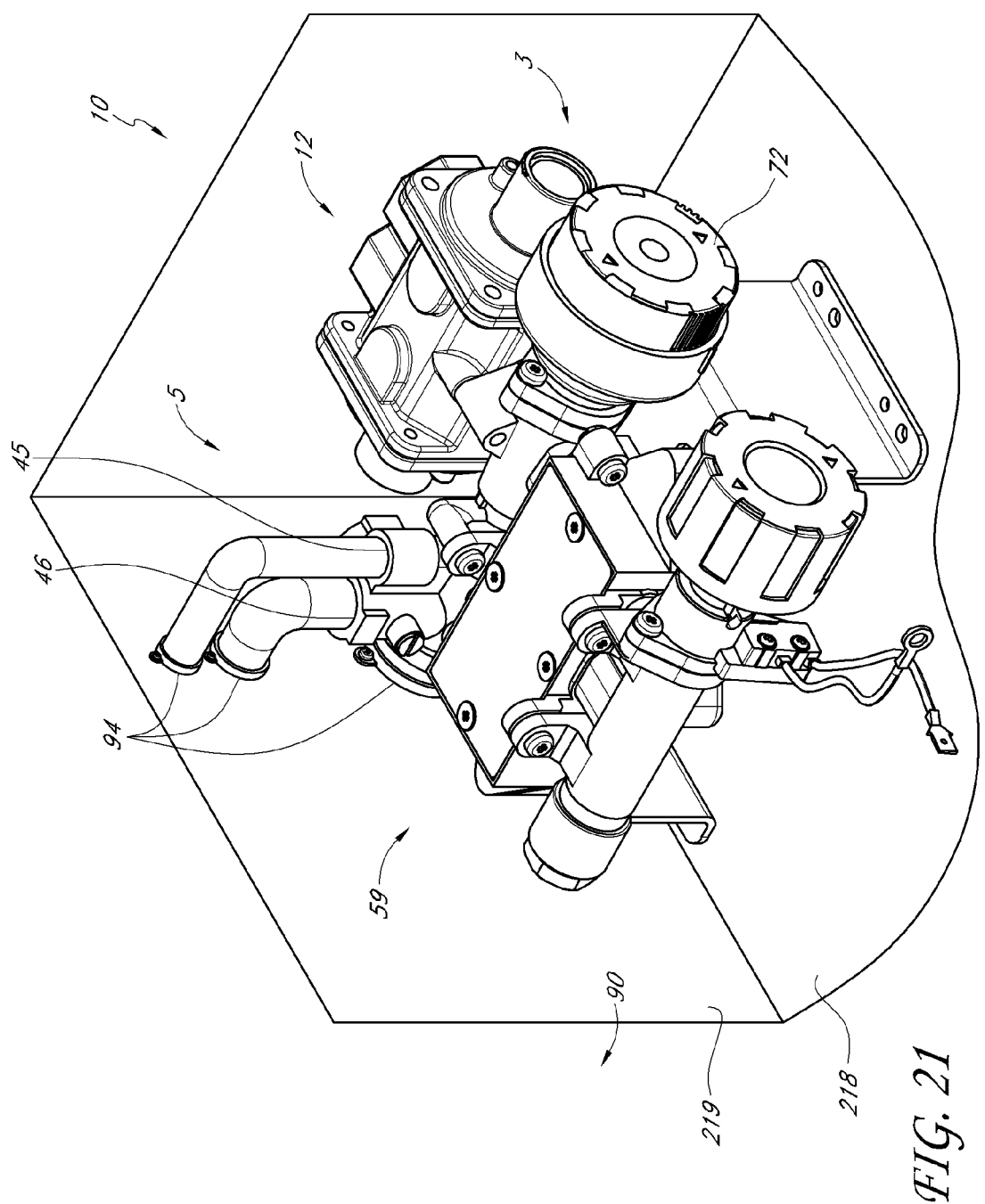
FIG. 21 is a detail perspective view of part of a housing of a dual fuel direct vent heater with a heating source.

FIG. 21 shows an embodiment of a heating source 10 within the housing 218. As can be seen, pipes connected to the outlets 45 and 46 pass into the sealed combustion chamber 90 through fittings 94 attached to and sealing the holes or entry points in the wall 219 of the sealed combustion chamber 90. The flow of fuel through outlet 46 can be directed to the burner and the flow of fuel through outlet 45 can be directed to the ODS. Outlets 44 and 43, not shown, can also direct flow to the burner and ODS respectively in a similar manner as has been described previously.

Part of the heating source 10 can also pass into the sealed combustion chamber 90 through a fitting 94. For example, the projection 80 (FIG. 16) can pass into the sealed combustion chamber 90 to provide control of the air shutter 70 with the user interface surface 72. The fitting 94 can be a separate fitting that allows the valve or pipe to pass into the sealed combustion chamber 90 in a sealed fashion. In some embodiments the end cap 24 can comprise the fitting 94 (for example, FIGS. 7-9, 16). For example, the end cap 24 can be inside the sealed combustion chamber 90 and the valve housing 20 can outside. The two parts can then be connected in a sealed fashion around a wall 219 of the combustion chamber 90. This can both seal the valve housing 20 and seal the hole through to the combustion chamber 90.

In some embodiments one or more of the fuel lines and the air shutter control can pass into the sealed combustion chamber 90 through the same fitting 94. For example, the heating source 10 shown in FIG. 11 can be connected to a wall of the combustion chamber 90 such that the fuel selector valve 3 and the outlet valve 5 are outside and the air shutter adjustment 60 and the nozzle holding unit 56 are inside the sealed combustion chamber 90. The additional channels 55 directing fuel to the burner and the screw which connects the air shutter adjustment to the outlet valve 5 can use the same fitting 94 to enter the sealed combustion chamber 90.

These configurations can advantageously decrease the number of fittings 94 required and the number of entry points into the sealed combustion chamber 90 that require fittings 94.

Figure 22A:
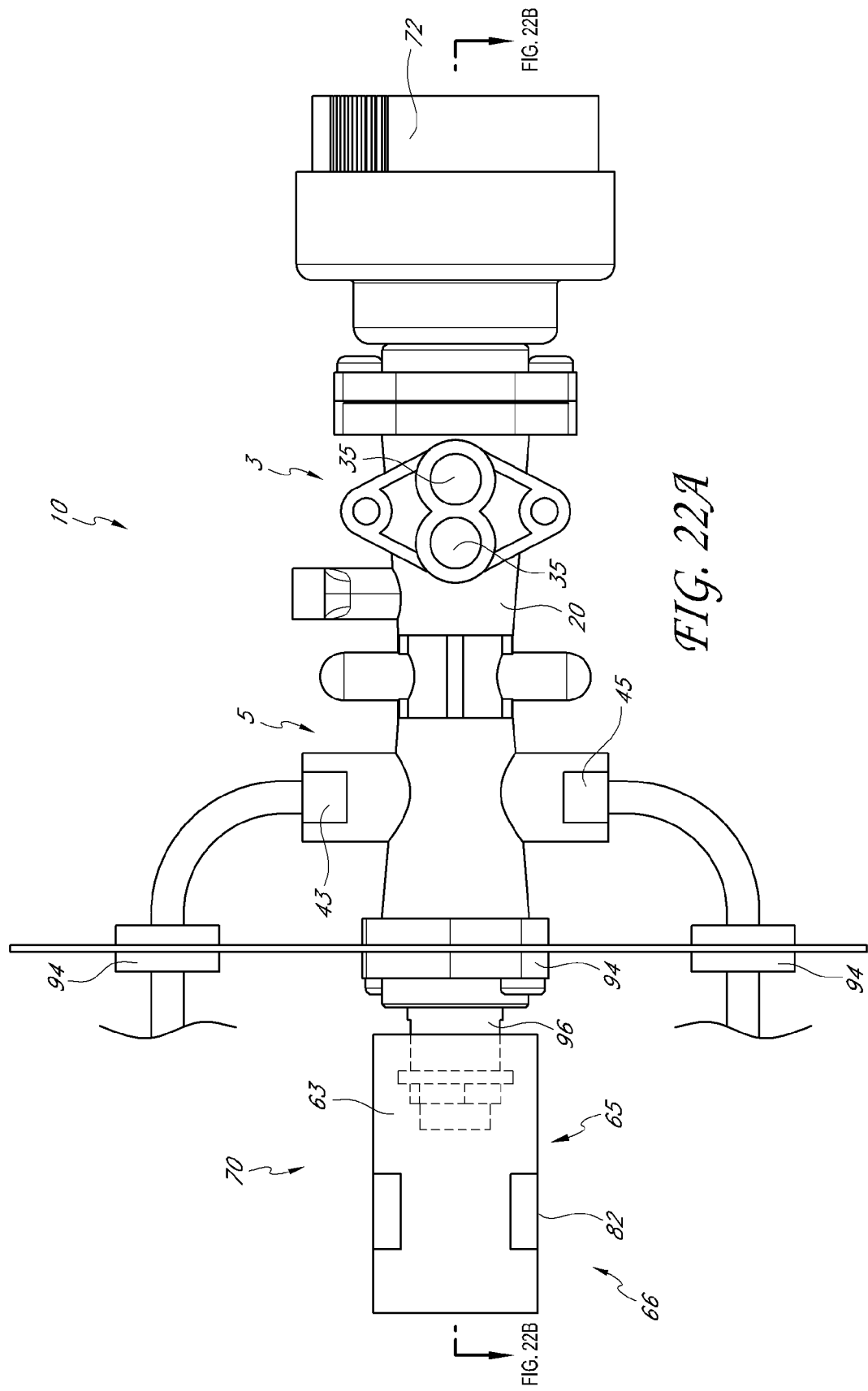
FIG. 22A is side view of another embodiment of a heating source.

FIG. 22A shows another embodiment of a heating source 10 which provides further benefits. For example, the number and size of the fittings 94 are decreased. In the valve shown, a nozzle 96 has advantageously been combined with the outlet valve 5. The nozzle 96 simplifies the construction of the heater 100, direct vent heater 210 or other gas appliance. This is because the outlets 44 and 46 are eliminated. The outlets 44 and 46 in some embodiments, were connected to a separate nozzle, with each outlet 44, 46 connected to a channel configured to direct the fuel to an area of the nozzle configured for the particular fuel designed to flow through that outlet and channel.

The two different positions of the outlet valve 5 now can also define two different channels 531, 532 that each connect to the nozzle 96 in a different way (FIGS. 22B-C). Channel 531 can be configured for a first fuel and direct the first fuel from the inlet 42 into the nozzle 96. The nozzle 96 can then direct the first fuel through a first orifice 97. The first orifice can be configured for natural gas. The nozzle can also have a second orifice 98. The second orifice 98 can be configured for liquid propane.

In the illustrated embodiment, the first and second orifices 97, 98 can be different sizes. The second orifice 98 can be smaller than the first orifice 97. This can allow one fuel to use both orifices. For example, in some embodiments, a fuel that uses the smaller of the two orifices can pass through the larger orifice and then the smaller orifice. As another example, a fuel that uses the smaller orifice can pass through the smaller orifice first and then pass through the other orifice. The nozzle can be configured such that the fuel that needs the larger orifice can pass through the larger orifice and not the smaller orifice.

The nozzle 96 can have a first flow configuration or path going through the nozzle 96 passing through both the first and second orifices 97, 98 and a second flow configuration or path going through only one of the orifices. For example, a flow of natural gas can flow through the first orifice 97 and not through the second orifice 98.

After exiting the nozzle a fuel can pass into the mixing chamber 66 to be mixed with air as discussed previously. The air shutter 70 can attach to the nozzle 96 so that it will rotate with the nozzle 96 and can be adjusted as described with respect to the user interface surface 72.

In some embodiments, the nozzle 96 can be made integral with the fuel selector valve 3, with or without the outlet valve 5. Making a selection with the fuel selector valve 3 by rotation or otherwise can determine the flow path through the nozzle 96.

Also shown in FIG. 22A are the fittings 94 through which the nozzle 96 and ODS channels, connected to the outlets 43 and 45, pass into the sealed combustion chamber 90. As the nozzle 96 can make up part of a fuel line, the fuel line and the air shutter control can pass into the sealed combustion chamber 90 through the same fitting 94. This can beneficially reduce the number of fittings 94.

Figure 23:
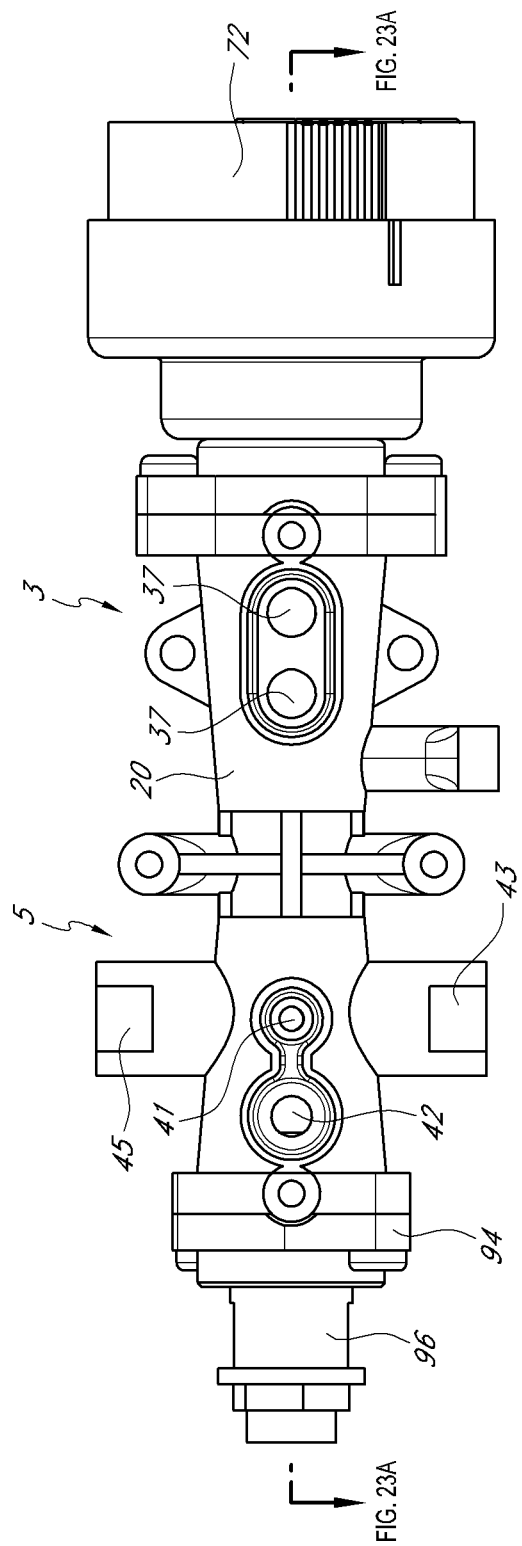
FIG. 23 is a side view of another embodiment of a heating source.

The nozzle 96 can have many different configurations. FIG. 23 shows another embodiment of heating source 10 with a nozzle 96. The cross-sectional view of FIG. 23A shows the nozzle 96 configured for a first fuel. In some embodiments the first fuel is natural gas. The cross-sectional view of FIG. 23B shows the nozzle 96 configured for a second fuel. In some embodiments the second fuel is propane.

Referring to FIG. 23A, in some embodiments the nozzle 96 can have a first chamber 533 and a second chamber 534. Each chamber can end in an orifice 97, 98 and each chamber can be configured for receiving a flow of fuel therethrough. As shown, the second chamber 534 is substantially within the first chamber 533. As also can be seen, orifice 98 of the second chamber 534 is within the first chamber 533.

In some embodiments, the second orifice 98 can be positioned downstream of the first orifice 97, as can be seen in FIG. 24. In addition the first orifice can be made up of a number of holes 99. The holes can surround the second orifice. In some embodiments there can be more than one row of holes, such as two or three rows of holes surrounding the second orifice. Such a configuration can work to aerate the fuel to achieve more efficient combustion. In some embodiments, the nozzle can be configured such that one fuel, such as propane, can travel through the second orifice 98 and a second fuel, such as natural gas, can travel through the holes 99 of the first orifice 87. In other embodiments, the nozzle can be configured such that one fuel, such as propane, can travel through the second orifice 98 and a second fuel, such as natural gas, can travel through both the holes 99 of the first orifice 87 and the second orifice 98. Such a configuration can beneficially produce quieter and more efficient combustion of fuel.

Figure 25A:
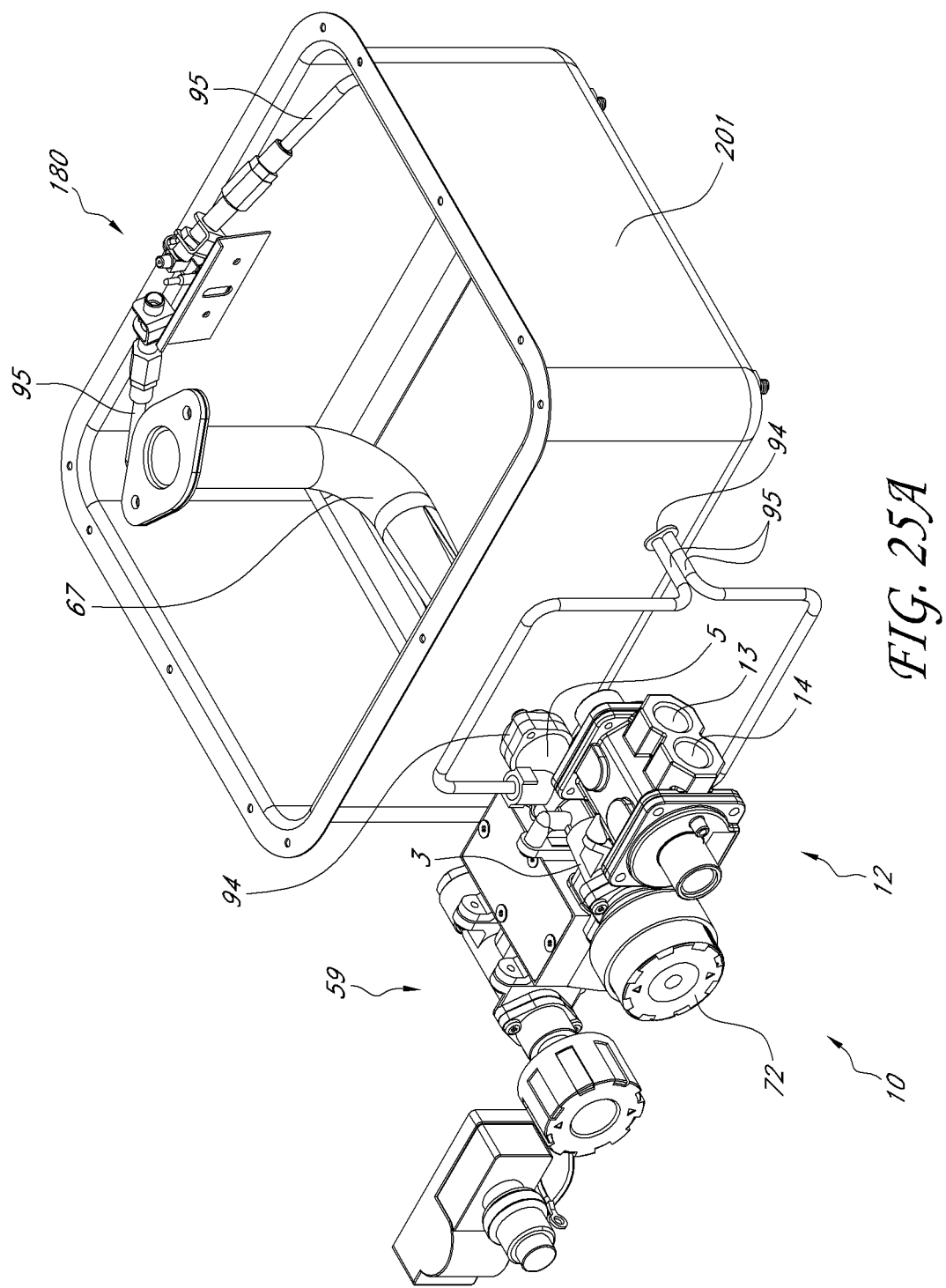
FIG. 25A is a perspective view of parts of the heater including a heating source and a basket that is part of a sealed combustion chamber.
Figure 25B:
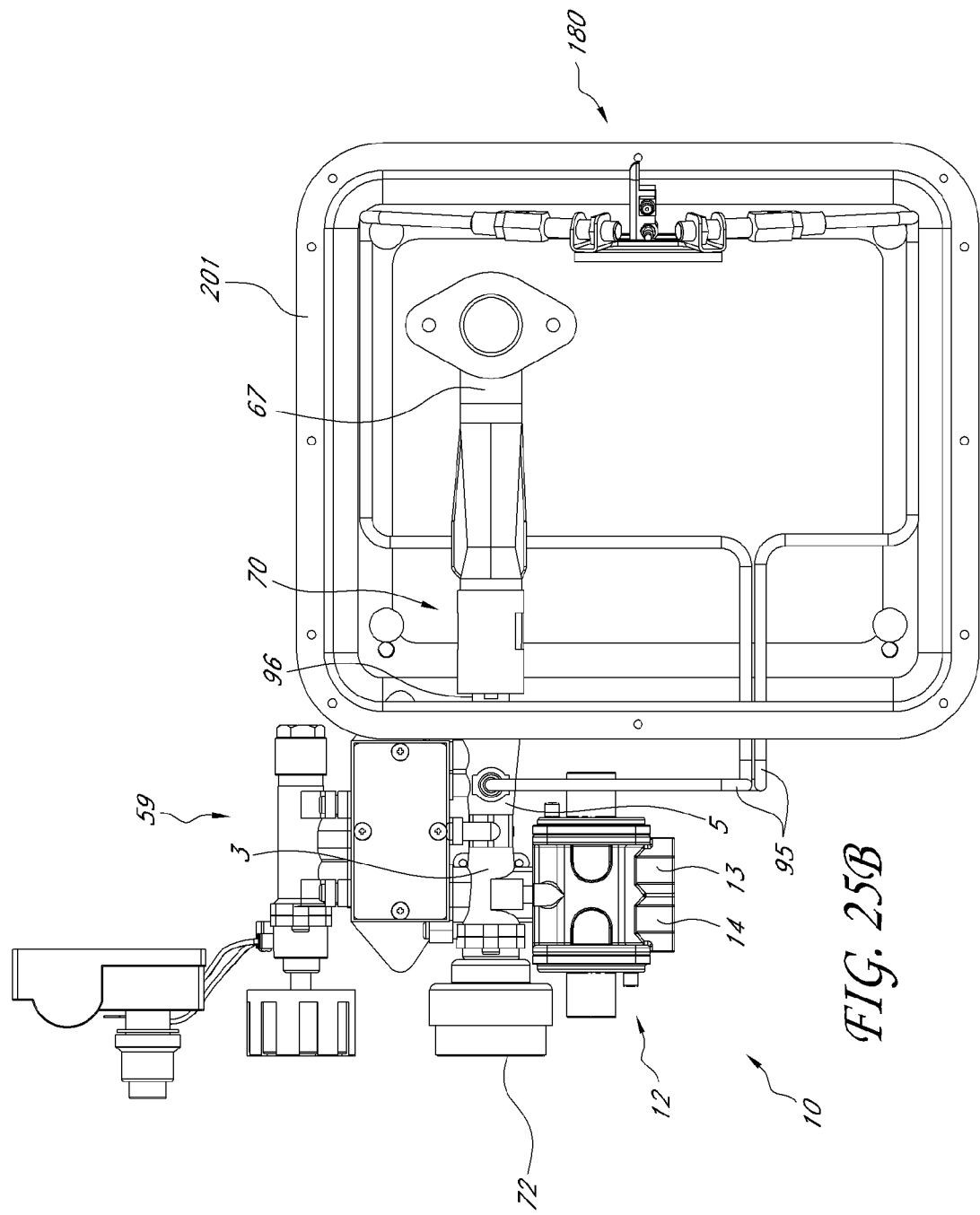
FIG. 25B shows a top view of the parts of the heater of FIG. 25A.

FIGS. 25A-B show how a heating source 10 with a nozzle 96 connected to the outlet valve 5 and an air shutter 70 can function together with a basket 201 as part of the sealed combustion chamber 90 (see FIG. 20). The fuel for combustion in the burner can pass through the nozzle and one fitting 94 into the basket 201 of the sealed combustion chamber 90. The air shutter control can pass through this same fitting. Electrical wires (not shown) from the ODS 180 can pass through the same fitting 94 as the pipes 95 leading to the ODS. This configuration can reduce the number of fittings through to the sealed combustion chamber. This configuration can also greatly simplify the control of the heating source 10 such that one adjustment to select the fuel and then possible minor adjustments to adjust the air shutter are all that is required. These adjustments can all be accomplished with the same control feature, such as the knob 72.

Figure 26A:
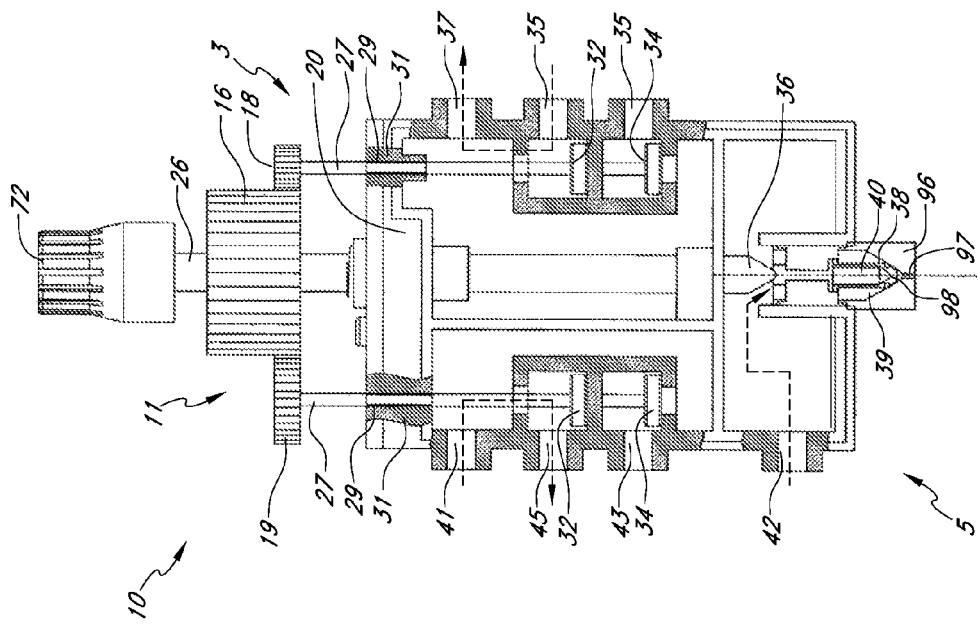
FIGS. 26A and B are schematic and partial cross-sectional views of another embodiment of a heating source in a first and second configuration, respectively.

Referring now to FIGS. 26A and B, another embodiment of a heating source 10 is shown. The heating source includes a selector valve 3 and an outlet valve 5 which are controlled by a geared mechanism 11. As shown, the geared mechanism 11 includes a driving gear 16 and two driven gears 18, 19, where one driven gear 18 controls the fuel selector valve 3 and one driven gear 19 controls the outlet valve 5. The user interface surface 72 can be used to rotate the driving gear 16. This control of the driving gear 16 can be done directly, through other controls, or gears or in other ways. As can be seen, the driving gear 16 can be on the same shaft 26 as the user interface surface 72. Thus, the user interface surface 72 can provide direct control of the rotation of the driving gear 16.

Figure 26B:
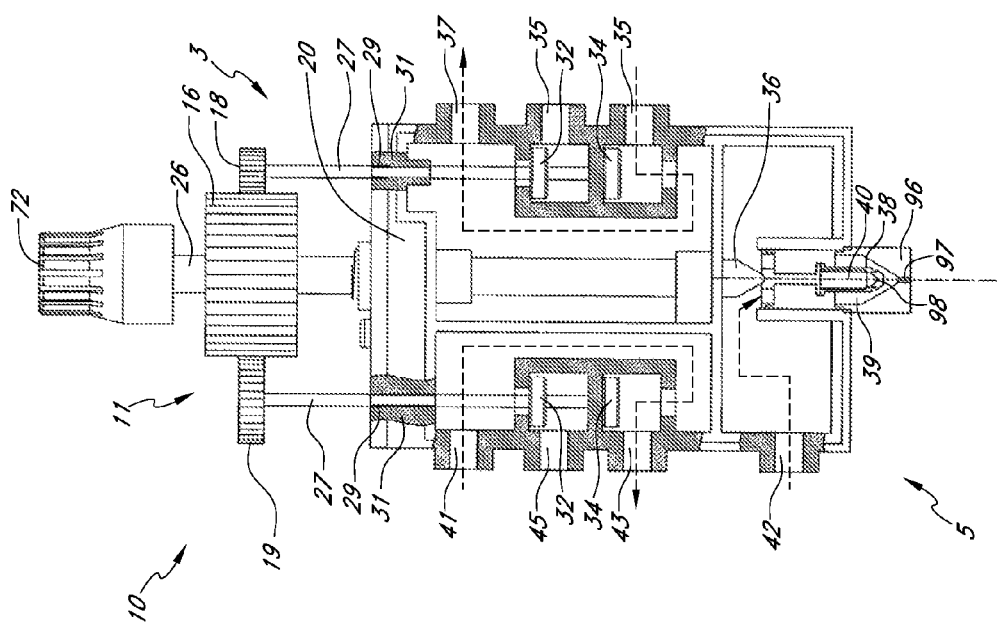

The driven gears 18, 19 can be on a shaft 27. The shaft 27 can have a threaded portion 29 that can engage a threaded channel 31 on the housing 20. This can allow the shaft 27 to convert the rotational movement of the gear 18, 19 into linear movement which can be used to open and close various valves. For example, each shaft can have a first valve 32 and a second valve 34. As shown in FIG. 26A, in one position the first valve 32 can be closed and the second valve 34 can be open. In a second position, shown in FIG. 26B, the first valve 32 can be open and the second valve 34 can be closed. This can allow, for example, either a first fuel or a second fuel to flow into an inlet 35 and out the outlet 37. This can also allow flow through the inlet 41 and out either of outlets 43 and 45.

In some embodiments, the user interface surface 72 can be held in a locked position with a spring. Pushing the user interface surface 72 towards the housing 20 can unlock the user interface surface 72 and allow rotation thereof. After pushing and rotating, the user interface surface 72 can assume a locked or unlocked position that is either closer to or farther from the housing 20 in comparison to the prior position. Alternatively, the user interface surface 72 can be configured such that rotating the shaft 26 can also linearly advance the shaft 26.

The shaft 26 can also include a nozzle control 36. The nozzle control 36 can control the position of a nozzle shaft 38 within a chamber 39 inside of the nozzle 96. The nozzle shaft can function in one of two different ways. In some embodiments, the nozzle shaft 38 can also include a chamber 40 with an orifice 98. In the first position (FIG. 26A), fuel can flow into the nozzle through chamber 39 and out orifice 97. Linear movement of the shaft 26 towards the second position (FIG. 26B) can adjust the position of the nozzle control 36 to and seal and close the chamber 39. Fuel can then flow through chamber 40 and out of both orifice 98 and then orifice 97. In this way, the nozzle 96 can be adjusted for use with different fuels. The nozzle 96 according to certain embodiments can include a spring to bias the nozzle towards either of the first or second positions.

In other embodiments, the position of the nozzle shaft 38 can determine the amount of fluid that can flow out of the exit orifice 97 of the nozzle 96. For example, fuel can flow through chamber 39 in both the first and second positions and the position of the nozzle shaft 38 within the chamber 39 with respect to the interior surface of the chamber 39 can determine how much fluid can flow through the orifice 97. In the second position the nozzle shaft 38 can limit the amount of fuel that can reach the orifice 97. This can have the affect of essentially creating a smaller orifice within the chamber 39.

Figure 27:
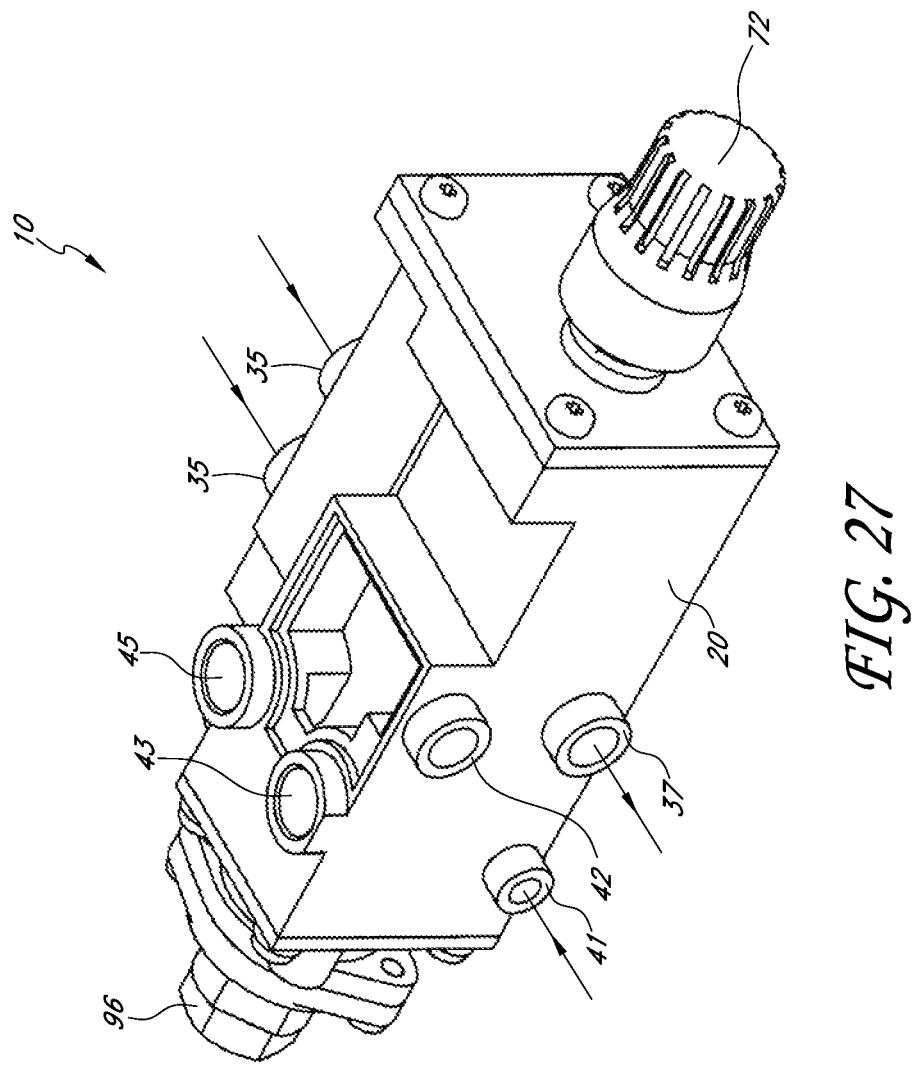
FIG. 27 shows another embodiment of a heating source.
Figure 27A:
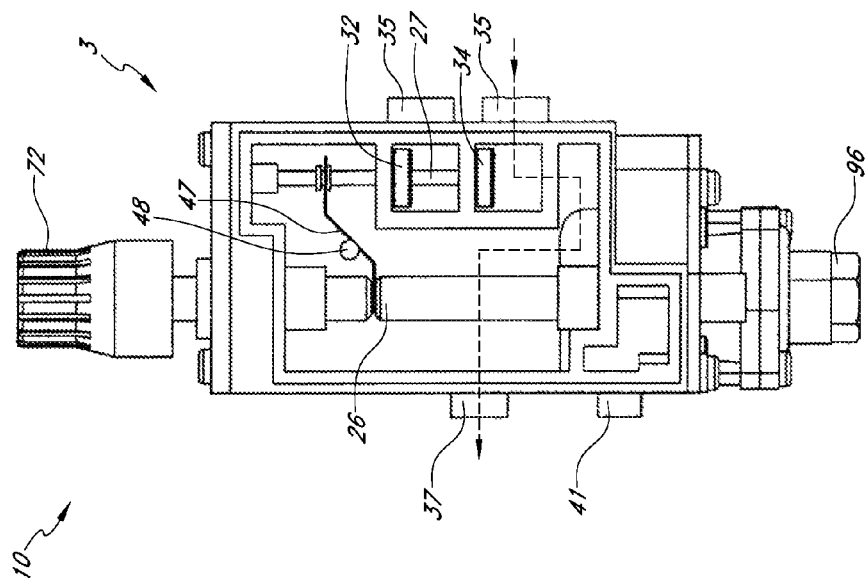
FIGS. 27A and B are schematic and partial cross-sectional views of the heating source of FIG. 27 in a first and second configuration, respectively.

Turning now to FIG. 27, another embodiment of heating source 10 is shown. FIGS. 27A and B illustrate the heating source in schematic partial cross-sections in first and second configurations, respectively. The heating source is similar in some respects to that shown in FIGS. 26A and B, except that instead of controlling the valves 32 and 34 through a gearing mechanism, an actuator or linkage 47 is employed to control the positions of valves.

In some embodiments, the actuator 47 can be connected to both shaft 26 and shaft 27 and can rotate about a pin 48. Thus, linear movement of the shaft 26 in one direction can cause shaft 27 to move in the other direction through the movement of the actuator 47. In this way, the shaft 27 is able to move between the positions shown, opening and closing the valves. In other embodiments an actuator or bar can be used without a pin. Movement of the shaft 26 would cause a corresponding movement in shaft 27.

An actuator 47 used with a pin 48 can advantageously be used to scale the amount of movement between the two shafts 26, 27. For example, with the pin closer to shaft 26 than to shaft 27, a small movement in shaft 26 can translate into a larger movement in shaft 27. With the pin farther away from shaft 26 the opposite would be true.

Figure 27B:
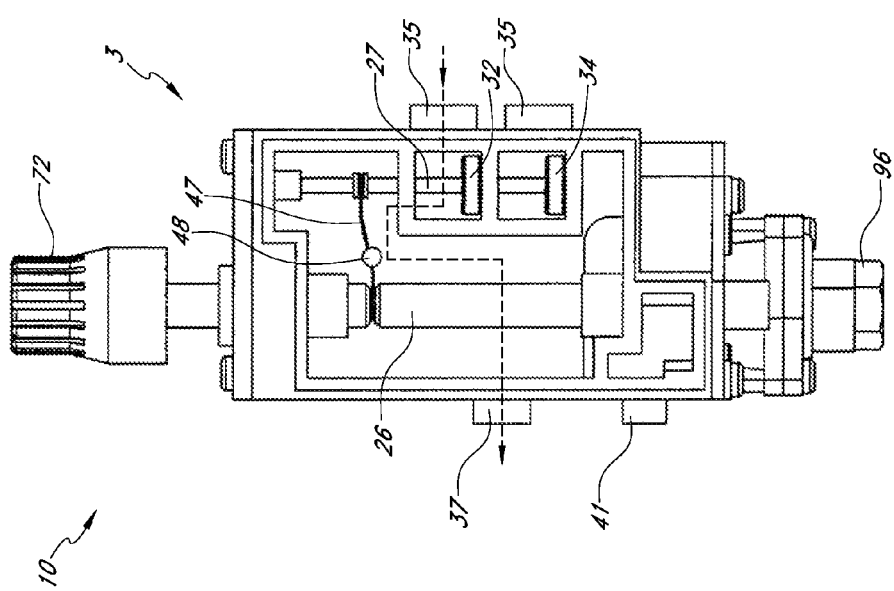

In some embodiments, the actuator 47 can comprise a metal spring. For example, a metal plate or wire can be shaped with bends as shown in FIG. 27B. The movement of the shafts 26 and 27 can be configured such that shaft 26 moves more than necessary to open or close the valves 32, 34. The extra movement can cause the spring to flex, applying a force on the valve 32, 34 and thereby holding the valve more firmly in place.

As well as moving linearly, the user interface surface 72 can also rotate. The rotating motion can be used to control the outlet valve 5. Looking to FIGS. 28, 28A and 28B, it is shown how the outlet valve 5 can control the flow, for example to the ODS, through the outlets 43, 45. Flow can enter inlet 41 and travel through channel 51. The position of the slotted valve 49, as best seen in FIGS. 28A and B, can determine whether the flow travels from channel 51 to either channel 50 or 52. Referring now to the arrows indicating the flow path on FIG. 28, it can be seen that channel 50 leads to outlet 43 and channel 52 leads to outlet 45.

Figure 29:
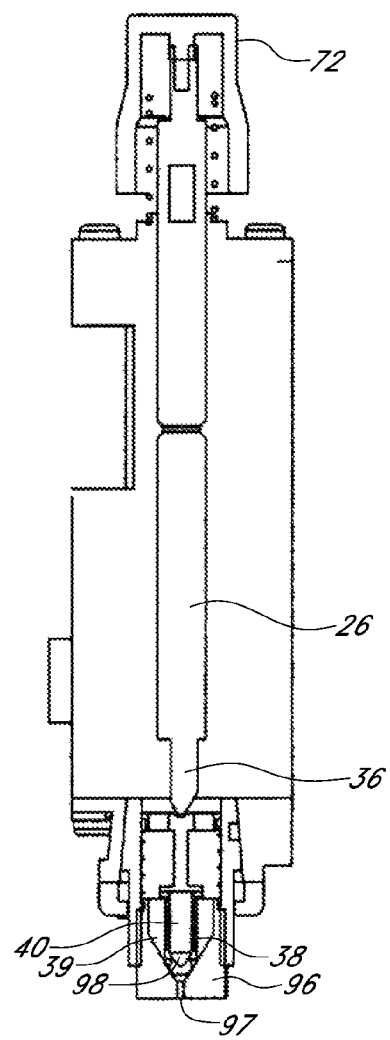
FIG. 29 is a schematic cross-sectional view of the heating source of FIG. 27.
Figure 30:
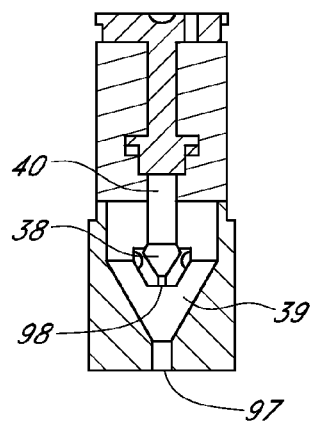
FIG. 30 illustrates partial cross-section of a portion of the heating source of FIG. 27 including a nozzle.

FIG. 29 illustrates a cross-section of FIG. 27 with the nozzle 96 in the second position. FIG. 30 shows the nozzle 96 in a first position. It can be seen that the heating source of FIG. 27 can have a nozzle similar to that described above with respect to FIGS. 26A and B.

Figure 31:
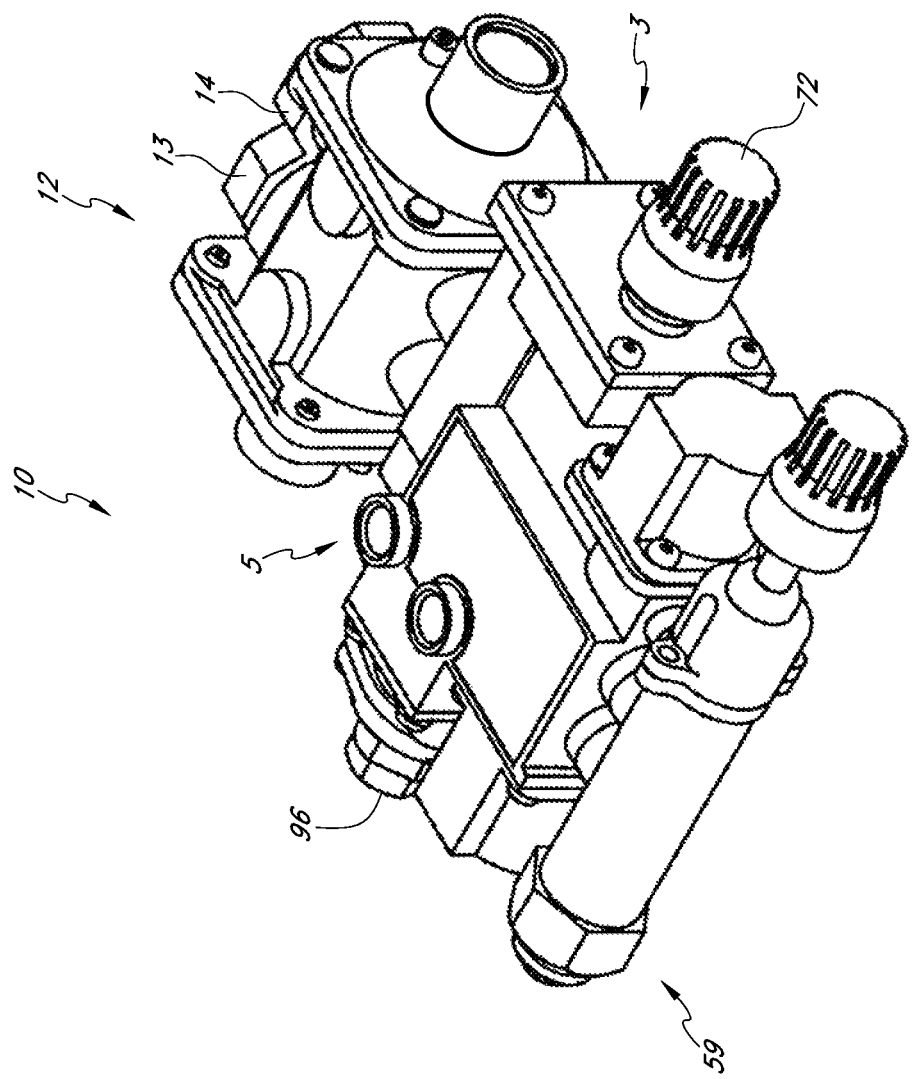
FIG. 31 shows a perspective view of another embodiment of a heating source.

In FIG. 31, another embodiment of a heating source 10 is shown. The heating source 10 is illustrated with a regulator unit 12, a fuel selector valve 3, an outlet valve 5, and a control valve 59. The control valve 59 comprises both an automatic and a manual control valve. In some embodiments, the automatic valve is connected directly to the fuel selector valve 3 and the outlet valve 5 and the manual valve is connected directly to the automatic valve.

Figure 33:
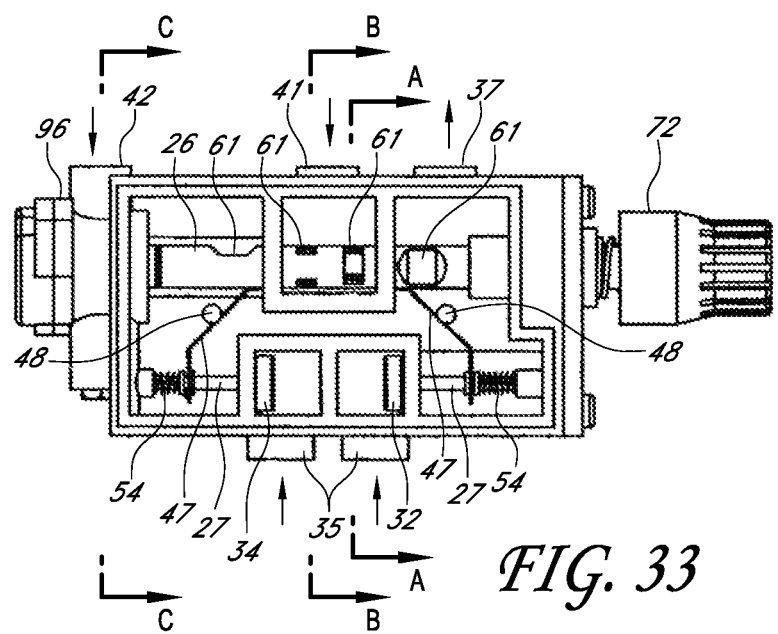
FIGS. 33, 34, 35 are schematic and partial cross-sectional views of the heating source of FIG. 32 in a closed, first open and second open configuration, respectively.

Looking to FIG. 32, another embodiment of a heating source is illustrated. FIG. 32A shows schematically the positions of the internal shaft 26 as controlled by the user interface surface 72. The heating source 10 of FIG. 32 can have three positions. It can have a closed position, a first open position and a second open position. The first open position can correspond to a first fuel and the second open position can correspond to a second fuel. FIGS. 33-35, including the A-C subsets will now be described with respect to these three different positions.

FIGS. 33, 34, 35 are schematic and partial cross-sectional views of the heating source of FIG. 32 in the three positions stated above. The user interface surface 72 can control the position of the shaft 26 which can move the heating source between the three positions. The shaft 26 can include various cutouts 61 to allow the shaft 26 to act as a cam. In some embodiments, the actuators 47 can act as followers on the cam. The actuator 47 together with pin 48 and spring 54 can force the actuator into contact with the shaft 26. Thus, when the actuator 47 engages the cutout 61, the spring will force the actuator forward into contact with the smaller diameter region of the shaft. This will also cause the shaft 27 to move, opening the valve 32 or 34. The cutouts 61 can be configured such that in one position, both valves 32, 34 are closed. The cutouts 61 can also be configured such that in other positions, one or both of the valves 32, 34 are open. As shown, both valves are closed in FIG. 33, one valve is open in FIG. 34 and the other valve is open in FIG. 35.

Figure 33A:
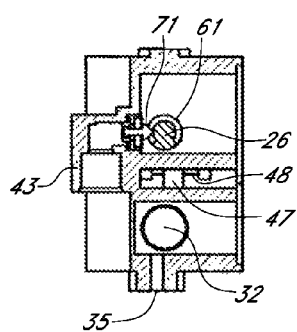
FIGS. 33A, 34A, 35A are cross-sectional views taken along line A-A of the respective base FIG. 33, 34 or 35.
Figure 33B:
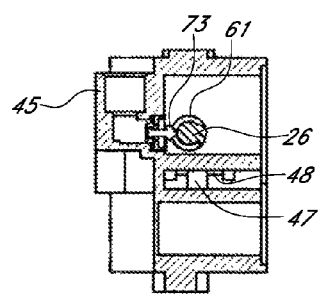
FIGS. 33B, 34B, 35B are cross-sectional views taken along line B-B of the respective base FIG. 33, 34 or 35.
Figure 34A:
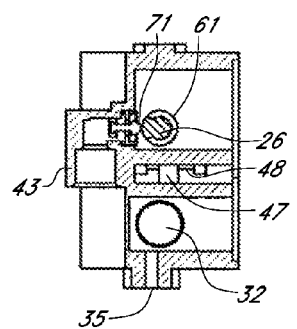
Figure 34B:
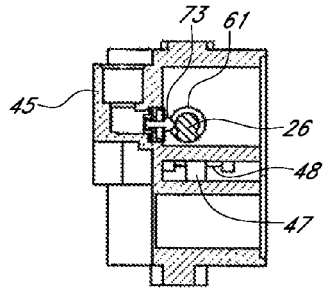
Figure 34C:
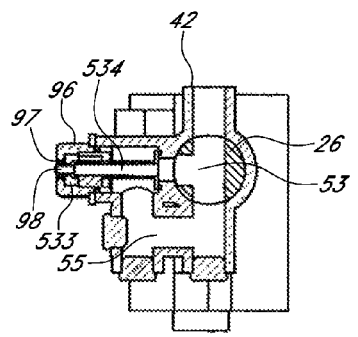
Figure 35A:
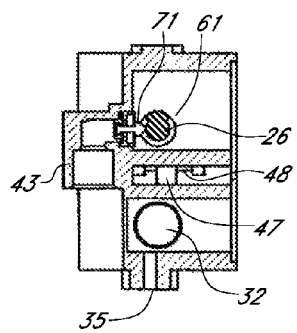
Figure 35B:
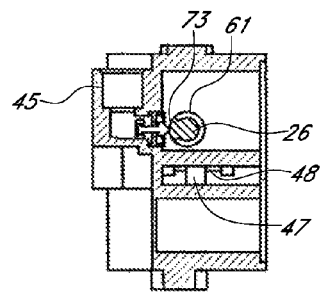
Figure 35C:
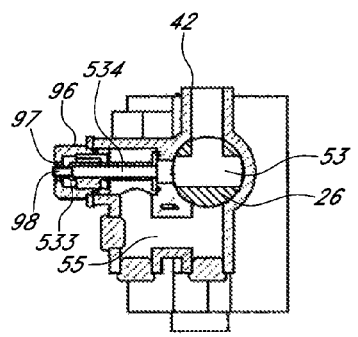
Figure 34:
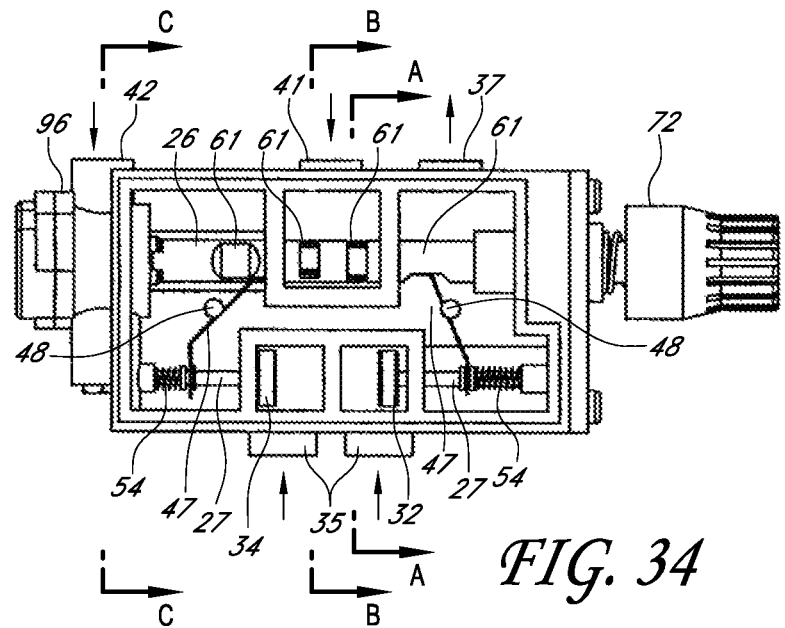
Figure 35:
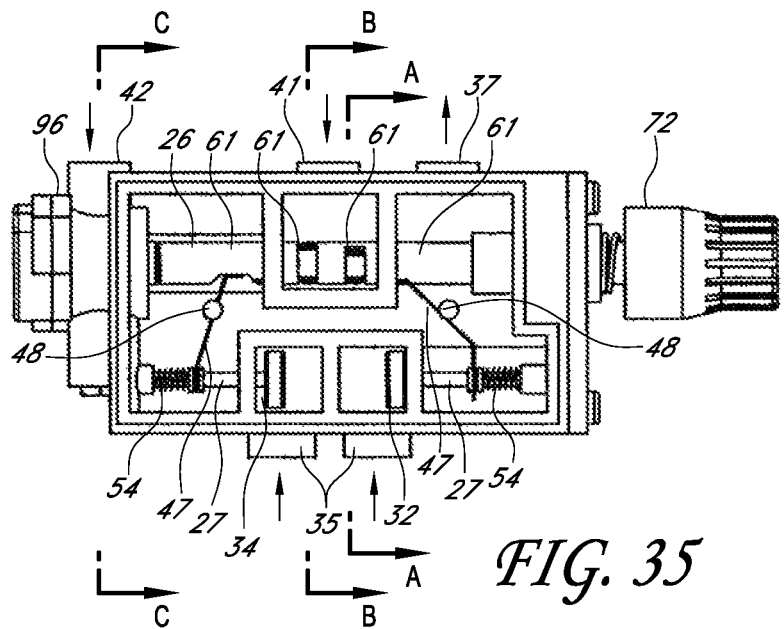

FIGS. 33A, 34A, 35A are cross-sectional views taken along line A-A of the respective base FIG. 33, 34 or 35. FIGS. 33B, 34B, 35B are cross-sectional views taken along line B-B of the respective base FIG. 33, 34 or 35. In the A series figures a valve 71 can be seen and in the B series figures a valve 73 is shown. The valves 71, 73 act as followers to the cam, i.e. shaft 26 and cutouts 61. Thus the valves 71, 73 remain closed in the cutout 61 and open when contacting the normal section of the shaft 26. As an example, in FIG. 34A, valve 71 is open and in FIG. 34B, valve 73 is closed.

Figure 33C:
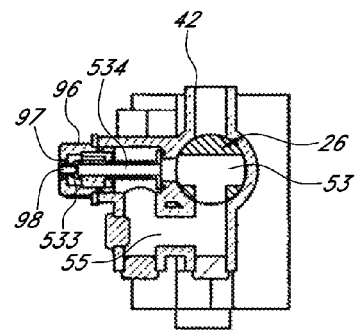
FIGS. 33C, 34C, 35C are cross-sectional views taken along line C-C of the respective base FIG. 33, 34 or 35.

FIGS. 33C, 34C, 35C are cross-sectional views taken along line C-C of the respective base FIG. 33, 34 or 35. As can be seen, the end of shaft 26 can have a channel 53. Rotating the shaft 26 can open or close the channel 53 to inlet 42, as well as to the additional channel 55 and the nozzle 96. The position of channel 53 can determine if and how fuel can flow into the nozzle 96. In FIG. 33C, the channel 53 is closed to inlet 42. In FIG. 34C, the channel 53 is open to inlet 42 and directs the flow of fuel to both chambers of the nozzle 533 and 534. In this configuration, fuel can flow out of both orifices 97, 98. In FIG. 35C, the channel 53 is open to inlet 42 and directs the flow of fuel to chamber 534 but blocks the flow of fuel to chamber 533 of the nozzle 96. In this configuration, fuel flows out of orifice 98.

Looking now to one set of figures, FIGS. 35-35C, it can be seen that in this configuration, valve 34 is open, as valve 73 and valves 32 and 71 are closed. Also, channel 53 is open to inlet 42 and configured to direct fuel to chamber 534 while blocking flow to chamber 533.

The heating source 10 as described herein has many benefits. One of these benefits is its versatility. As shown and described the heating sources 10 can be used for many different types of gas appliances. Manufacturing a basic component that can be used in many different situations may significantly reduce costs across the different product lines. For example, a heating source 10 in one configuration can be used in a vent free heater 100 and in another configuration or in the same configuration can be used in a direct vent heater 210. In both instances the heating source 10 can allow the appliance to use one of either of two different fuels. The different fuels can also be at different pressures.

As a further example, many of the same parts may be used to produce the heating source 10 shown in FIG. 11 as that shown in FIG. 22. In some embodiments, the outer valve body 20 shown in FIG. 11 can be used with the outlet valve 5 and nozzle 96 shown in FIG. 22. Caps 58 can be used to close unnecessary outlets 44 and 46. Thus, the heating source 10 is a modular unit with many different uses and possible configurations. As also described herein the heating source 10 can comprise a number of different components that can connect directly to one another without the use of additional connecting pipes, with FIGS. 13A-D being but one example.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner, as would be apparent to one of ordinary skill in the art from this disclosure, in one or more embodiments.

Similarly, it should be appreciated that in the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A dual fuel heating source comprising:
   a dual pressure regulating unit for regulating the pressure of either of two different fuels at different pressures, comprising:
   a first main body at least partially defining a first flow path and a second flow path;
   a first regulating unit outlet port; and
   a second regulating unit outlet port; wherein the first flow path ends in the first regulating unit outlet port and the second flow path ends in the second regulating unit outlet port;
   a dual entry valve unit comprising:
   a second main body at least partially defining a third flow path and a fourth flow path;
   a first valve unit inlet;

a second valve unit inlet;
a first valve unit outlet port; and
a second valve unit outlet port; and
an exit valve comprising:
a third main body at least partially defining a fifth flow path, a sixth flow path, a seventh flow path and an eighth flow path;
a first exit valve inlet;
a second exit valve inlet;
a first exit valve outlet port;
a second exit valve outlet port;
a third exit valve outlet port; and
a fourth exit valve outlet port;
wherein both the dual pressure regulating unit and the exit valve are connected to the dual entry valve unit in different positions and the exit valve is connected to the dual ent valve unit along a rotational axis wherein the exit valve and the dual ent valve unit both rotate about the rotational axis.

2. The dual fuel heating source of claim 1, wherein the second main body defining a planar interface surface surrounding the first valve unit outlet port and the second valve unit outlet port.

3. The dual fuel heating source of claim 2, further comprising a control valve, the control valve configured to divide a flow of fuel from the dual entry valve unit into two separate flows and is configured to control the flow of fuel from the dual entry valve unit to the exit valve.

4. The dual fuel heating source of claim 3, wherein the control valve comprises at least one of a manual valve, and an automatic valve.

5. The dual fuel heating source of claim 4, wherein the control valve comprising the automatic valve having a corresponding planar interface surface for connecting to the dual entry valve.

6. The dual fuel heating source of claim 5, comprising both the automatic valve and the manual valve and wherein manual valve is connected to the automatic valve.

7. The dual fuel heating source of claim 3, wherein the control valve comprises at least one of an AC solenoid valve, a DC solenoid valve, a thermostat and a flame adjustment motor.

8. The dual fuel heating source of claim 3, wherein the dual fuel heating source is configured to be interchangeable between the automatic valve and the manual valve.

9. The dual fuel heating source of claim 1, further comprising a manifold having a surface for connecting to the dual entry valve and the exit valve, wherein the manifold has three channels and combines two outlets of the dual entry valve into one channel through the manifold and maintains two inlets on the exit valve as two separate channels through the manifold.

10. A dual fuel heating source comprising:
a dual entry valve unit comprising:
a first main body at least partially defining a first flow path and a second flow path;
a first valve unit inlet;
a second valve unit inlet;
a first valve unit outlet; and
a second valve unit outlet;
an exit valve comprising:
a second main body at least partially defining a third flow path, a fourth flow path, a fifth flow path and an sixth flow path;
a first exit valve inlet;
a second exit valve inlet;
a first exit valve outlet port;
a second exit valve outlet port;
a third exit valve outlet port; and
a fourth exit valve outlet port; and
a control valve, the control valve configured to divide a flow of fuel from the dual entry valve unit into two separate flows and is configured to control the flow of fuel from the dual entry valve unit to the exit valve.

11. The dual fuel heating source of claim 10, wherein the first main body defining a planar interface surface surrounding the first valve unit outlet port and the second valve unit outlet port and the second main body defining co-planar interface surface surrounding the first exit valve inlet and the second exit valve inlet.

12. The dual fuel heating source of claim 11, wherein the control valve comprises an automatic valve having a corresponding planar interface surface for connecting to the dual entry valve and the exit valve.

13. The dual fuel heating source of claim 12, comprising both the automatic valve and a manual valve and wherein manual valve is connected to the automatic valve.

14. The dual fuel heating source of claim 10, wherein the control valve comprises at least one of a manual valve, and an automatic valve.

15. The dual fuel heating source of claim 14, wherein the control valve comprises the automatic valve which comprises at least one of an AC solenoid valve, a DC solenoid valve, a thermostat and a flame adjustment motor.

16. The dual fuel heating source of claim 10, further comprising a dual pressure regulating unit comprising:
a third main body at least partially defining a seventh flow path and an eighth flow path;
a first regulating unit outlet port; and
a second regulating unit outlet port.

17. A dual fuel heating source comprising:
a dual pressure regulating unit for regulating the pressure of either of two different fuels at different pressures, comprising:
a first main body at least partially defining a first flow path and a second flow path;
a first regulating unit outlet port; and
a second regulating unit outlet port; wherein the first flow path ends in the first regulating unit outlet port and the second flow path ends in the second regulating unit outlet port;
a dual entry valve unit comprising:
a second main body at least partially defining a third flow path and a fourth flow path;
a first valve unit inlet;
a second valve unit inlet;
a first valve unit outlet port; and
a second valve unit outlet port, the second main body defining a planar interface surface surrounding the first valve unit outlet port and the second valve unit outlet port;
an exit valve comprising:
a third main body at least partially defining a fifth flow path, a sixth flow path, a seventh flow path and an eighth flow path;
a first exit valve inlet;
a second exit valve inlet;
a first exit valve outlet port;
a second exit valve outlet port;
a third exit valve outlet port; and
a fourth exit valve outlet port; and
a control valve configured to divide a flow of fuel from the dual entry valve unit into two separate flows and to control the flow of fuel from the dual entry valve unit to the exit valve;

wherein both the dual pressure regulating unit and the exit valve are connected to the dual entry valve unit in different positions.

18. The dual fuel heating source of claim 17, wherein the control valve comprises at least one of a manual valve, and an automatic valve.

19. The dual fuel heating source of claim 18, wherein the control valve comprises the automatic valve which comprises at least one of an AC solenoid valve, a DC solenoid valve, a thermostat and a flame adjustment motor.

20. The dual fuel heating source of claim 19, wherein the automatic valve has a corresponding planar interface surface for connecting to the dual entry valve.

21. The dual fuel heating source of claim 18, comprising both the automatic valve and the manual valve and wherein manual valve is connected to the automatic valve.

22. The dual fuel heating source of claim 17, further comprising a manifold having a corresponding planar interface surface for connecting to the dual entry valve and the exit valve, wherein the manifold has three channels and combines two outlets of the dual entry valve into one channel through the manifold and maintains two inlets on the exit valve as two separate channels through the manifold.

23. A dual fuel heating source comprising:
   a dual pressure regulating unit for regulating the pressure of either of two different fuels at different pressures, comprising:
      a first main body at least partially defining a first flow path and a second flow path;
      a first regulating unit outlet port; and
      a second regulating unit outlet port; wherein the first flow path ends in the first regulating unit outlet port and the second flow path ends in the second regulating unit outlet port;
   a dual entry valve unit comprising:
      a second main body at least partially defining a third flow path and a fourth flow path;
      a first valve unit inlet;
      a second valve unit inlet;
      a first valve unit outlet port; and
      a second valve unit outlet port;
   an exit valve comprising:
      a third main body at least partially defining a fifth flow path, a sixth flow path, a seventh flow path and an eighth flow path;
      a first exit valve inlet;
      a second exit valve inlet;
      a first exit valve outlet port;
      a second exit valve outlet port;
      a third exit valve outlet port; and
      a fourth exit valve outlet port; and
   a manifold having a planar interface surface for connecting to the dual entry valve and the exit valve, wherein the manifold has three channels and combines two outlets of the dual entry valve into one channel through the manifold and maintains two inlets on the exit valve as two separate channels through the manifold;
   wherein both the dual pressure regulating unit and the exit valve are connected to the dual entry valve unit in different positions.

* * * * *

UNITED STATES PATENT AND TRADEMARK OFFICE
CERTIFICATE OF CORRECTION

PATENT NO. : 8,757,202 B2  
APPLICATION NO. : 12/797530  
DATED : June 24, 2014  
INVENTOR(S) : Deng Page 1 of 1

It is certified that error appears in the above-identified patent and that said Letters Patent is hereby corrected as shown below:

In the Claims

Column 25, line 17, Claim 1, delete "ent valve" and insert --entry valve--.

Column 25, line 18, Claim 1, delete "ent valve" and insert --entry valve--.

Signed and Sealed this  
Twenty-sixth Day of August, 2014

Michelle K. Lee  
*Deputy Director of the United States Patent and Trademark Office*